United States Patent
Endo

(10) Patent No.: US 8,226,483 B2
(45) Date of Patent: Jul. 24, 2012

(54) GAME PROGRAM, GAME DEVICE AND GAME CONTROL METHOD

(75) Inventor: Katsuyoshi Endo, Osaka (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 187 days.

(21) Appl. No.: 12/780,641

(22) Filed: May 14, 2010

(65) Prior Publication Data

US 2010/0222143 A1 Sep. 2, 2010

Related U.S. Application Data

(63) Continuation of application No. PCT/JP2008/069133, filed on Oct. 22, 2008.

(30) Foreign Application Priority Data

| Nov. 30, 2007 | (JP) | ................................. | 2007-310979 |
| Nov. 30, 2007 | (JP) | ................................. | 2007-310980 |
| Feb. 15, 2008 | (JP) | ................................. | 2008-034917 |

(51) Int. Cl.
    *A63F 9/24* (2006.01)
(52) U.S. Cl. ........................................................ 463/37
(58) Field of Classification Search ...................... 463/37
    See application file for complete search history.

(56) References Cited

U.S. PATENT DOCUMENTS

| 5,986,639 A | 11/1999 | Ozawa et al. |
| 2005/0176502 A1 | 8/2005 | Nishimura et al. |
| 2007/0046647 A1 | 3/2007 | Ohta |

FOREIGN PATENT DOCUMENTS

| JP | H09-251341 A | 9/1997 |
| JP | 2003-005878 A | 1/2003 |
| JP | 2004-280532 A | 10/2004 |
| JP | 2005-218778 A | 8/2005 |
| JP | 2005-322088 A | 11/2005 |
| JP | 2005-327064 A | 11/2005 |
| JP | 2006-113715 A | 4/2006 |
| JP | 2007-065853 A | 3/2007 |

*Primary Examiner* — Corbett B Coburn
(74) *Attorney, Agent, or Firm* — Global IP Counselors, LLP

(57) ABSTRACT

A method for controlling a video game is provided. The method includes causing a control unit, which controls the vide game, to recognize first coordinate data indicating a first display position of a first object on the image display unit, causing the control unit to display the first object on the image display unit on the basis of the coordinate data, causing the control unit to recognize an indication position where a player contacts on the image display unit, causing the control unit to set a region for the player to select the first object, the region having a prescribed area, and causing the control unit to recognize whether or not the first object is selected by the player, on the basis of a positional relationship between the first object and the region

22 Claims, 29 Drawing Sheets

| KP | MD |
|---|---|
| 0 | MD1 (>MD2) |
| 1 | MD2 (>0) |

(a)

(b)

(c)

(d)

(a)

(b)

GAME PROGRAM, GAME DEVICE AND GAME CONTROL METHOD

CROSS-REFERENCE TO THE RELATED APPLICATION

This application is a continuation application of PCT Patent Application No. PCT/JP2008/069133 which claims priority to Japanese Patent Application Nos. 2007-310979, 2007-310980, and 2008-034917 filed on Nov. 30, 2007, Nov. 30, 2007, and Feb. 15, 2008 respectively. The entire disclosure of PCT Patent Application No. PCT/JP2008/069133, and Japanese Patent Application Nos. 2007-310979, 2007-310980, and 2008-034917 is hereby incorporated herein by reference.

BACKGROUND OF THE INVENTION

The present invention relates to a game program, and particularly to a game program for implementing a game that displays objects on an image display unit. The present invention also relates to a game device that can implement the game program, and a game control method that is controlled by a computer on the basis of the game program.

A variety of video games have been proposed in the past. These video games are designed to be implemented in a game device. For example, a common game device has a monitor, a game machine main unit separate from the monitor, and an input unit, e.g., a controller separate from the game machine main unit. A plurality of input buttons is arranged on the controller. For example, a portable game device has a game machine main unit, a liquid crystal monitor provided in substantially the center part of the game machine main unit, and an input unit; e.g., a plurality of input buttons, which are arranged on the two sides of the liquid crystal monitor.

In such a game device, various commands can be given by operating an input unit or bringing a touch pen into contact with the liquid crystal monitor.

Considered here is an example of the case in which a competition game, a role-playing game, or the like is carried out using a portable game device. Power Pro Kun Pocket 9, Konami Digital Entertainment, Nintendo DS, Dec. 7, 2006 discloses such games, as an example. In this case, a command button for giving a command to a character is displayed on the liquid crystal monitor, for example. At this time, the command button is selected when the touch pen makes contact with the liquid crystal monitor in the position of the command button. A command assigned to the command button is then recognized by the control unit and a process corresponding to the command is executed by the control unit. An image corresponding to the command is then displayed on the liquid crystal monitor.

SUMMARY OF THE INVENTION

In a conventional portable game device, the size of the game device main unit is often limited in order to ensure the game device is portable. In other words, the size of the liquid crystal monitor is reduced to the extent that importance is placed on the portability of the game device. Accordingly, there is a problem in that the size of the command buttons that can be displayed on the liquid crystal monitor is reduced, and the player has difficulty selecting desired command buttons.

In order to solve such problems, the command buttons are sometimes provided with a larger recognition region than a conventional configuration. For example, when the recognition region of the command buttons is larger than the display region of the command buttons, the control unit can be made to recognize the command buttons even when the player uses a hand movement or the like to select command buttons in a position outside of the display region of the desired command buttons.

However, when a plurality of command buttons is displayed on the liquid crystal monitor, there is a possibility that the recognition region of adjacent command buttons will overlap under certain conditions. Accordingly, game providers must set the layout of the command buttons in advance so that the recognition regions of the command buttons do not overlap. Since the game providers must perform this setting for each screen, there is a possibility that the game providers must labor considerably to set the layout of the command buttons.

In view of the above, an object of the present invention is to make it possible to readily set and select each of a plurality of buttons. Generally, an object of the present invention is to make it possible to readily set and select each of a plurality of objects.

In accordance with one aspect of the present invention, a method for controlling a video game is provided. The method includes causing a control unit, which controls the vide game, to recognize first coordinate data indicating a first display position of a first object on the image display unit, causing the control unit to display the first object on the image display unit on the basis of the coordinate data, causing the control unit to recognize an indication position where a player contacts on the image display unit, causing the control unit to set a region for the player to select the first object, the region having a prescribed area, and causing the control unit to recognize whether or not the first object is selected by the player, on the basis of a positional relationship between the first object and the region.

These and other objects, features, aspects and advantages of the present invention will become apparent to those skilled in the art from the following detailed description, which, taken in conjunction with the annexed drawings, discloses a preferred embodiment of the present invention

DETAILED DESCRIPTION OF THE PREFERRED EMBODIMENTS

Configuration of the Game Device

Figure 1:
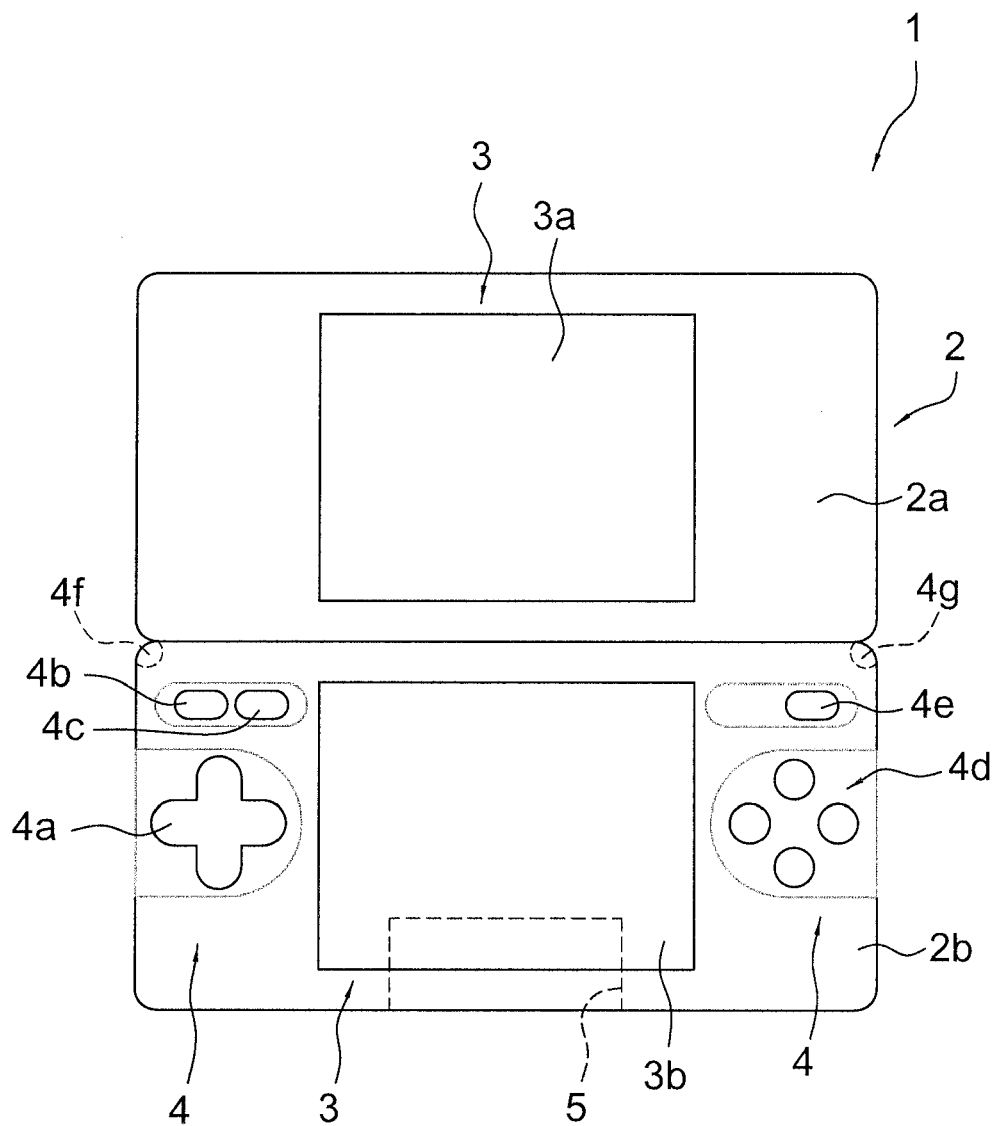
FIG. 1 is a view of the external appearance of a portable game machine as an example of a computer to which the game program according to the present invention can be applied.
Figure 2:
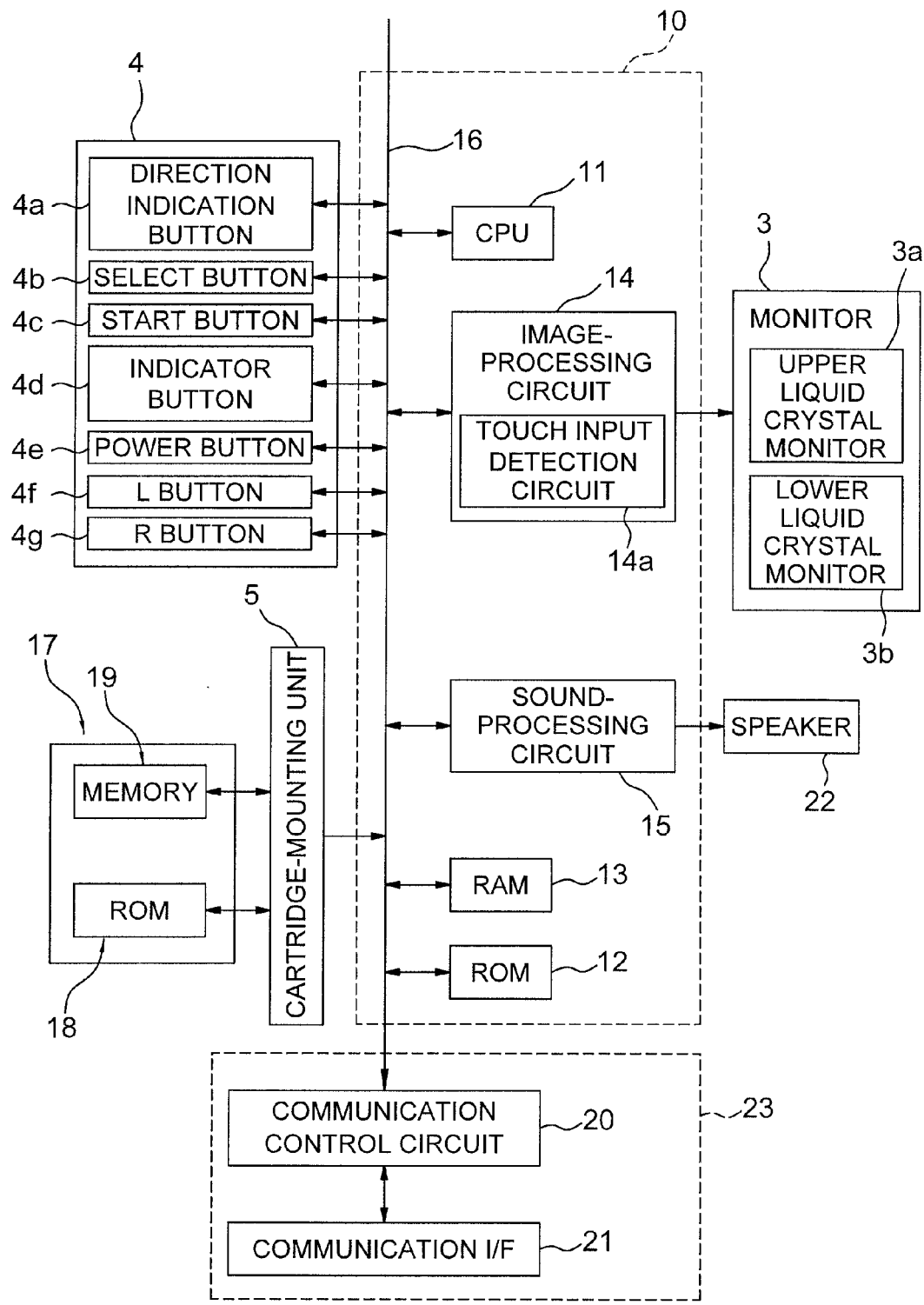
FIG. 2 is a control block diagram for illustrating the control of the portable game machine in detail.

FIG. 1 is a view of the external appearance of a portable game machine 1 given as an example of a computer to which the game program according to the present invention can be applied. FIG. 2 is a control block diagram given as an example of the portable game machine 1.

The portable game machine 1 principally comprises a main unit 2, a liquid crystal monitor unit 3, an input unit 4, a cartridge-mounting unit 5, and a communication unit 23, as shown in FIG. 1.

The main unit 2 has an upper case 2a and a lower case 2b. The upper case 2a and the lower case 2b are connected to each other in a way, such that the main unit can be open and close. The liquid crystal monitor unit 3 is composed of a first liquid crystal monitor; i.e., an upper liquid crystal monitor 3a provided to the upper case 2a, and a second liquid crystal monitor; i.e., a lower liquid crystal monitor 3b provided to the lower case 2b. As used herein as an example, the upper liquid crystal monitor 3a is a non-contact input-type monitor; i.e., a non-touch panel monitor, and the lower liquid crystal monitor 3b is a contact input-type monitor; i.e., a touch panel monitor.

The non-touch panel monitor is a liquid crystal panel, and the touch panel monitor is a liquid crystal panel and touch panel. In the touch panel monitor, the display surface of the liquid crystal panel and the data input surface of the touch panel have a layer-integrated configuration.

The lower liquid crystal monitor 3b (touch panel monitor) of the liquid crystal monitor unit 3 is a contact-input monitor. Accordingly, indication related to various types of input can be carried out by bringing indication means; e.g., a touch pen, a finger, or the like, into contact with the lower liquid crystal monitor 3b. The lower liquid crystal monitor 3b of the liquid crystal monitor unit 3 is thus one input means, as with the input unit 4 (described further below). In other words, in the present embodiment, the lower liquid crystal monitor 3b of the liquid crystal monitor unit 3 and the input unit 4 are input means.

The input unit 4 has a cruciform direction indicator button 4a arranged on the left-side center portion of the lower case 2b, a select button 4b and a start button 4c arranged on the left and right in the left-side upper portion of the lower case 2b, an indicator button 4d arranged on the right-side center portion of the lower case 2b, a power button 4e arranged on the right-side upper portion of the lower case 2b, and an L button 4f and an R button 4g arranged in the left and right corner portions of the lower case 2b.

The cartridge-mounting unit 5 is provided to the lower portion of the lower case 2b. A game cartridge, for example, can be mounted in the cartridge-mounting unit 5. The communication unit 23 is housed in the main unit 2; e.g., the upper case 2a. A network function; e.g., a local wireless network function, or an Internet connection function by wireless LAN, is provided in the communication unit 23.

A volume adjustment button, and earphone jack, and the like are also provided to the portable game machine 1; however, a description of these components will be omitted.

The portable game machine 1 internally has a control device 10, as shown in FIG. 2. The control device 10 is connected to a central processing unit (CPU) 11 that uses a microprocessor, a read only memory (ROM) 12 as a main storage device, a random access memory (RAM) 13, an image processing circuit 14, and a sound processing circuit 15. These components are connected via a bus 16.

The CPU 11 interprets commands from the game program and carries out various data processing and control. The ROM 12 stores programs or the like required for the basic control (e.g., startup control) of the game machine 1. The RAM 13 provides a work area for the CPU 11. The image processing circuit 14 controls the liquid crystal monitor unit 3 in accordance with drawing instructions from the CPU 11, and displays a predetermined image on at least one among the upper liquid crystal monitor 3a and the lower liquid crystal monitor 3b.

A touch input detection circuit 14a is included in the image processing circuit 14. When indication means; e.g., a touch pen, a finger, or the like is brought into direct contact with the touch panel, the coordinate data of the contact position is fed from the touch input detection circuit 14a to the CPU 11, and the contact position is recognized by the CPU 11. When the indication means is brought into direct contact with the touch panel in a position of an object displayed on the liquid crystal panel, the coordinate data of the object is fed from the touch input detection circuit 14a to the CPU 11 and the object is recognized by the CPU 11.

The sound processing circuit 15 generates and outputs to a speaker 22 an analog audio signal that corresponds to the speech instructions from the CPU 11. A communication control circuit 20 and a communication interface 21 are included in the communication unit 23 and are used for wirelessly connecting the game machine 1 to another game machine, or the like. The communication control circuit 20 and the communication interface 21 are connected to the CPU 11 via the bus 16. The communication control circuit 20 and the communication interface 21 control and transmit connection signals for connecting the game machine 1 to a local wireless network or to the Internet via a wireless LAN in accordance with commands from the CPU 11.

An external storage device 17 separate from the control device 10 is connected to the bus 16. An example of the external storage device 17 is a game cartridge or the like that is detachably mounted in the main unit 2, e.g., the lower case 2b. A ROM 18 used as a storage medium and a memory 19 used as rewritable user memory are provided inside the external storage device 17. A game program for causing the game machine 1 to function as a computer is stored in advance in the ROM 18 along with various data required for executing the game program. Various image data or the like are included in the various data. A rewriteable memory such as a flash memory is used as the memory 19. For example, game save data or the like are stored as required in the memory 19.

The storage medium of the external storage device 17 is not limited to using a semiconductor storage element, but also magnetic storage media, optical storage media, magneto-optical storage media, or various other storage media. Interface circuits are disposed as required between the bus 16 and various components, but such interface circuits are omitted from the drawings.

In a game machine 1 having a configuration such as that described above, a game program recorded in the ROM 18 of the external storage device 17 is loaded and the game program thus loaded is executed by the CPU 11, whereby a player can play games of various genres on the liquid crystal monitor unit 3. Data can be sent to and from another game machine and competition games can be carried out by connecting the game machine 1 to a wireless network via the communication control circuit 20, or by connecting the game machine 1 to another game machine via a communication cable or the like.

Embodiment 1
Description of Various Means in the Game Device

Figure 3:
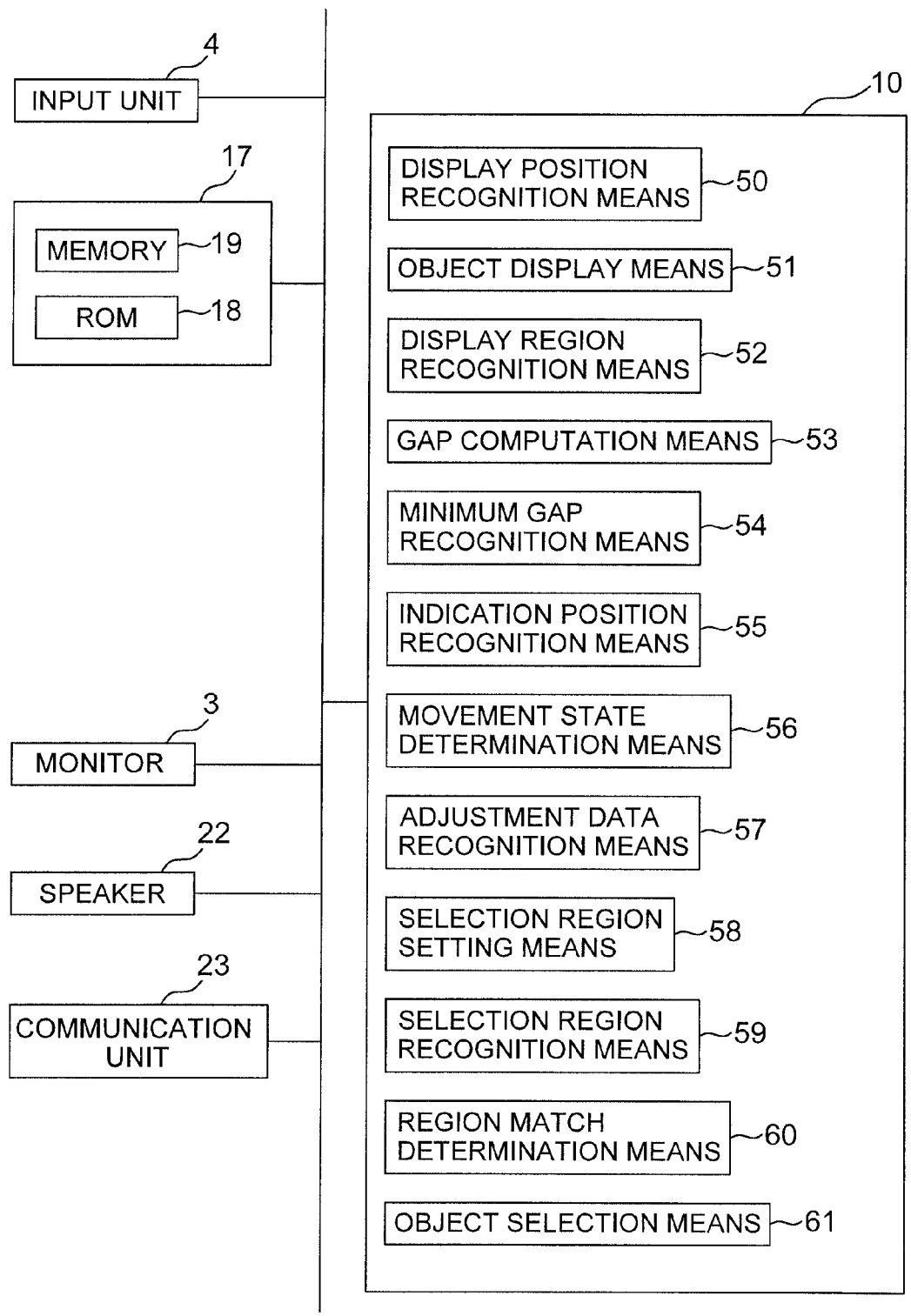
FIG. 3 is a block diagram for illustrating means that function in a baseball game (Embodiment 1)

Games executed in the game machine 1 include a baseball game for example. In the game machine 1, a plurality of objects can be displayed on the lower liquid crystal monitor 3b of the liquid crystal monitor unit 3. FIG. 3 is a functional block diagram for describing functions that perform major roles in the present invention.

Display position recognition means 50 is provided with a function for causing the CPU 11 to recognize coordinate data that indicate the display position for displaying an object on the lower liquid crystal monitor 3b.

The CPU 11 thereby recognizes the coordinate data indicating the display position for displaying an object on the lower liquid crystal monitor 3b. For example, the coordinate data indicating the display position of each object is stored in the RAM 13 when the baseball game program is loaded from the ROM 12. First, the above-described coordinate data stored in the RAM 13 is recognized by the CPU 11 when a command for displaying an object is issued by the CPU 11.

Object display means 51 is provided with a function for displaying each of a plurality of objects on the lower liquid crystal monitor 3b using image data on the basis of the coordinate data indicating the display positions of the objects.

Each of a plurality of objects is thereby displayed on the lower liquid crystal monitor 3b using image data on the basis of the coordinate data indicating the display positions of the objects. For example, when the CPU 11 issues a command for displaying an object, the objects are displayed on the lower liquid crystal monitor 3b on the basis of the coordinate data when the CPU 11 recognizes the coordinate data indicating the display positions of the objects stored in the RAM 13.

Specifically, the CPU 11 issues a command for arranging objects in the display positions of the objects. Each of the objects is thereby displayed on the lower liquid crystal monitor 3b using the image data.

More specifically, the CPU 11 issues a command for arranging the objects so that the center-of-gravity position of each object matches the display position of each object in the lower liquid crystal monitor 3b. The objects are thereby displayed on the lower liquid crystal monitor 3b using the image data.

Display region recognition means 52 is provided with a function for causing the CPU 11 to recognize the coordinate data inside the display region of each of a plurality of objects displayed on the lower liquid crystal monitor 3b.

The CPU 11 thereby recognizes the coordinate data inside the display regions of the objects displayed on the lower liquid crystal monitor 3b. For example, the CPU 11 recognizes the coordinate data inside the display region of each object displayed on the lower liquid crystal monitor 3b when the objects are displayed on the lower liquid crystal monitor 3b.

In this case, the CPU 11 recognizes the coordinate data inside the display region of each object in a coordinate system in which the center position of the lower liquid crystal monitor 3b is used as the origin. Coordinate data that corresponds to the display position of each object is also included in the coordinate data inside the display regions of the objects recognized by the CPU 11.

Gap computation means 53 is provided with a function for causing the CPU 11 to compute the gap data that indicate the gap between mutually adjacent objects on the basis of the coordinate data inside the display regions of the objects.

The gap data indicating the gap between mutually adjacent objects is thereby computed by the CPU 11 on the basis of the coordinate data inside the display regions of the objects.

For example, when each object is a rectangle and the objects are displayed on the lower liquid crystal monitor 3b parallel in the left, right, up, and down directions, a process for computing the length of a line segment that connects the display positions of adjacent objects is first executed by the CPU 11 on the basis of the coordinate data indicating the display positions of the objects. Half the length of the long side and half the length of the short side of the objects are computed by the CPU 11 on the basis of the coordinate data inside the display region of each object. Next, the process for subtracting half the length of one side of a corresponding object from the length of the line segment connecting the display position of the adjacent object is executed by the CPU 11. At this point, the processing result is recognized by the CPU 11 as gap data indicating the gap between mutually adjacent objects.

Minimum gap recognition means 54 is provided with a function for causing the CPU 11 to execute a process for extracting the minimum gap data on the basis of the gap data of at least one object, and for causing the CPU 11 to recognize the minimum gap data.

A process for extracting the minimum gap data on the basis of the gap data of at least one object is thereby executed by the CPU 11, and the minimum gap data is recognized by the CPU 11. For example, when there is only a single object gap data, the gap data is extracted by the CPU 11 as minimum gap data and is recognized by the CPU 11. When there are two or more object gap data, the CPU 11 executes a process for searching for minimum gap data from among a plurality of gap data. At this point, the minimum gap data thus searched by the CPU 11 is recognized by the CPU 11.

Indication position recognition means 55 is provided with a function for causing the CPU 11 to recognize the indication position indicated by the indication means on the basis of an input signal from the input means.

The CPU 11 thereby recognizes the indication position indicated by the indication means on the basis of the input signal from the input means. For example, when the input means is the lower liquid crystal monitor 3b and the indication means is a touch pen, the input signal indicating the contact position of the touch pen is fed from the touch input detection circuit 14a to the CPU 11 when the touch pen has made contact with the lower liquid crystal monitor 3b. The CPU 11 recognizes the coordinate data indicating the contact position of the touch pen on the basis of the input signal.

Movement state determination means 56 is provided with a function for causing the CPU 11 to determine whether an object is stationary.

The CPU 11 thereby determines whether an object is stationary. For example, the CPU 11 determines whether there is a match between the coordinate data ($n^{th}$ coordinate data) indicating the display position of an object in a frame (n frame, wherein n is a natural number) of when the touch pen has made contact with the lower liquid crystal monitor 3b, and the coordinate data ($(n-1)^{th}$ coordinate data) indicating the display position of an object in a frame ((n−1) frame, wherein n is a natural number) one frame prior to the frame in which the touch pen has made contact with the lower liquid crystal monitor 3b.

When the $n^{th}$ coordinate data indicating the display position of the object matches the $(n-1)^{th}$ coordinate data indicating the display position of the object, it is determined that the object is stationary. On the other hand, when the $n^{th}$ coordinate data indicating the display position of the object does not match the $(n-1)^{th}$ coordinate data indicating the display position of the object, it is determined that the object is moving. The object is determined to be stationary when the object is initially displayed on the lower liquid crystal monitor 3b (when n=1).

Adjustment data recognition means 57 is provided with a function for causing the CPU 11 to recognize adjustment data for adjusting the selection region for selecting an object. Specifically, the adjustment data recognition means 57 is provided with a function for causing the CPU 11 to recognize as adjustment data, one adjustment data among first adjustment data that corresponds to the case in which the object is stationary, and second adjustment data that is less than the first adjustment data and corresponds to the case in which the object is moving.

The CPU 11 thereby recognizes the adjustment data to be either first adjustment data that corresponds to the case in which the object is stationary, or second adjustment data that is less than the first adjustment data and corresponds to the case in which the object is moving.

For example, when the object is determined to be stationary, the first adjustment data that corresponds to the case in which the object is stationary is recognized as the adjustment data by the CPU 11. On the other hand, when the object has been determined to be moving, the second adjustment data that corresponds to the case in which the object is moving is recognized to be the adjustment data by the CPU 11. In this case, the second adjustment data is less than the first adjustment data.

The first adjustment data and the second adjustment data are stored in the RAM 13 when the baseball game program is loaded from the ROM 12. The correspondence relationship between the determination results and the first and second adjustment data is defined in the game program.

Selection region setting means 58 is provided with a function for causing the CPU 11 to set a selection region for selecting an object on the basis of the minimum gap data. The selection region setting means 58 is also provided with a function for causing the CPU 11 to set a selection region in which the indication position is the base point on the basis of the minimum gap data. Specifically, the selection region setting means 58 is provided with a function for causing the CPU 11 to compute definition data for defining a selection region by adjusting the minimum gap data using adjustment data, and set a selection region in which the indication position is the origin on the basis of the definition data. More specifically, the selection region setting means 58 is provided with a function for causing the CPU 11 to compute definition data for defining a selection region by causing the CPU 11 to execute a process for subtracting the adjustment data from the minimum gap data, and for causing the CPU 11 to set a selection region in which the indication position is the origin on the basis of the definition data.

The CPU 11 is thereby caused to execute a process for subtracting the adjustment data from the minimum gap data, whereby the definition data for defining the selection region is computed. The selection region in which the indication position is used as the origin is set by the CPU 11 on the basis of the definition data. For example, first, the process for subtracting the adjustment data from the minimum gap data is executed by the CPU 11. This processing result is recognized by the CPU 11 as diameter data (definition data) that indicate the length of the diameter of a circular selection region. Next, a circular region having a diameter length indicated by the diameter data (definition data) in which the contact position of the touch pen is the center is recognized by the CPU 11 as the selection region. The selection region is thus set by defining a circular region.

Selection region recognition means 59 is provided with a function for causing the CPU 11 to recognize coordinate data inside the selection region.

The coordinate data inside the selection region is thereby recognized by the CPU 11. For example, if the selection region is set to be circular in the manner described above, the coordinate data inside the circular selection region is recognized by the CPU 11.

Region match determination means 60 is provided with a function for causing the CPU 11 to determine whether the coordinate data inside the display region of an object matches the coordinate data inside the selection region.

The CPU 11 thereby determines whether the coordinate data inside the display region of an object matches the coordinate data inside the selection region. For example, the CPU 11 determines whether at least one set of coordinate data inside the display region of an object displayed on the lower liquid crystal monitor 3b matches at least one set of coordinate data inside the selection region in which the contact position of the touch pen is defined as a reference.

Object selection means 61 is provided with a function for causing the CPU 11 to recognize as the selected object an object for which the coordinate data has matched, for the case in which the CPU 11 has determined that the coordinate data inside the display region of the object matches the coordinate data inside the selection region.

The CPU 11 thereby recognizes an object for which the coordinate data has matched as the object selected using a touch pen, for the case in which the CPU 11 has determined that the coordinate data inside the display region of the object matches the coordinate data inside the selection region. For example, when the CPU 11 has determined that at least one set of coordinate data inside the display region of an object displayed on the lower liquid crystal monitor 3b matches at least one set of coordinate data inside the selection region in which the contact position of the touch pen is defined as a reference, it is determined that the selection region overlaps the display region of the object. An object in which the coordinate data have matched is recognized by the CPU 11 as the object selected by the touch pen.

Figure 14:
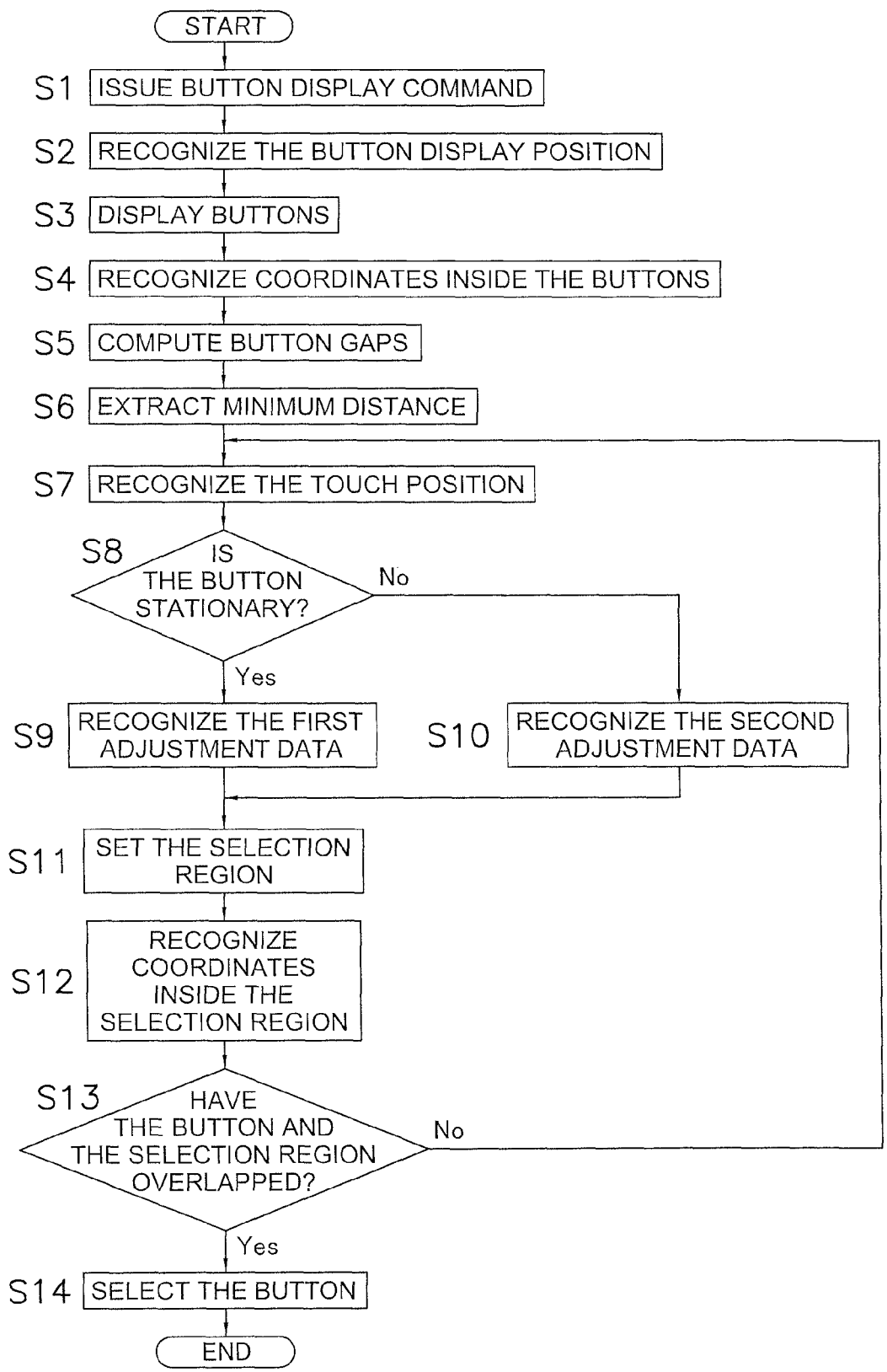
FIG. 14 is a flowchart for illustrating the object selection system in the present baseball game.

Processing Flow and Description of the Object Selection System in a Baseball Game Next, an object selection system, in a baseball game for example, will be described in specific detail. The process related to the object selection system shown in FIG. 14 will also be described at the same time.

Described hereinbelow is an example in which the object is a button, and an example in which the object is a player character.

1. When the Object is a Button

Figure 4:
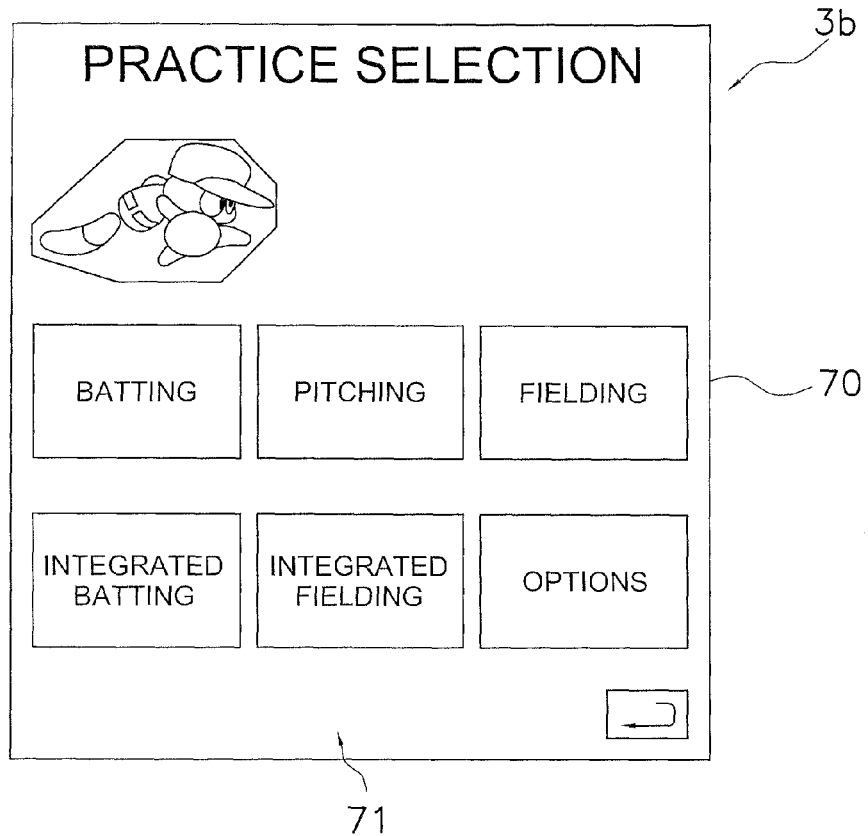
FIG. 4 illustrates a practice selection screen.

For example, in a baseball game, a practice selection screen 70 such as that shown in FIG. 4 is displayed on the lower liquid crystal monitor 3b when an operation practice mode is selected for practicing operation when the player is at bat, operation when the player is in the field, or another operation. A plurality of button objects 71 (71a, 71b, 71c, 71d, 71e, 71f) is arranged on the practice selection screen 70. In this case, the button objects 71 include five button objects (batting practice button 71a, pitching practice button 71b, fielding practice button 71c, integrated at-bat practice button 71d, and integrated fielding practice button 71e) for indicating the practice mode, and a button object (option button) 71f for setting the details of the practice mode, as well as other objects.

When an operation practice mode is selected, the CPU 11 issues (S1) a display command for displaying the button objects 71 on the lower liquid crystal monitor 3b, for example. At this point, the CPU 11 recognizes (S2) coordinate data indicating the display positions H (H1, H2, H3, H4, H5, H6) for displaying the button objects 71 on the lower liquid crystal monitor 3b. The coordinate data indicating the display positions H of the button objects 71 are defined in advance in the game program and are stored in the RAM 13.

When the CPU 11 recognizes the coordinate data indicating the display positions H of the button objects 71 (71a, 71b, 71c, 71d, 71e, 71f), the CPU 11 issues a command for arranging the button objects in the display positions H of the button objects 71a, 71b, 71c, 71d, 71e, 71f indicated by the coordinate data. At this point, the button objects 71a, 71b, 71c, 71d, 71e, 71f are displayed (S3) on the lower liquid crystal monitor 3b using the image data for the button objects. Specifically, the button objects 71a, 71b, 71c, 71d, 71e, 71f are displayed on the lower liquid crystal monitor 3b using the image data so that the center-of-gravity position of the button objects 71a, 71b, 71c, 71d, 71e, 71f matches the display positions H of the button objects in the lower liquid crystal monitor 3b. The image data that correspond to the button objects 71a, 71b, 71c, 71d, 71e, 71f are stored in the RAM 13.

Next, the CPU 11 recognizes (S4) the coordinate data inside the display regions of the button objects 71 displayed on the lower liquid crystal monitor 3b. Specifically, the CPU 11 recognizes the coordinate data inside the display regions of the button objects 71 in a coordinate system in which the origin is the center position (center-of-gravity position) of a rectangular range in which an image can be displayed on the lower liquid crystal monitor 3b. Here, the coordinate data that correspond to the display positions H of the button objects 71 are included in the coordinate data inside the display regions of the button objects 71 recognized by the CPU 11.

When the CPU 11 recognizes the coordinate data inside the display regions of the button objects 71, the CPU 11 subsequently computes (S5) the gap data D (D11, D12, D13, D14, D21, D22) indicating the gap between mutually adjacent button objects 71 on the basis of the coordinate data inside the display regions of the button objects 71.

Figure 5:
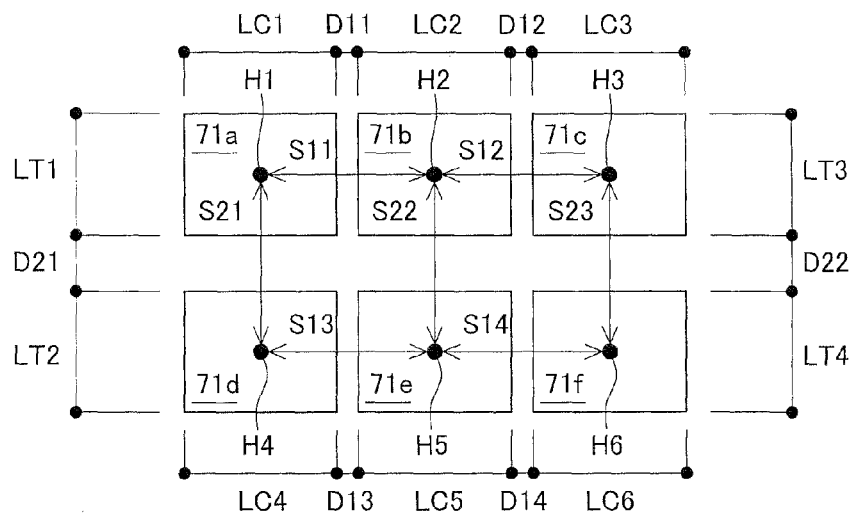
FIG. 5 illustrates data used in computations.

Here, the button objects 71 are shaped in rectangular, for example. The button objects 71 are arranged in two rows in the horizontal direction and three rows in the vertical direction. In this case, first, the CPU 11 executes a process for computing the length of the line segments S (S11, S12, S13, S14, S21, S22, S23) that connect the display positions H of adjacent button objects (71a to 71b, 71b to 71c, 71d to 71e, 71e to 71f, 71a to 71d, 71b to 71e, 71c to 71f) on the basis of the coordinate data indicating the display positions H of the button objects 71, as shown in FIG. 5.

The CPU 11 executes a process for computing the length LC in the lengthwise direction (LC1, LC2, LC3, LC4, LC5, LC6) and the length LT in the short side direction (LT1, LT2, LT3, LT4) of the button objects 71. For example, the CPU 11 executes a process for subtracting the minimum value of the x coordinate from the maximum value of the x coordinate in the horizontal direction that passes through the center-of-gravity positions of the display regions of the button objects 71, whereby the length LC in the lengthwise direction of the button objects 71 is computed. The CPU 11 executes a process for subtracting the minimum value of the y coordinate from the maximum value of the y coordinate in the vertical direction that passes through the center-of-gravity positions of the display regions of the button objects 71, whereby the length LT in the short side direction of the button objects 71 is computed. The CPU 11 is caused to execute a process for multiplying the numerical value "0.5" by the length LC in the lengthwise direction of the button objects 71 and the length LT in the short side direction of the button objects 71, whereby half the length of the long side of the button objects 71 and half the length of the short side (the length of half of one side of the button objects, LC/2, LT/2) of the button objects 71 are computed.

The CPU 11 executes a process for subtracting half the length (the half length LC/2 of the long side of the button objects, or the half length LT/2 of the short side of the button objects) of one side of the button objects 71 from the length S of the corresponding line segments that connect the display positions H of adjacent button objects 71. The CPU 11 thus computes the gap data D11, D12, D13, D14, D21, D22 indicating the gaps between mutually adjacent button objects 71 and recognizes the gap data D11, D12, D13, D14, D21, D22.

At this point, the CPU 11 executes a process for extracting minimum data from a plurality of gap data D11, D12, D13, D14, D21, D22 recognized by the CPU 11, and the data extracted via this process is recognized by the CPU 11 as the minimum gap data D_min. In this case, the gap data D11 (=D12, D13, D14), for example, is recognized (S6) by the CPU 11 as the minimum gap data D_min.

Figure 6:
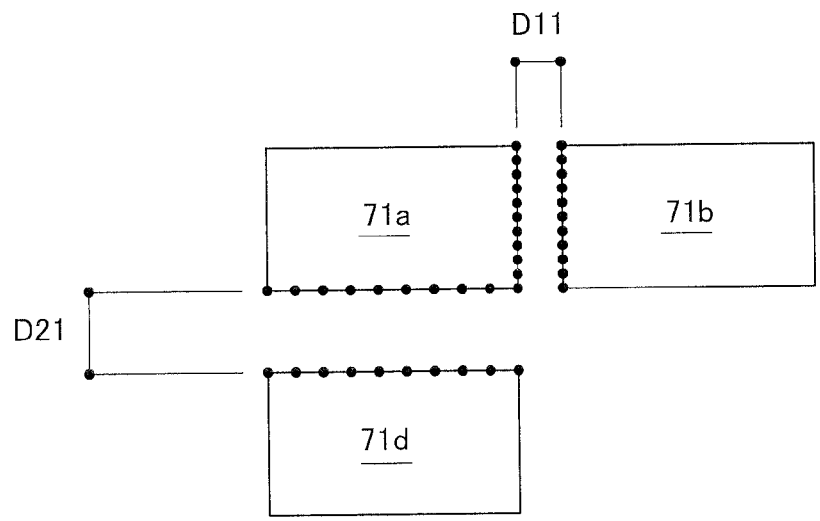
FIG. 6 illustrates another mode for computing the gap data.

An example has been given of a case in which the gap data D of the mutually adjacent button objects 71 are computed by subtracting half the length (LC/2, LT/2) of one side of the button objects from the length S of the corresponding line segments that connect the display positions H of adjacent button objects 71. However, the gap data D of the button objects 71 are not limited to the mode described above and may be computed in any manner. For example, the CPU 11 may be caused to execute a process for computing the gap data D of the button objects 71 on the basis of the coordinate data positioned on the outermost peripheries of button objects 71 that face each other, as shown in FIG. 6. The objects 71c, 71e, and 71f are omitted in FIG. 6.

Figure 7:
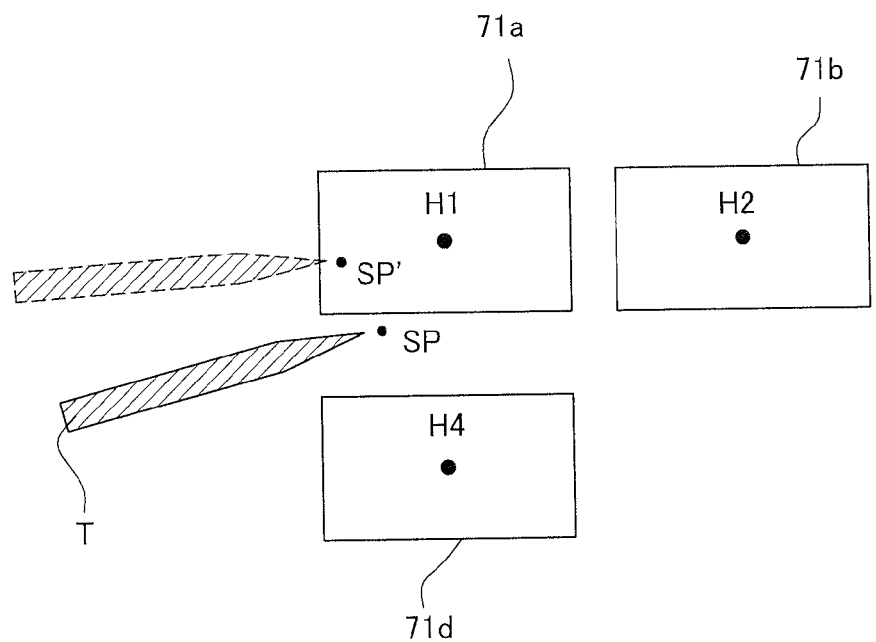
FIG. 7 shows the positional relationship between the button and the contact position of the touch pen.

Next, when the player brings the touch pen T into contact with the lower liquid crystal monitor 3b in order to select a desired button object 71a in a state in which the button objects 71 (objects 71c, 71e, 71f) is not shown in FIG. 7) are displayed on the lower liquid crystal monitor 3b, as shown in FIG. 7, an input signal indicating the contact position SP of the touch pen T which has made contact with the lower liquid crystal monitor 3b is fed from the touch input detection circuit 14a to the CPU 11. The coordinate data indicating the contact position SP of the touch pen T is recognized by the CPU 11 (S7) on the basis of the input signal.

When the coordinate data indicating the contact position SP of the touch pen T is recognized by the CPU 11, the CPU 11 determines (S8) whether the button objects 71 are stationary. For example, in this case, the CPU 11 determines whether there is a match between the coordinate data ($n^{th}$ coordinate data) indicating the display position H of a button object 71 in a frame (n frame, wherein n is a natural number) of when the touch pen T has made contact with the lower liquid crystal monitor 3b, and the coordinate data ($(n-1)^{th}$ coordinate data) indicating the display position H of a button object 71 in a frame ($(n-1)$ frame, wherein n is a natural number) one frame prior.

When the $n^{th}$ coordinate data indicating the display position H of a button object 71 matches the $(n-1)^{th}$ coordinate data indicating the display position H of the button object 71, the button object 71 is determined to be stationary (Yes in S8). In this case, the CPU 11 executes a process for substituting the numerical value "0" in the result identification parameter KP for identifying the determination result. Conversely, when the $n^{th}$ coordinate data indicating the display position H of the button object 71 does not match the $(n-1)^{th}$ coordinate data indicating the display position H of the button object 71, it is determined that the button object 71 is moving (No in S8). In this case, the CPU 11 executes a process for substituting the numerical value "1" in the result identification parameter KP for identifying the determination result.

When the button object 71 has been initially displayed on the lower liquid crystal monitor 3b (when n=1), the setting is made so that the button object 71 is determined to be stationary. In other words, in this case, the CPU 11 executes a process for substituting the numerical value "0" in the result identification parameter KP for identifying the determination result.

Next, adjustment data MD for adjusting the selected area R for choosing the button object 71 is recognized by the CPU 11 (S9, S10). In this case, for example, one of either first adjustment data MD1 that corresponds to the case in which the button object 71 is stationary, or second adjustment data MD2 that corresponds to the case in which the button object 71 has moved is recognized by the CPU 11 as the adjustment data MD.

Specifically, when the button object 71 is determined to be stationary (Yes, in S8 when the value of the result identification parameter KP is "0"), the CPU 11 recognizes (S9) the adjustment data MD to be the first adjustment data MD1 that corresponds to the case in which the button object 71 is stationary. On the other hand, when it has been determined that the button object 71 has moved (No, in S8, when the value of the result identification parameter KP is "1"), the CPU 11 recognizes (S10) the adjustment data MD to be the second adjustment data MD2 that corresponds to the case in which the button object 71 has moved. Here, the second adjustment data MD2 is set to the predetermined value so as to be greater than 0 and less than the first adjustment data MD1. The first adjustment data MD1 is set to the predetermined value so as to be data that is less than the minimum gap data D_min. The selection region R can thereby be set up so that the selection region R when the button object 71 has moved is greater than the selection region R when the button object 71 is stationary.

Figures 8, 9:
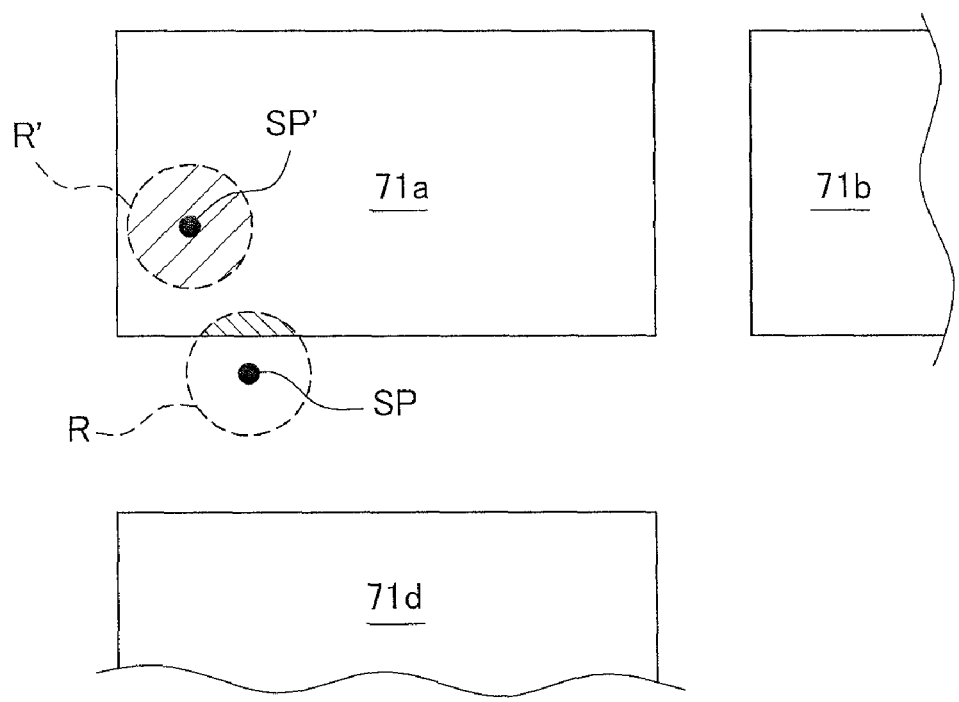
FIG. 8 shows the correspondence relationship between the determination results and the adjustment data.
FIG. 9 shows a button selected by the selection region.

The first adjustment data MD1 and the second adjustment data MD2 are stored in the RAM 13 when the baseball game program is loaded from the ROM 12. The correspondence relationship between the determination result (result identification parameter KP), and the first adjustment data MD1 and the second adjustment data MD2 is defined in advance in the game program, as shown in FIG. 8.

Next, the CPU 11 sets (S11) the selection region R for selecting the button object 71 on the basis of the minimum gap data D_min extracted by the CPU 11. For example, in this case, the definition data RK for defining the selection region R is computed by adjusting the minimum gap data D_min using the adjustment data MD. The CPU 11 sets the selection region R in which the contact position SP is a base point on the basis of the definition data RK.

Specifically, first, the CPU 11 executes a process for subtracting the adjustment data MD from the minimum gap data D_min. This processing result (D_min−MD) is recognized by the CPU 11 as the diameter data RK (definition data) indicating the length of the diameter of the circular selection region R. Next, the circular region having a diameter indicated by the diameter data RK (=D_min−MD) about the center of the contact position SP of the touch pen T is recognized by the CPU 11 as the selection region R, as shown in FIG. 9. In this manner, the circular selection region R is set by the CPU 11 on the basis of the contact position SP at which the touch pen T has made contact with the lower liquid crystal monitor 3b.

At this point, the coordinate data inside the selection region R is recognized by the CPU 11 (S12). For example, the coordinate data inside the circular selection region R is recognized by the CPU 11 when the selection region R is set to be circular in the manner described above.

Next, the CPU 11 determines (S13) whether the coordinate data inside the display region of the button object 71 matches the coordinate data inside the circular selection region R. For example, the CPU 11 determines whether at least one set of coordinate data inside the display region of the button object 71 displayed on the lower liquid crystal monitor 3b matches at least one set of coordinate data inside the circular selection region R in which the contact position SP of the touch pen T is defined as a reference.

When the CPU 11 has determined that the coordinate data inside the display region of the button object 71 matches the coordinate data inside the selection region R (Yes, in S13), the CPU 11 recognizes (S14) the button object 71 for which a match exists between the coordinate data as the button object 71 selected by the touch pen T. For example, when the CPU 11 has determined that at least one set of coordinate data inside the display region of the button object 71 displayed on the lower liquid crystal monitor 3b matches at least one set of coordinate data inside the selection region R (R') in which the contact position SP (SP') of the touch pen T is defined as a reference, it is determined that the selection region R (R') overlaps the display region of the button object 71 (see the shaded portions of FIG. 9). At this point, the button object 71 (71a) for which the coordinate data have matched is recognized by the CPU 11 as the object selected by the touch pen T.

On the other hand, the button object 71 is not selected by the touch pen T when the CPU 11 has not determined there to be a match between the coordinate data inside the display region of the button object 71 and the coordinate data inside the selection region R (No, in S13). In this case, the process of step 7 (S7) is executed again by the CPU 11.

An example of the case in which the button object 71 does not move is described in the embodiment above, but the determination process (the process of step 8) described above is in operation. When the determination process is caused to function, the CPU 11 can be caused to recognize the second adjustment data MD2, which is less than the first adjustment data MD1, when the screen is changed and the layout of the button objects 71 is modified. The player can thereby readily select the button object 71 because the selection region is set to be a region that is greater than the selection region R described above (selection region in the case of No in step 8), even when the player uses the touch pen T to attempt to select the button object 71 for which the layout has been modified, and cannot keep track of the modified layout.

2. When the Object is a Player Character

The process carried out when the object is a player character is the substantially the same as that carried out when the object is a button as described above, except for the portion of the mode selected in a baseball game. Accordingly, a detailed description is omitted in relation to the portion that describes the same process as the process for when the object described above is a button. The step S in which the same process is executed as the process of when the object described above is a button is noted with a prime mark (') added to the symbol S.

Here, a diagram showing the flow related to the object selection system is omitted. However, FIG. 14 can be substituted as the process flow for the case in which the object is a player character by substituting the term "player" or "player character" in place of the term "button" shown in FIG. 14. The prime mark (') is not used with the symbol S in FIG. 14.

Described below is an example in which the object selection system functions when the object is a player character.

Figure 10:
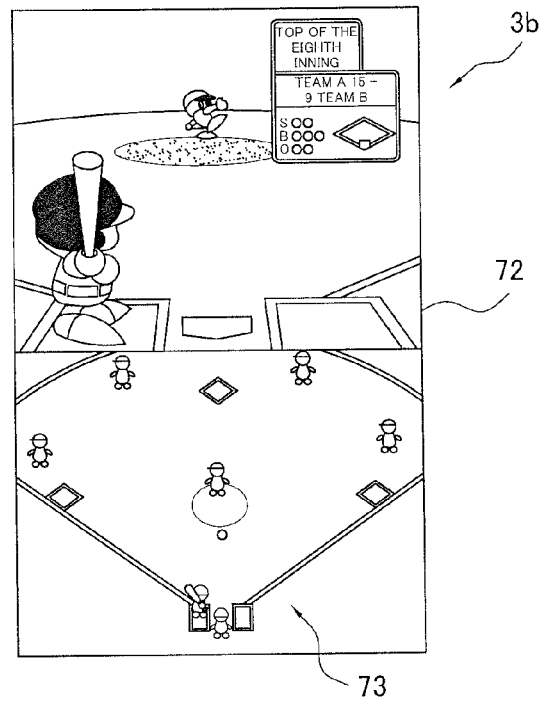
FIG. 10 illustrates a competition screen.

When the competition mode is selected in a baseball game, for example, a competition screen 72 such as that shown in FIG. 10 is displayed on the lower liquid crystal monitor 3b. At this point, the CPU 11 issues a display command for displaying a plurality of fielder character objects 73 (hereinafter referred to as fielder characters) on the lower liquid crystal monitor 3b. The CPU 11 recognizes the initial coordinate data indicating the display position for displaying the fielder characters 73 (73a, 73b, 73c, 73d, 73e, 73f, 73g, 73h, 73i) on the lower liquid crystal monitor 3b. The initial coordinate data indicating the display positions of the fielder characters are defined in advance in the game program and are stored in the RAM 13.

The initial coordinate data indicating the display positions of the fielder characters are recognized by the CPU 11, and the CPU 11 then issues a command for arranging the fielder characters in the display positions of the fielder characters indicated by the initial coordinate data. At this point, the fielder characters are displayed on the lower liquid crystal monitor 3b using image data. In FIG. 10, the fielder characters 73a, 73b, 73c, 73d, 73e, 73f are displayed and the outfielder characters 73g, 73h, 73i are omitted.

In this state, the CPU 11 issues (S1') a display command for displaying on the lower liquid crystal monitor 3b the fielder characters 73 that act in the direction of a hit ball B when the ball B has been hit by the batter character. At this point, coordinate data indicating the display positions of the fielder characters 73 to be displayed on the lower liquid crystal monitor 3b are recognized by the CPU 11 (S2'). The coordinate data indicating the display positions of the fielder characters 73 are computed and stored in the RAM 13 by the CPU 11 for each frame on the basis of the coordinate data of the position of the ball B. The coordinate data of the position of the ball B is computed by the CPU 11 on the basis of a ball B trajectory formula defined in advance in the game program.

Figure 11:
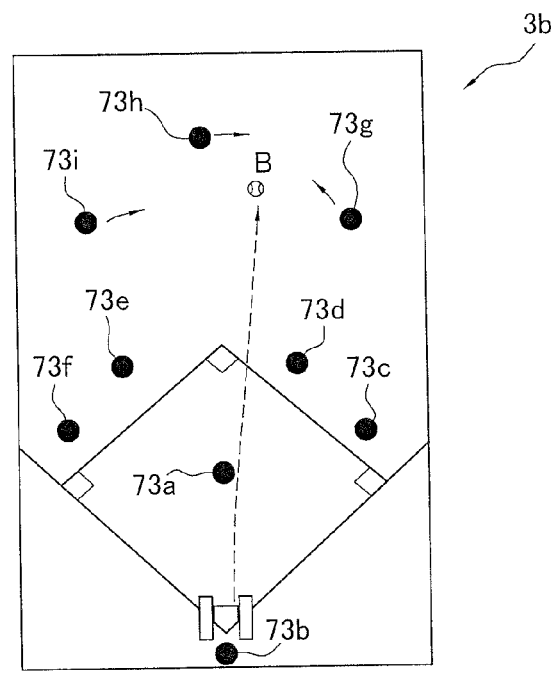
FIG. 11 shows a fielder character and a ball displayed on the screen.

When the CPU 11 consecutively recognizes the coordinate data indicating the display positions of the fielder characters 73, the CPU 11 issues a command for arranging the fielder characters 73 in the display positions of the fielder characters indicated by the coordinate data. At this point, the video of the fielder characters 73 that act in the direction of the hit ball B is displayed (S3', see FIG. 11) on the lower liquid crystal monitor 3b using image data. The display regions of the fielder characters 73 are described below as being circularly formed. Accordingly, the display regions of the fielder characters 73 are depicted as circles in FIG. 11.

The CPU 11 is caused to execute a process for computing a straight line from the initial position of the fielder characters 73 toward the position where the ball B will fall by making use of the coordinate data indicating the display positions of the fielder characters 73, whereby video of the fielder characters 73 that move in a rectilinear fashion is displayed on the lower liquid crystal monitor 3b using image data.

Next, the coordinate data inside the display regions of the fielder characters 73 displayed on the lower liquid crystal monitor 3b are stored in the RAM 13 for each frame and recognized (S4') by the CPU 11. In this case, coordinate data that corresponds to the display positions (circle centers) of the fielder characters 73 are included in the coordinate data inside the display regions of the fielder characters 73 recognized by the CPU 11.

Figure 12:
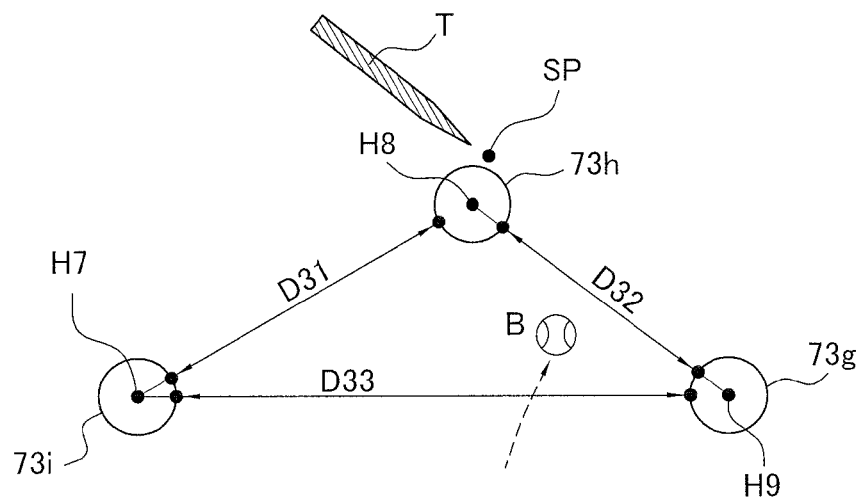
FIG. 12 illustrates data used in computations.

Next the gap data indicating the gap between mutually adjacent fielder characters 73 is computed (S5') by the CPU 11 for each frame on the basis of the coordinate data inside the display regions of the fielder characters 73. For example, the CPU 11 executes a process for computing the gap data D (D31, D32, D33) of the fielder characters 73 on the basis of the coordinate data positioned on the outermost periphery of the adjacent fielder characters 73, as shown in FIG. 12.

An example is given here of a case in which the gap data D (D31, D32, D33) of the fielder characters 73 are computed on the basis of the coordinate data positioned on the outermost periphery of the adjacent fielder characters 73. However, the mode for computing the gap data D (D31, D32, D33) of the fielder characters 73 may be any mode.

For example, first, the CPU 11 computes the distance data of two fielder characters (73g and 73h, 73h and 73i, 73g and 73i) among a plurality of fielder characters 73g, 73h, 73i. In this situation, the CPU 11 computes the distance data connecting the display position H7 and the display position H8, the distance data connecting the display position H8 and the display position H9, and the distance data connecting the display position H9 and the display position H7. The gap data D (D31, D32, D33) of the fielder characters 73 can be computed by causing the CPU 11 to execute a process for subtracting the value of the radius that defines the display regions of the fielder characters from each distance data. Accordingly, the gap data D of the fielder characters can be readily computed in the manner described above by using a circle to evaluate the region in which a fielder character can be selected, even when the shape of the fielder character is a complex shape.

The CPU 11 subsequently executes a process for extracting the minimum gap data D_min from among the gap data D31, D32, D33, and the data extracted via this process is recognized (S6') by the CPU 11 as the minimum gap data D_min. In this case, the gap data D32, for example, is recognized by the CPU 11 as the minimum gap data D_min.

Next, in a state in which a plurality of moving fielder characters 73 is displayed on the lower liquid crystal monitor 3b, an input signal indicating the contact position SP of the touch pen T which has made contact with the lower liquid crystal monitor 3b is fed from the touch input detection circuit 14a to the CPU 11 when the player brings the touch pen T into contact with the lower liquid crystal monitor 3b in order to select a desired fielder character 73. The CPU 11 recognizes (S7') the coordinate data indicating the contact position SP of the touch pen T on the basis of the input signal. The desired fielder character 73 noted above corresponds to a fielder character that the player directs to catch a ball.

When the CPU 11 recognizes the coordinate data indicating the contact position SP of the touch pen T, the CPU 11 determines (S8') whether the fielder character 73 (73h) nearest to the contact position SP of the touch pen T is stationary.

Specifically, the fielder character 73 nearest to the contact position SP of the touch pen T is selected in the following manner. First, the CPU 11 is caused to execute a process for computing the distance data between the contact position SP of the touch pen T and the display positions H (H7, H8, H9) of the fielder characters 73. Next, the CPU 11 detects the distance data having the smallest value from among the distance data detected in this case. The CPU 11 recognizes the fielder character 73 in the position indicated by the smallest distance data as the fielder character nearest to the contact position SP of the touch pen T. In FIG. 12, the CPU 11 recognizes the center fielder character 73h as the fielder character nearest to the contact position SP of the touch pen T. In this situation, the fielder character is recognized by causing the CPU 11 to recognize identification data for identifying the fielder character 73.

The CPU 11 executes a process for substituting the numerical value "0" in the result identification parameter KP for identifying the determination result if the fielder character 73 (73h) nearest to the contact position SP of the touch pen T has been determined to be stationary (Yes, in S8'). For example, this case corresponds to the case in which the catcher character 73b has been selected. On the other hand, the CPU 11 executes a process for substituting the numerical value "1" in the result identification parameter KP for identifying the determination result if the fielder character 73 (73h) nearest to the contact position SP of the touch pen T is determined to have moved (No, in S8'). The fielder character 73 is set so as to be determined to be stationary when the fielder character 73 is initially displayed on the lower liquid crystal monitor 3b (when n=1).

The CPU 11 subsequently recognizes (S9', S10') the adjustment data MD for adjusting the selection region R for selecting the fielder character 73. In this situation, the CPU 11 recognizes the adjustment data MD to be one of either the first adjustment data MD1 that corresponds to the case in which the fielder character 73 is stationary, or the second adjustment data MD2 that corresponds to the case in which the fielder character 73 has moved.

Specifically, the CPU 11 recognizes (S9') the adjustment data MD to be the first adjustment data MD1 that corresponds to the case in which the fielder character 73 is stationary when the fielder character 73 has been deter lined to be stationary (Yes, in S8' if the value of the result identification parameter KP is "0"). Conversely, the CPU 11 recognizes (S10) the adjustment data MD to be the second adjustment data MD2 that corresponds to the case in which the fielder character 73 has moved when the fielder character 73 has been determined to have moved (No, in S8' if the value of the result identification parameter KP is "1"). Here, the second adjustment data MD2 is set to the predetermined value so as to be greater than 0 and less than the first adjustment data MD1. The first adjustment data MD1 is set to the predetermined value so as to be less than the minimum gap data D_min. The selection region R can thereby be set up so that the selection region R when the button object 71 has moved is greater than the selection region R when the button object 71 is stationary.

The correspondence relationship between the determination result (result identification parameter KP), and the first adjustment data MD1 and the second adjustment data MD2 is defined in advance in the game program, as shown in FIG. 8.

Next, the CPU 11 sets (S11) the selection region R for selecting the fielder character 73 on the basis of the minimum gap data D_min extracted by the CPU 11. Specifically, the diameter data RK (=D_min−MD, definition data) indicating the length of the diameter of the circular selection region R is computed by subtracting the adjustment data MD from the minimum gap data D_min. The CPU 11 recognizes as the selection region R the circular region about the contact position SP of the touch pen T and having a diameter indicated by the length of the diameter data RK (definition data). Thus, the CPU 11 sets the circular selection region R on the basis of the contact position SP in which the touch pen T has made contact with the lower liquid crystal monitor 3b.

At this point, the CPU 11 recognizes (S12') the coordinate data inside the selection region R. For example, the CPU 11 recognizes the coordinate data inside the circular selection region R if the selection region R is set to be circular as described above.

Next, the CPU 11 determines (S13') whether the coordinate data inside the display region of the fielder character 73 matches the coordinate data inside the circular selection region R. For example, the CPU 11 determines whether at least one set of coordinate data inside the display region of the fielder character 73 displayed on the lower liquid crystal monitor 3b matches at least one set of coordinate data inside the circular selection region R in which the contact position SP of the touch pen T is defined as a reference.

Figure 13:
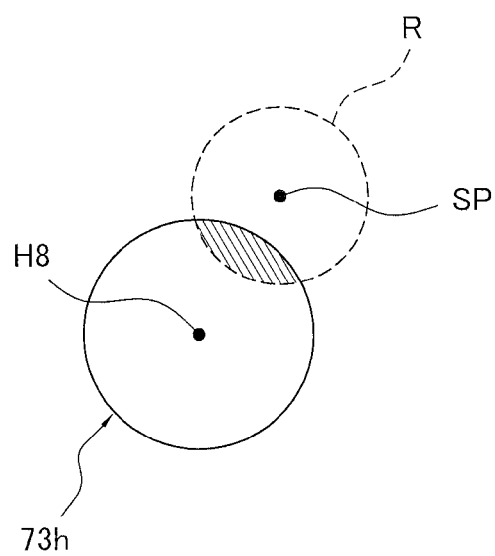
FIG. 13 shows a fielder character selected by the selection region.

When the CPU 11 has determined that the coordinate data inside the display region of the fielder character 73 matches the coordinate data inside the selection region R (Yes, in S13'), the CPU 11 recognizes (S14) the fielder character 73 for which the coordinate data have matched as the fielder character selected by the touch pen T. Specifically, when the CPU 11 has determined that at least one set of coordinate data inside the display region of the fielder character 73 (73h) displayed on the lower liquid crystal monitor 3b matches at least one set of coordinate data inside the selection region R in which the contact position SP of the touch pen T is defined as a reference, it is determined that the selection region R overlaps the display region of the fielder character 73 (73h) (see the shaded portions of FIG. 13). At this point, the fielder character 73 (73h) for which the coordinate data have matched is recognized by the CPU 11 as the object selected by the touch pen T.

The fielder character 73 is not selected by the touch pen T when the CPU 11 has not determined there to be a match between the coordinate data inside the display region of the fielder character 73 and the coordinate data inside the selection region R (No, in S13'). In this case, the process of step 7 (S7') is executed again by the CPU 11.

Embodiment 2, Embodiment 2'

Description of Various Means in the Game Device

Figure 15:
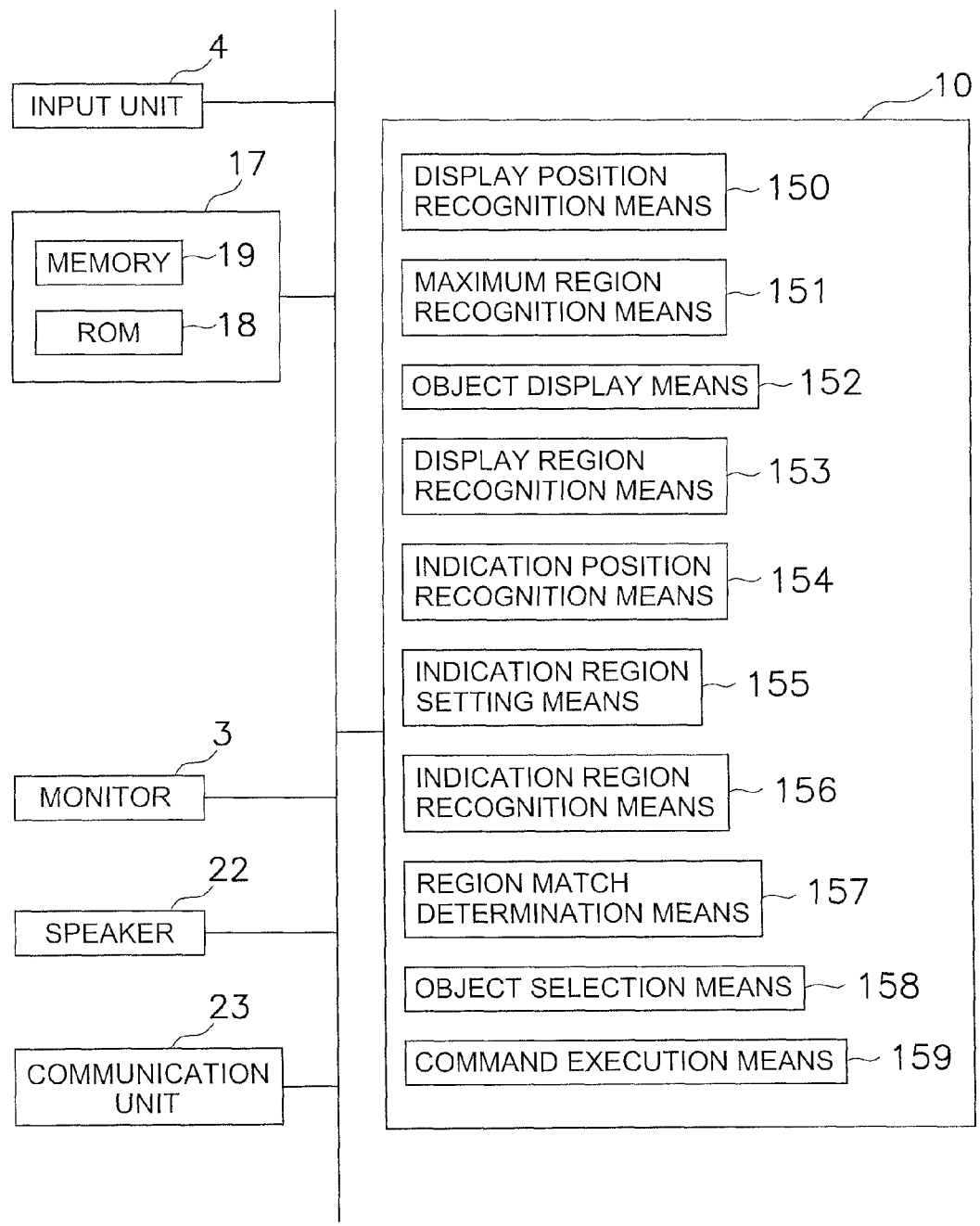
FIG. 15 is a block diagram for illustrating means that function in a baseball game.

Games executed in the game machine 1 include a baseball game, for example. In the game machine 1, a plurality of objects can be displayed on the lower liquid crystal monitor 3b of the liquid crystal monitor unit 3. FIG. 15 is a functional block diagram for describing functions that perform major roles in the present invention.

Display position recognition means 150 is provided with a function for causing the CPU 11 to recognize coordinate data that indicate the display position for displaying an object on the lower liquid crystal monitor 3b.

The CPU 11 thereby recognizes the coordinate data indicating the display position for displaying an object on the lower liquid crystal monitor 3b. For example, the coordinate data indicating the display position of each object is stored in the RAM 13 when the baseball game program is loaded from the ROM 12. First, the above-described coordinate data stored in the RAM 13 is recognized by the CPU 11 when a command for displaying an object is issued by the CPU 11.

Maximum region recognition means 151 is provided with a function for causing the control unit to recognize data for defining a maximum range of the indication region that expands using the indication position as a base point.

The control unit thereby recognizes data defining the maximum range of the indication region that expands using the indication position as a base point. When the shape of the indication region is circular, for example, the control unit recognizes as the maximum step data D_max the maximum value of the number of steps when the indication region expands in a stepwise fashion. The data is stored in the RAM 13 when the baseball game program is loaded from the ROM 12.

Object display means 152 is provided with a function for displaying each of a plurality of objects on the lower liquid crystal monitor 3b using image data on the basis of the coordinate data indicating the display positions of each of the objects.

Each of a plurality of objects is thereby displayed on the lower liquid crystal monitor 3b using image data on the basis of the coordinate data indicating the display positions of each of the objects. For example, when the CPU 11 issues a command for displaying an object, each of the objects is displayed on the lower liquid crystal monitor 3b on the basis of the coordinate data when the CPU 11 recognizes the coordinate data indicating the display positions of the objects stored in the RAM 13.

Specifically, the CPU 11 issues a command for arranging objects so that the center-of-gravity position of each of the objects matches the display positions of the objects on the lower liquid crystal monitor 3b. At this point, each of the objects is displayed on the lower liquid crystal monitor 3b using the image data.

Display region recognition means 153 is provided with a function for causing the CPU 11 to recognize the coordinate data inside the display region of each of a plurality of objects displayed on the lower liquid crystal monitor 3b.

The CPU 11 recognizes the coordinate data inside the display regions of each of the objects displayed on the lower liquid crystal monitor 3b. For example, the CPU 11 recognizes the coordinate data inside the display region of each object displayed on the lower liquid crystal monitor 3b when the objects are displayed on the lower liquid crystal monitor 3b.

In this case, the CPU 11 recognizes the coordinate data inside the display region of each object in a coordinate system in which the center position of the lower liquid crystal monitor 3b is the origin. Coordinate data that corresponds to the display position of each object is also included in the coordinate data inside the display regions of the objects recognized by the CPU 11.

Indication position recognition means 154 is provided with a function for causing the CPU 11 to recognize the indication position indicated by the indication means on the basis of an input signal from the input means.

The CPU 11 thereby recognizes the indication position indicated by the indication means on the basis of the input signal from the input means. For example, when the input means is the lower liquid crystal monitor 3b and the indication means is a touch pen, the input signal indicating the contact position of the touch pen is fed from the touch input detection circuit 14a to the CPU 11 when the touch pen has made contact with the lower liquid crystal monitor 3b. The CPU 11 recognizes the coordinate data indicating the contact position of the touch pen on the basis of the input signal.

Indication region setting means 155 is provided with a function for causing the CPU 11 to set the indication region that expands in range using the indication position as a base point. The indication region setting means 155 is provided with a function for causing the CPU 11 to set the indication region so that the expansion ratio of the indication region decreases in accordance with time beginning from when the indication position is recognized by the CPU 11.

The CPU 11 thereby executes a process for measuring the time t from this time point to when the contact position of the touch pen is recognized by the CPU 11. The CPU 11 executes a process for expanding the indication region when the time (measured time) t thus measured has reached a predetermined time ts. Here, the CPU 11 executes a process for expanding the indication region when the CPU 11 has determined that the measured time t is equal (t=ts) to a predetermined time ts, e.g., $\frac{1}{240}$ (sec), $\frac{1}{120}$ (=$\frac{2}{240}$) (sec), and $\frac{1}{80}$ (=$\frac{3}{240}$) (sec). In other words, the CPU 11 executes the process for expanding the indication region in three steps using as a reference when the touch pen has made contact with the lower liquid crystal monitor 3b.

When the indication region is to be expanded, the radius data (definition data) for defining the indication region is set so that the expansion ratio of the indication region is reduced in accordance with the time from when the touch pen has made contact with the lower liquid crystal monitor 3b. Accordingly, it is possible to set on the lower liquid crystal monitor 3b an indication region in which the expansion ratio of the indication region is reduced in accordance with the time from when the touch pen has made contact with the lower liquid crystal monitor 3b.

Indication region recognition means 156 is provided with a function for causing the CPU 11 to recognize coordinate data inside the indication region.

The CPU 11 thereby recognizes the coordinate data inside the indication region. For example, the CPU 11 recognizes the coordinate data inside the circular indication region if the indication region has been set to be circular as described above.

Region match determination means 157 is provided with a function for causing the CPU 11 to determine whether the coordinate data inside the display region of an object matches the coordinate data inside the indication region.

The CPU 11 thereby determines whether the coordinate data inside the display region of an object matches the coordinate data inside the indication region. For example, the CPU 11 determines whether at least one set of coordinate data inside the display region of an object displayed on the lower liquid crystal monitor 3b matches at least one set of coordinate data inside the indication region in which the contact position of the touch pen is defined as a reference.

Object selection means 158 is provided with a function for causing the CPU 11 to recognize as the selected object an object for which the coordinate data has matched, for the case in which the CPU 11 has determined that the coordinate data inside the display region of the object matches the coordinate data inside the indication region.

Specifically, the object selection means 158 is provided with a function for causing the CPU 11 to recognize the object for which a match exists between the coordinate data as the selected object if the CPU 11 has determined that the coordinate data inside the display region of a single object has matched the coordinate data inside the indication region. The object selection means 158 is also provided with a function for causing the CPU 11 to issue a command for stopping the process for selecting an object when the CPU 11 has determined that the coordinate data inside the display regions of the objects simultaneously matches the coordinate data inside the indication region.

The CPU 11 thereby recognizes the object for which a match exists between the coordinate data as the object selected by the touch pen, for the case in which the CPU 11 has determined that the coordinate data inside the display region of the single object matches the coordinate data inside the indication region. For example, when the CPU 11 has determined that at least one set of coordinate data inside the display region of a single object matches at least one set of coordinate data inside the indication region that expands in accordance with time, the CPU 11 determines that the indication region overlaps the display region of the object and recognizes the object selected by the touch pen.

The CPU 11 thereby issues a command for stopping the process for selecting an object when the CPU 11 has determined that the coordinate data inside the display regions of the objects simultaneously matches the coordinate data inside the indication region. For example, the CPU 11 issues a command for stopping the process for selecting an object when the CPU 11 has determined that at least one set of coordinate data inside the display regions of a plurality of objects simultaneously matches at least one set of coordinate data inside the indication region that expands in accordance with time.

Command execution means 159 is provided with a function for causing the CPU 11 to execute a command assigned to a selected object when a single frame time has elapsed from when the indication position is recognized by the CPU 11.

The CPU 11 thereby executes a command assigned to a selected object when a single frame time has elapsed from when the contact position of the touch pen is recognized by the CPU 11. For example, the button object overlapped by the indication region is selected within a single frame time. The command assigned to the button object overlapped by the indication region is executed when a single frame time has elapsed.

Figure 20:
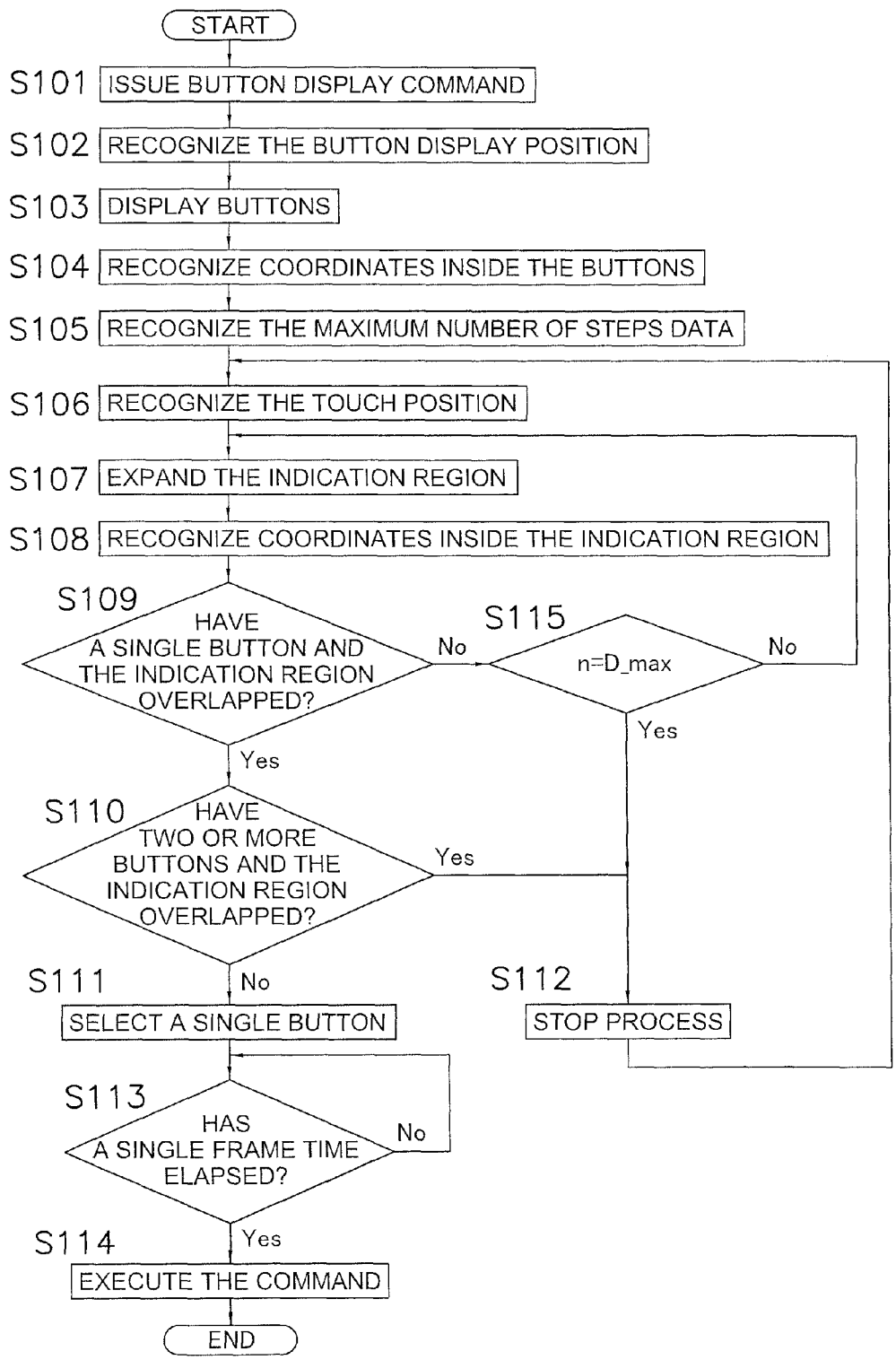
FIG. 20 is a flowchart for illustrating the object selection system in the present baseball game.

Description of the Processing Flow of the Object Selection System in a Baseball Game Next, the content of Embodiment 2 of the object selection system, in a baseball game for example, will be described. The flow related to the object selection system shown in FIG. 20 will be described at the same time.

Figure 16:
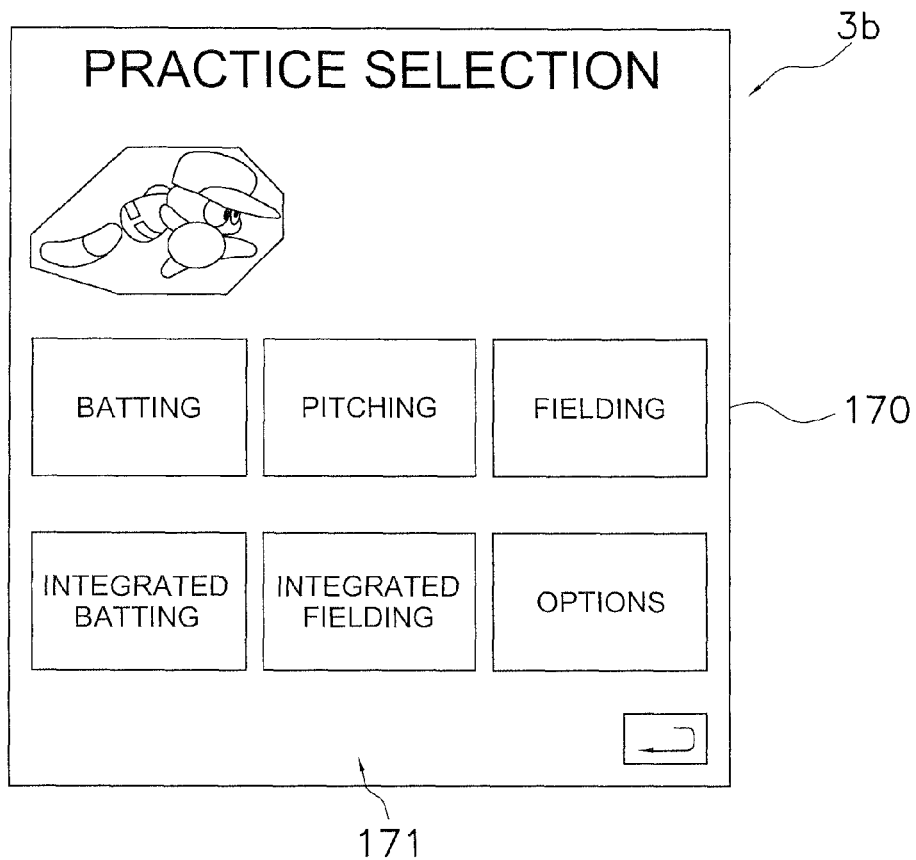
FIG. 16 illustrates a practice selection screen.

For example, in a baseball game, a practice selection screen 170 such as that shown in FIG. 16 is displayed on the lower liquid crystal monitor 3b when an operation practice mode is selected for practicing operation when the player is at bat, operation when the player is in the field, or another operation. A plurality of button objects 171 (171a, 171b, 171c, 171d, 171e, 171f) is arranged on the practice selection screen 170. In this case, the button objects 171 include five button objects (batting practice button 171a, pitching practice button 171b, fielding practice button 171c, integrated at-bat practice button 171d, and integrated fielding practice button 171e) for indicating the practice mode, a button object (option button) 171f for setting the details of the practice mode, as well as other objects.

When an operation practice mode is selected, the CPU 11 issues (S101) a display command for displaying, e.g., the button objects 171 described above on the lower liquid crystal monitor 3b. At this point, the CPU 11 recognizes (S102) coordinate data indicating the display positions H (H1, H2, H3, H4, H5, H6) for displaying the button objects 171 on the lower liquid crystal monitor 3b. The coordinate data indicating the display positions H of the button objects 171 are defined in advance in the game program and are stored in the RAM 13.

When the CPU 11 recognizes the coordinate data indicating the display positions H of the button objects 171 (171a, 171b, 171c, 171d, 171e, 171f), the CPU 11 issues a command for arranging the button objects in the display positions H of the button objects 171a, 171b, 171c, 171d, 171e, 171f indicated by the coordinate data. At this point, the button objects 171a, 171b, 171c, 171d, 171e, 171f are displayed (S103) on the lower liquid crystal monitor 3b using the image data for the button objects.

Specifically, the button objects 171a, 171b, 171c, 171d, 171e, 171f are displayed on the lower liquid crystal monitor 3b using the image data so that the center-of-gravity positions of the button objects 171a, 171b, 171c, 171d, 171e, 171f match the display positions H of the button objects in the lower liquid crystal monitor 3b. The image data that correspond to the button objects 171a, 171b, 171c, 171d, 171e, 171f are stored in the RAM 13.

Next, the CPU 11 recognizes (S104) the coordinate data inside the display regions of the button objects 171 displayed on the lower liquid crystal monitor 3b. Specifically, the CPU 11 recognizes the coordinate data inside the display region of the button objects 171 in a coordinate system in which the origin is the center position (center-of-gravity position) of a rectangular range in which an image can be displayed on the lower liquid crystal monitor 3b. Here, the coordinate data that corresponds to the display positions H of the button objects 171 are included in the coordinate data inside the display regions of the button objects 171 recognized by the CPU 11.

The control unit recognizes (S105) the data for defining the maximum range of the indication region R (R1, R2, R3) indicated by the touch pen T in order to select the button object 171. For example, if the shape of the indication region R (R1, R2, R3) is circular, the control unit recognizes as the maximum step data D_max the maximum value of the number of steps when the indication region R (R1, R2, R3) expands in a stepwise fashion. In this case, the value indicated by the maximum step data D_max is set to a numerical value of "3."

Figure 17:
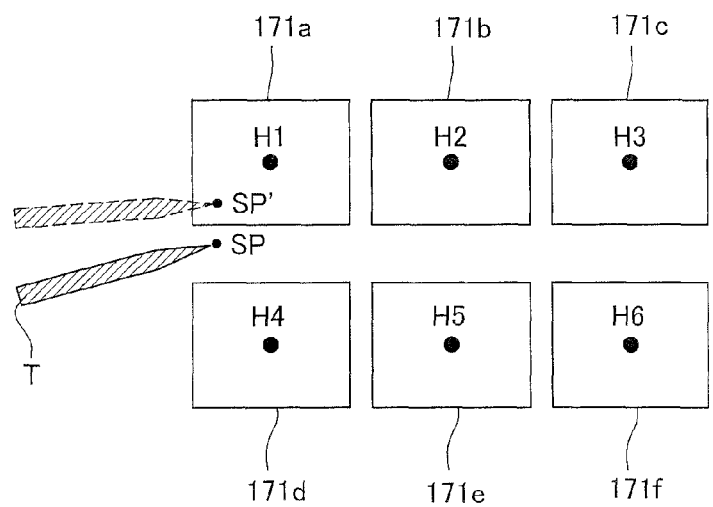
FIG. 17 shows the positional relationship between the button and the contact position of the touch pen.

Next, in the state in which the button objects 171 are displayed on the lower liquid crystal monitor 3b, as shown in FIG. 16, the input signal indicating the contact position SP of the touch pen T which has made contact with the lower liquid crystal monitor 3b is fed from the touch input detection circuit 14a to the CPU 11 when the player brings the touch pen T into contact with the lower liquid crystal monitor 3b in order to select the desired button object 171a, as shown in FIG. 17. The CPU 11 recognizes (S106) the coordinate data indicating the contact position SP of the touch pen T on the basis of the input signal.

Next, the CPU 11 executes a process for measuring the time t from this time point to when the contact position SP of the touch pen T is recognized by the CPU 11. The CPU 11 executes (S107) a process for expanding the indication region R (R1, R2, R3) when the time (measured time) t thus measured has reached a predetermined time ts.

Figure 18:
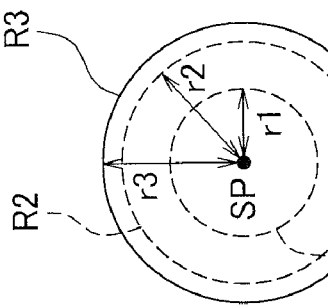
FIG. 18 illustrates the indication region to be expanded.
Figure 18:
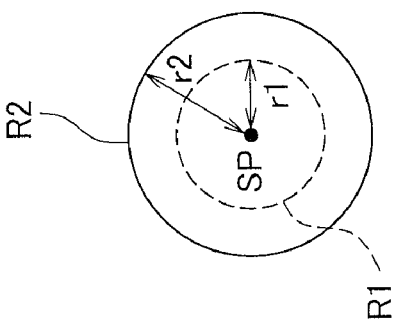
Figure 18:
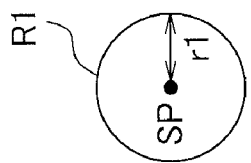
Figure 18:
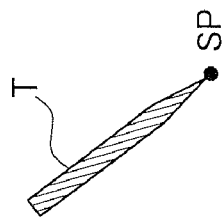

Next, the CPU 11 executes the process for expanding the indication region R (R1, R2, R3) in the following manner. For example, the CPU 11 first recognizes the radius data r1 that corresponds to a predetermined time ts1 if the measured time t is equal to the predetermined time ts1, e.g., 1/240 (sec) (t=ts1=1/240), as shown in FIG. 18, if the shape of the indication region R (R1, R2, R3) is circular. At this point, the CPU 11 recognizes the indication region R1 defined by the radius data r1 about the contact position SP of the touch pen T.

Next, the CPU 11 recognizes the radius data r2 (>r1) that corresponds to a predetermined time ts2 if the measured time t is equal to the predetermined ts2, e.g., 1/120 (sec) (t=ts2=1/120). At this point, the CPU 11 recognizes the indication region R2 defined by the radius data r2 about the contact position SP of the touch pen T.

Lastly, the CPU 11 recognizes the radius data r3 that corresponds to a predetermined time ts3 if the measured time t is equal to the predetermined ts3, e.g., 1/80 (sec) (t=ts3=1/80). At this point, the CPU 11 recognizes the indication region R3 defined by the radius data r3 about the contact position SP of the touch pen T.

In this manner, the CPU 11 executes a process for expanding the indication region R (R1, R2, R3) if the CPU 11 has determined that the measured time t is equal to any one of the predetermined times ts; i.e., the predetermined times ts1, ts2, ts3, e.g., 1/240 (=ts1) (sec), 1/120 (=2/240=ts2) (sec), and 1/80 (=3/240)=ts3) (sec). In other words, in this case, the CPU 11 executes a process for expanding the indication region R (R1, R2, R3) in three steps using as a reference when the touch pen T has been brought into contact with the lower liquid crystal monitor 3b.

The number of steps used for expanding the indication region R (R1, R2, R3) is defined by the maximum step data D_max. Here, the value indicated by the maximum step data D_max is the numerical value "3." Accordingly, the number of steps data n is a value "1," "2," or "3 (=D_max)" if the number of steps data n is data indicating the number of steps when the indication region R (R1, R2, R3) expands. The predetermined time ts can be expressed in the following manner when the number of steps data n and the maximum step data D_max are used. When a single frame time is set to 1/60 (sec), the predetermined time ts can be expressed in the formula "n/(60X(D_max+1)), where n=1, 2, or 3." The expansion of the indication region R is thus ended within a single frame time because the value of the predetermined time ts is set so as to be less than the value of a single frame time.

With the process for expanding the indication region R (R1, R2, R3), the radius data r (r1, r2, r3) (definition data) for defining the indication region is set so that the expansion ratio of the indication region R (R1, R2, R3) decreases in accordance with time that begins from when the touch pen T has been brought into contact with the lower liquid crystal monitor 3b. Therefore, it is possible to set the indication region R (R1, R2, R3) in which the expansion ratio of the indication region is reduced in accordance with time that begins from when the touch pen T has been brought into contact with the lower liquid crystal monitor 3b.

Here, the relationship "r3>r2>r1>0.0" holds true between the radius data r1, r2, r3 described above. In addition to this relationship, the relationship "(r3−r2)>(r2−r1)>r1" holds true between the radius data r1, r2, r3 described above (see FIG. 18). The extent (the expansion ratio in accordance with time) to which the indication region R (R1, R2, R3) expands in accordance with time can be reduced by setting the radius data r1, r2, r3 so that the relationship "(r3−r2)>(r2−r1)>r1" holds true.

The correspondence relationship between the predetermined time is described above and the radius data r1, r2, r3 is defined in advance in the game program. A table indicating the correspondence relationship is stored in the RAM 13. Hereinbelow, the radius data r1 will be referred to as first radius data, the radius data r2 as second radius data, and the radius data r3 as third radius data. The circular indication regions R (R1, R2, R3) corresponding to the first radius data r1, the second radius data r2, and the third radius data r3, may be referred to as the first indication region R1, the second indication region R2, and the third indication region R3, respectively. The expression "indication region" as used in the present embodiment is an expression that includes the point indicating the contact position SP of the touch pen T. Accordingly, hereinbelow, the point indicating the contact position SP of the touch pen T may be referred to as the $0^{th}$ indication region.

As described above, the CPU 11 recognizes (S108) the coordinate data inside the indication region R (R1, R2, R3) when the CPU 11 executes a process for expanding the indication region R (R1, R2, R3). For example, the CPU 11 recognizes the coordinate data inside the circular indication region R (R1, R2, R3) when the indication region R (R1, R2, R3) is set to be circular as described above.

Next, the CPU 11 determines (S109) whether the coordinate data inside the indication region R (R1, R2, R3) matches the coordinate data inside the display region of the button object 171. For example, the CPU 11 determines whether at least one set of coordinate data inside the display region of the button object 171 displayed on the lower liquid crystal monitor 3b matches at least one set of coordinate data inside the indication region R (R1, R2, R3) in which the contact position SP of the touch pen T is defined as a reference.

Figure 19:
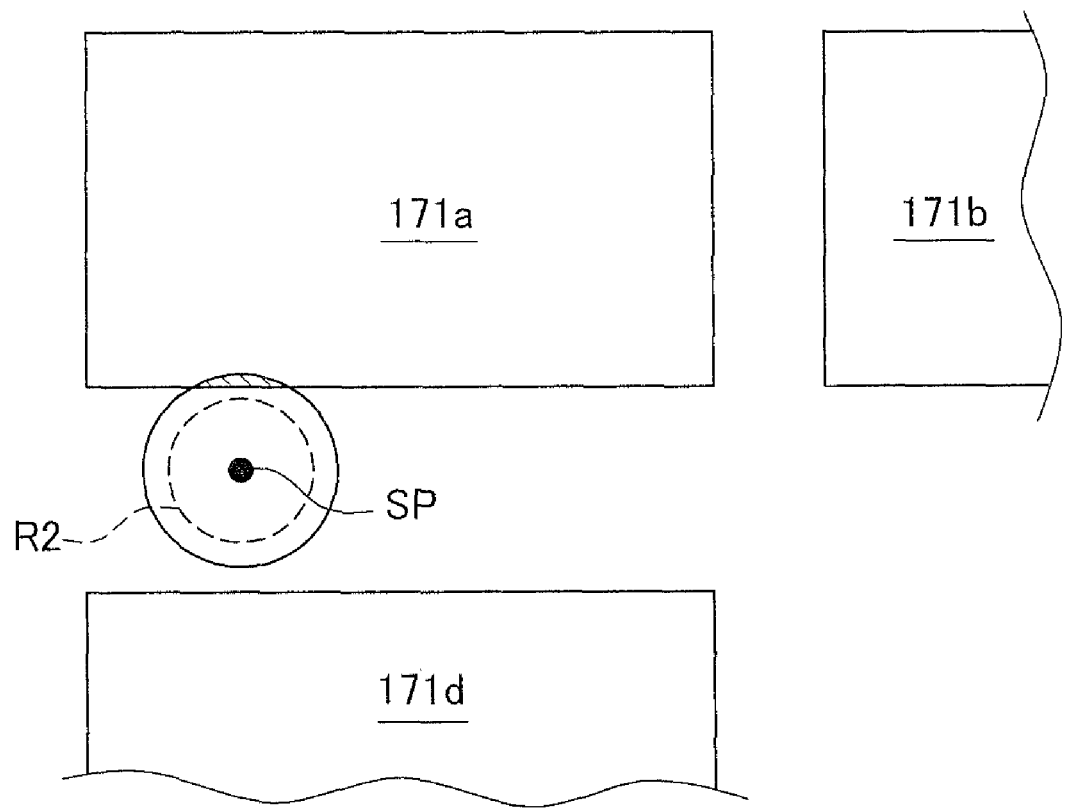
FIG. 19 shows the object selected by the selection region.

When the CPU 11 has determined that at least one set of coordinate data inside the display region of a single button object 171 matches at least one set of coordinate data inside the indication region R (R1, R2, R3) which expands in accordance with time (Yes, in S109), the CPU 11 determines (S110) whether the coordinate data inside the display regions of the button objects 171 simultaneously matches the coordinate data inside the indication region R (R1, R2, R3), as shown in FIG. 19. When the CPU 11 has determined that the coordinate data inside the indication region R (R1, R2, R3) does not simultaneously match the coordinate data inside the display region of a plurality of button objects 171 (No, in S110), the CPU 11 determines that the indication region R (R1, R2, R3) has overlapped the display region of one button object 171 and recognizes (S111) the button object 171 selected by the touch pen T.

FIG. 19 shows an example of the case in which at least one set of coordinate data inside the display region of the button object 171a matches at least one set of coordinate data inside the indication region (second indication region) R2 expanded in two steps.

Specifically, the CPU 11 determines that the indication region has overlapped the display region of the button object 171 and recognizes one button object 171 selected by the touch pen T only if at least one set of coordinate data inside the display region of a single button object 171 matches the coordinate data indicating the contact position SP' ($0^{th}$ indication region) of the touch pen T. This case corresponds to the case in which a button object 171 has been directly selected by the touch pen T.

The CPU 11 determines that the indication region R (R1, R2, R3) has overlapped the display region of one button object 171 and recognizes one button object 171 selected by the touch pen T if at least one set of coordinate data inside the display region of one button object 171 matches at least one set of coordinate data inside the indication region R (any one indication region among the first indication region R1, second indication region R2, and third indication region R3) defined by any one of the first radius r1, the second radius r2, and the third radius r3 about the contact position SP of the touch pen T. This case corresponds to the case in which a button object 171 has been selected by the indication region R (R1, R2, R3).

On the other hand, the CPU 11 determines (S115) whether the number of steps data n is equal to D_max (=3) if the CPU 11 has determined that at least one set of coordinate data inside the display region of a single button object 171 does not match at least one set of coordinate data inside the indication region R (R1, R2, R3) which expands in accordance with time (No, in S109). When the CPU 11 has determined that the number of steps data n is equal to D_max (=3) (Yes, in S115; n=D_max=3), the CPU 11 does not recognize the button object 171 and executes a later-described process of step 12 (S112). Here, when the CPU 11 has determined that the number of steps data n is not equal to D_max (=3) (No, in S115; n=1, 2, or n<D_max), the process of step 107 (S107) is executed again.

The CPU 11 issues (S112) a command for stopping the process for selecting the button object 171 if the CPU 11 has determined that the coordinate data inside the display regions of the button objects 171 has simultaneously matched the coordinate data inside the indication region R (R1, R2, R3) (Yes, in S110). Specifically, the CPU 11 issues a command for stopping the process for selecting the button object 171 if at least one set of coordinate data inside the display regions of the button objects 171 matches at least one set of coordinate data inside the indication region R (any one indication region among the first indication region R1, second indication region R2, and third indication region R3) defined by any one of the first radius data r1, the second radius r2, and the third radius r3 about the contact position SP of the touch pen T. At this point, the process for selecting the button object 171 is stopped and the process of step 106 (S106) is executed again.

Next, the CPU 11 determines (S113) whether a single frame time has elapsed from when the CPU 11 recognizes the contact position SP of the touch pen T. The CPU 11 executes (S114) a command assigned to the selected object if the CPU 11 has determined that a single frame time has elapsed from when the CPU 11 recognizes the contact position SP of the touch pen T (Yes, in S113). For example, when a single frame time has elapsed, the CPU 11 executes a command assigned to the batting practice button 171a selected within a single frame time if the button object 171 over which the indication region R (R1, R2, R3) has overlapped is the batting practice button 171a. The CPU 11 executes a command for starting the execution of, e.g., the batting practice event when a single frame time has elapsed.

The CPU 11 repeatedly executes the process of step 113 (S113) until the CPU 11 recognizes that a single frame time has elapsed from when the CPU 11 recognizes the contact position SP of the touch pen T.

The embodiment described above describes a case in which the button object 171 does not move, but the present invention may also be applied to the case in which the button object 171 moves. For example, the present invention may be applied to the case in which the screen is changed and the layout of the button object 171 is modified.

The embodiment described above describes a case in which the size of the maximum range of the indication region R is not defined, but the specific size of the maximum range R3 of the indication region R described above is preferably set in the following manner.

For example, when the button object 171 is rectangular and the length of the long side of the button object 171 is L1, the maximum range R3 of the circular indication region R is defined by setting the maximum value that the diameter of the indication region R can assume to be substantially L1/2(=2×r3).

The maximum range R3 of the circular indication region R is defined by setting the number of dots that correspond to the maximum diameter (=2×r3) of the indication region R to DT/2 dots (e.g., 20 dots) if the number of dots of the L1 width of the button object 171 is DT dots (e.g., 40 dots). In general, the length of a single dot differs depending on the resolution of the monitor screen. However, the indication region R can be defined without dependence on the resolution of the monitor screen by defining the maximum range R3 of the indication region R in terms of the number of dots as described above.

As described above, the button object 171 can be prevented from being mistakenly selected if the indication region R is formed in a position set at a considerable distance from the button object 171 by defining the maximum range R3 of the indication region R. The button object 171 can be selected by the time the indication region R expands to the maximum range R3 (including R3) if the indication region R has been formed in the vicinity of the button object 171. In this manner, the operation for selecting the button object 171 object can be executed without unpleasant sensation by defining the maximum range R3 of the indication region R, no matter where the indication region R is formed.

Here, an example of the case in which the object is rectangular is described, but the maximum range R3 of the indication region R can be set in the same manner as described above, even when the object 171 is, e.g., circular. For example, the maximum range R3 of the circular indication region R is defined by setting the maximum value that the diameter of the indication region R can assume to be substantially L2/2(=2×r3), wherein L2 is the diameter of the object. In the case of an object having a concavo-convex outer periphery, a circle is envisioned to be in contact with the outer periphery. When the diameter of the circle is set to a typical length, the maximum range R3 of the indication region R can be defined in the same manner as described above.

An example of the case in which the object is a button was described in the embodiment above, but the present invention may also be applied to the case in which the object is a character. For example, in a baseball game, the present invention may be applied to the case in which a player character is selected using a touch pen T. In this case, the player character can be selected using the touch pen T whether the player character is stationary or moving.

Thus, the reason that the present invention can be applied to the case in which an object is stationary as well as to the case in which an object is moving is that, in the present invention, processing is completed within a single frame time. In other words, an object can be selected using indication means (e.g., the touch pen T or the like) in the present invention regardless of whether the object is stationary or moving.

Figure 21:
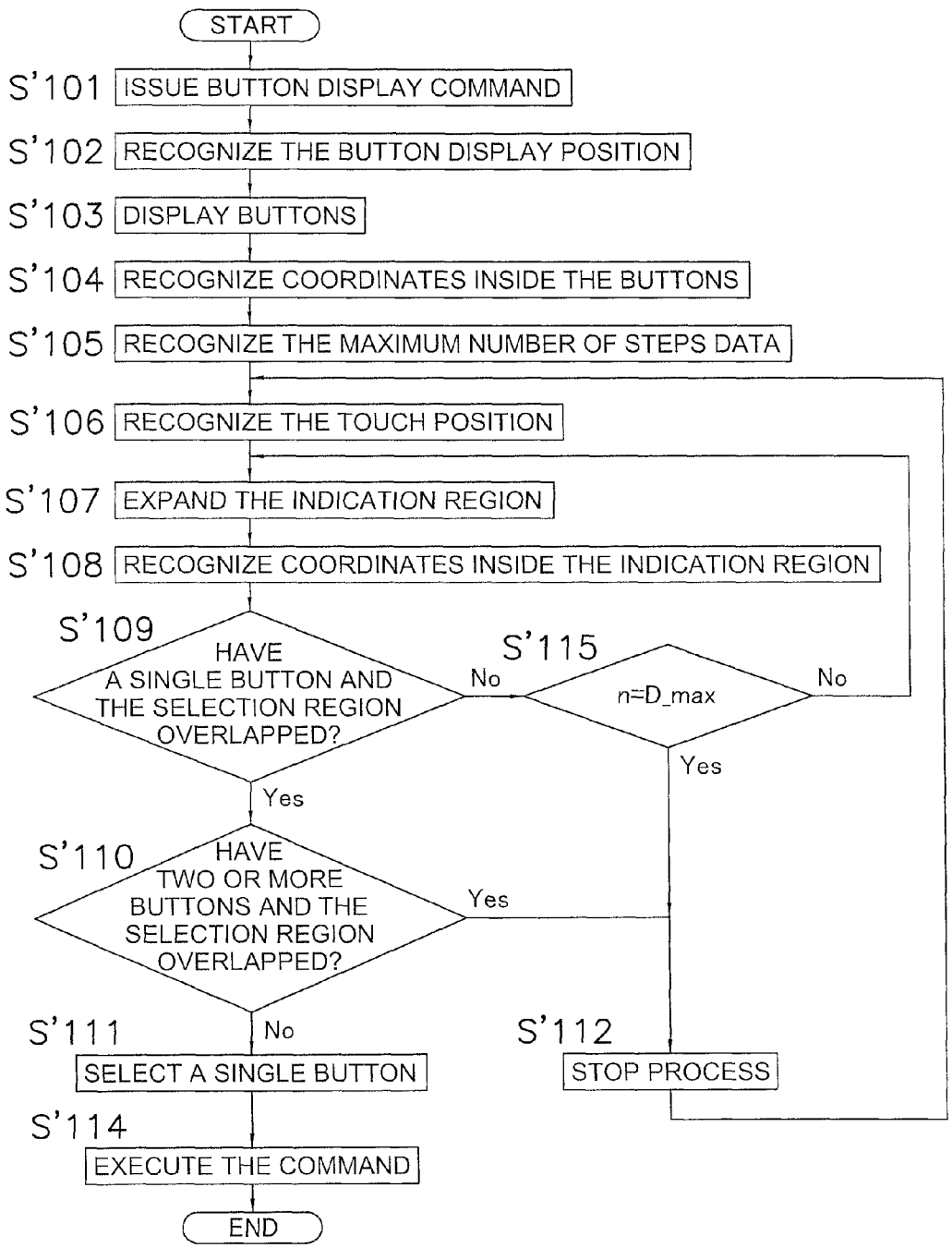
FIG. 21 is a flowchart for illustrating the object selection system in the present baseball game.

Next, the details of another second embodiment (Embodiment 2') of the object selection system, in a baseball game for example, will be described. The flow related to the object selection system shown in FIG. 21 will also be described at the same time.

Embodiment 2' described herein is different from Embodiment 2 described above in the use of step 113 of Embodiment 2. In other words, step 113 carried out in Embodiment 2 is not carried out in Embodiment 2'.

The same processing carried out in Embodiment 2 is carried out in Embodiment 2', except for the portion of step 113 of Embodiment 2. Accordingly, a detailed description, as well as a description of the effects, is omitted for the portion in which the same processing as in Embodiment 2 is carried out. Also omitted in Embodiment 2' is a description of the other modes shown in Embodiment 2. However, the other modes described in Embodiment 2 may also be implemented in Embodiment 2'.

A specific example of Embodiment 2' of the object selection system is described below. The steps S in which the same process is carried out as the process of Embodiment 2 are noted with a prime mark (') added to the symbol S.

For example, in a baseball game, a practice selection screen 170 such as that shown in FIG. 16 is displayed on the lower liquid crystal monitor 3b when an operation practice mode is selected for practicing operation when the player is at bat, when the player is in the field, or during other situations.

When an operation practice mode is selected, the CPU 11 issues a display command for displaying the button objects 171 on the lower liquid crystal monitor 3b (S'101). At this point, the CPU 11 recognizes coordinate data indicating the display positions H for displaying each of the button objects 171 on the lower liquid crystal monitor 3b (S'102).

At this point, the button objects 171a, 171b, 171c, 171d, 171e, 171f are displayed using image data of the button objects in the display positions H of the button objects indicated by the coordinate data (S'103). Next, the CPU 11 recognizes the coordinate data inside each of the display regions of the button objects 171 displayed on the lower liquid crystal monitor 3b (S'104).

The control unit then recognizes (S'105) the data for defining the maximum range of the indication region R (R1, R2, R3) indicated by the touch pen T in order to select the button object 171.

The CPU 11 recognizes the coordinate data indicating the contact position SP of the touch pen T when the player brings the touch pen T into contact with the lower liquid crystal monitor 3b in order to select a desired button object 171a (S'106), as shown in FIG. 17. At this point, the CPU 11 executes a process for measuring the time t from the time point to when the contact position SP of the touch pen T is recognized by the CPU 11. The CPU 11 executes a process for expanding the indication region R (R1, R2, R3) when the time (measured time) t thus measured has reached a predetermined time ts (S'107).

For example, the CPU 11 executes a process for expanding the indication region R (R1, R2, R3) when the CPU 11 has determined that the measured time t is equal to any one among 1/240 (=ts1) (sec), 1/120 (=2/240=ts2) (sec), and 1/80 (=3/240=ts3) (sec). In other words, the CPU 11 executes the process for expanding the indication region R (R1, R2, R3) in three steps using as a reference when the touch pen T has been brought into contact with the lower liquid crystal monitor 3b.

The number of steps used for expanding the indication region R (R1, R2, R3) is defined by the maximum step data D_max. Here, the value indicated by the maximum step data D_max is the numerical value "3." Accordingly, the number of steps data n is a value "1," "2," or "3 (=D_max)" if the number of steps data n is data indicating the number of steps when the indication region R (R1, R2, R3) expands. The predetermined time ts can be expressed in the following manner when the number of steps data n and the maximum step data D_max are used. When a single frame time is set to 1/60 (sec), the predetermined time ts can be expressed in the formula "n/(60X(D_max+1))", where n=1, 2, or 3. In this manner, the expansion of the indication region R is ended within a single frame time because the value of the predetermined time ts is set so as to be less than the value of a single frame time.

Next, the CPU 11 recognizes the coordinate data inside the indication region R (R1, R2, R3) (S'108). At this point, the CPU 11 determines whether the coordinate data inside the indication region R (R1, R2, R3) matches the coordinate data inside the display region of the button object 171 (S'109).

When the CPU 11 has determined that at least one set of coordinate data inside the display region of one button object 171 matches at least one set of coordinate data inside the indication region R (R1, R2, R3) which expands in accordance with time (Yes, in S'109), the CPU 11 determines whether the coordinate data inside the display regions of the button objects 171 simultaneously matches the coordinate data inside the indication region R (R1, R2, R3) (S'110), as shown in FIG. 19.

When the CPU 11 has determined that the coordinate data inside the indication region R (R1, R2, R3) does not simultaneously match the coordinate data inside the display region of the button objects 171 (No, in S'110), the CPU 11 determines that the indication region R (R1, R2, R3) has overlapped the display region of one button object 171 and recognizes the button object 171 selected by the touch pen T (S'111).

On the other hand, the CPU 11 determines whether the number of steps data n is equal to D_max (=3) if the CPU 11 has determined that at least one set of coordinate data inside the display region of a single button object 171 does not match at least one set of coordinate data inside the indication region R (R1, R2, R3) which expands in accordance with time (No, in S'109) (S'115). The CPU 11 does not recognize the button object 171 and executes a later-described process of step 112 (S'112) when the CPU 11 has determined that the number of steps data n is equal to D_max (=3) (Yes, in S'115; n=D_max=3). Here, when the CPU 11 has determined that the number of steps data n is not equal to D_max (=3) (No, in S'115; n=1, 2, or n<D_max), the process of step 107 (S'107) is executed again.

The CPU 11 issues a command for stopping the process for selecting the button object 171 (S'112) if the CPU 11 has determined that the coordinate data inside the display regions of the button objects 171 has simultaneously matched the coordinate data inside the indication region R (R1, R2, R3) (Yes, in S'110). At this point, the process for selecting the button object 171 is stopped and the processing of step 106 (S'106) is executed again.

Next, the CPU 11 executes a command assigned to the selected object (S'114) when the CPU 11 recognizes the button object 171 selected by the touch pen T (S'111).

In Embodiment 2' the command assigned to the selected button object 171 is thus immediately executed when the button object 171 is selected by the touch pen T. Specifically, the process for selecting a button object 171 with the touch pen T and carrying out a command can be reliably ended within a single frame time. In other words, when a button object 171 is selected by the touch pen T, the CPU 11 can be made to recognize the command assigned to the button object 171 before (within a single frame time) subsequent image processing is carried out.

Figure 22:
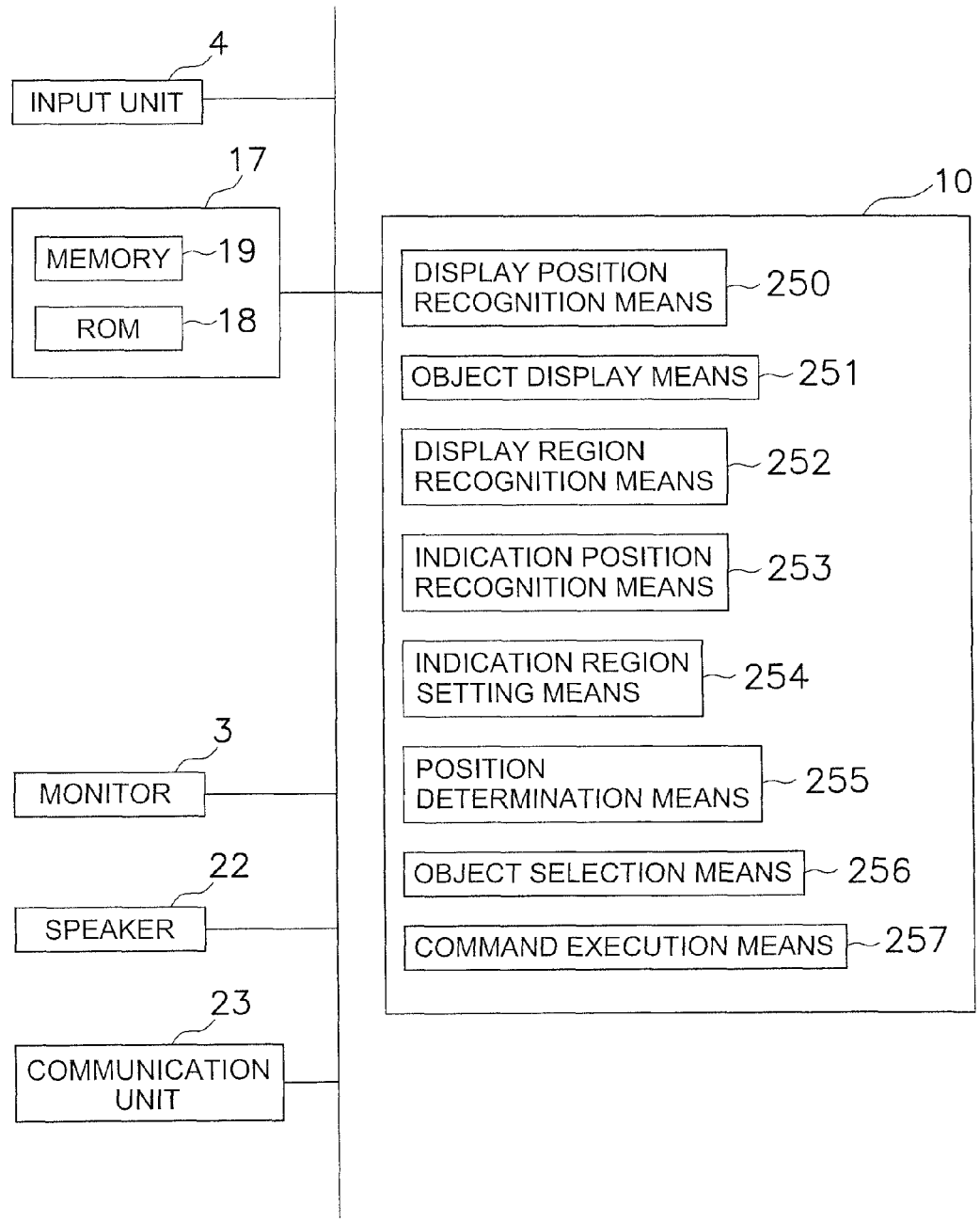
FIG. 22 is a block diagram for illustrating means that function in a baseball game.

Embodiment 3, Embodiment 3', Embodiment 3"
Description of Various Means in the Game Device Games executed in the game machine 1 include a baseball game, for example. In the game machine 1, objects required for executing a baseball game can be displayed on the lower liquid crystal monitor 3b of the liquid crystal monitor unit 3. FIG. 22 is a functional block diagram for describing functions that perform major roles in the present invention.

Display position recognition means 250 is provided with a function for causing the CPU 11 to recognize coordinate data that indicate the display positions for displaying objects on the lower liquid crystal monitor 3b.

The CPU 11 thereby recognizes the coordinate data indicating the display positions for displaying objects on the lower liquid crystal monitor 3b. For example, the coordinate data indicating the display positions of objects are stored in the RAM 13 when the baseball game program is loaded from the ROM 12. First, the above-described coordinate data stored in the RAM 13 is recognized by the CPU 11 when a command for displaying objects is issued by the CPU 11.

Object display means 251 is provided with a function for displaying objects on the lower liquid crystal monitor 3b using image data on the basis of the coordinate data indicating the display positions of the objects.

Objects are thereby displayed on the lower liquid crystal monitor 3b using image data on the basis of the coordinate data indicating the display positions of the objects. For example, when the CPU 11 issues a command for displaying objects, each of the objects is displayed on the lower liquid crystal monitor 3b on the basis of the coordinate data when the CPU 11 recognizes the coordinate data indicating the display positions of the objects stored in the RAM 13.

Specifically, the CPU 11 issues a command for arranging the objects so that the center-of-gravity positions of the objects match the display positions of the objects on the lower liquid crystal monitor 3b. At this point, the objects are displayed on the lower liquid crystal monitor 3b using the image data.

Display region recognition means 252 is provided with a function for causing the CPU 11 to recognize the coordinate data inside the display regions of the objects displayed on the lower liquid crystal monitor 3b.

The CPU 11 thereby recognizes the coordinate data inside the display regions of the objects displayed on the lower liquid crystal monitor 3b. Included in the coordinate data inside the display region of an object are first coordinate data for a boundary for forming the shape of the object, and second coordinate data for a boundary for defining the shape of the object.

In this case, the CPU 11 recognizes the coordinate data inside the display regions of the objects in a coordinate system in which the center position of the lower liquid crystal monitor 3b is used as the origin. Coordinate data that corresponds to the display positions of the objects are also included in the coordinate data inside the display regions of the objects recognized by the CPU 11.

Indication position recognition means 253 is provided with a function for causing the CPU 11 to recognize the coordinate data of the indication position indicated by the indication means on the basis of an input signal from the input means.

The CPU 11 thereby recognizes the indication position indicated by the indication means on the basis of the input signal from the input means. For example, when the input means is the lower liquid crystal monitor 3b and the indication means is a touch pen, the input signal indicating the contact position of the touch pen is fed from the touch input detection circuit 14a to the CPU 11 when the touch pen has made contact with the lower liquid crystal monitor 3b. The CPU 11 recognizes the coordinate data indicating the contact position of the touch pen on the basis of the input signal.

Indication region setting means 254 is provided with a function for causing the CPU 11 to set the indication region in which the contact position of the touch pen is used as a base point on the basis of the coordinate data of the contact position of the touch pen.

The CPU 11 thereby sets the indication region using the contact position of the touch pen as a base point on the basis of the coordinate data of the contact position of the touch pen. For example, the CPU 11 sets an indication region having a boundary in a position set at a predetermined distance from the contact position of the touch pen on the basis of the coordinate data of the contact position of the touch pen. Specifically, when the CPU 11 recognizes the contact position of the touch pen, the indication region is set by causing the CPU 11 to recognize the indication region having a boundary in a position set at a predetermined distance from the contact position of the touch pen when the contact position of the touch pen is used as a base point.

The distance data described above (distance data indicating a predetermined distance) used for setting the indication region is defined in advance in the game program and is stored in the RAM 13 when the baseball game program is loaded from the ROM 12.

Position determination means 255 is provided with a function for causing the CPU 11 to determine the positional relationship between the contact position of the touch pen and the display region of the object on the basis of the coordinate data of the contact position of the touch pen and the coordinate data inside the display region of the object.

The CPU 11 thereby determines the positional relationship between the contact position of the touch pen and the display region of the object on the basis of the coordinate data of the contact position of the touch pen and the coordinate data inside the display region of the object.

For example, the means enables the CPU 11 to determine whether the coordinate data of the contact position of the touch pen and the coordinate data inside the object match. The means enables the CPU 11 to execute a process for computing a first distance between the contact position of the touch pen and the boundary of the object on the basis of the coordinate data of the contact position of the touch pen and the first coordinate data for the boundary of the object. The CPU 11 determines whether the first distance is equal to or less than the distance from the contact position of the touch pen to the boundary of the indication region. The means enables the CPU 11 to execute a process for computing a second distance between the contact position of the touch pen and the boundary of the object on the basis of the coordinate data of the contact position of the touch pen and the second coordinate data for the boundary of the object. The CPU 11 determines whether the second distance is equal to or less than the distance from the contact position of the touch pen to the boundary of the indication region.

The means also enables the CPU 11 to execute a process for computing a third distance between the contact position of the touch pen and the display position of the object on the basis of the coordinate data of the contact position of the touch pen and the coordinate data indicating the display position of the object. The CPU 11 determines whether the third distance is equal to or less than the total distance of the distance from the contact position of the touch pen to the boundary of the indication region and the distance from the display position of the object to the boundary of the display region of the object.

Specifically, when the object is a rectangular button, the CPU 11 determines whether the coordinate data of the contact position of the touch pen matches the coordinate data inside the rectangular button. The CPU 11 executes a process for computing a first distance between the contact position of the touch pen and the boundary of the rectangular button on the basis of the coordinate data of the contact position of the touch pen and the coordinate data (first coordinate data for the boundary) of each side of the rectangular button. The CPU 11 determines whether the first distance is equal to or less than the distance from the contact position of the touch pen to the boundary of the indication region. The CPU 11 executes a process for computing a second distance between the contact position of the touch pen and the boundary of the rectangular button on the basis of the coordinate data of the contact position of the touch pen and the coordinate data (second coordinate data for the boundary) in each corner of the rectangular button. The CPU 11 determines whether the second distance is equal to or less than the distance from the contact position of the touch pen to the boundary of the indication region.

On the other hand, if the object is a circular button, the CPU 11 determines whether the coordinate data of the contact position of the touch pen matches the coordinate data inside the circular button. The CPU 11 executes a process for computing a third distance between the contact position of the touch pen and the center position of the circular button on the basis of the coordinate data of the contact position of the touch pen and the coordinate data indicating the center position of the circular button. The CPU 11 determines whether the third distance is equal to or less than the total distance of the distance from the contact position of the touch pen to the boundary of the indication region and the distance from the center position of the circular button to the boundary of the display region of the circular button.

Object selection means 256 is provided with a function for causing the CPU 11 to recognize an object as the selected object on the basis of the result of the positional relationship determination between the contact position of the touch pen and the display region of the object.

The CPU 11 thereby recognizes the object as the selected object on the basis of the result of the positional relationship determination between the contact position of the touch pen and the display region of the object.

For example, when the CPU 11 has determined that the coordinate data of the contact position of the touch pen and the coordinate data inside the object match, the means enables the CPU 11 to recognize the object as the selected object. The means enables the CPU 11 to recognize the object as the selected object if the CPU 11 has determined that the first distance is equal to or less than the distance from the contact position of the touch pen to the boundary of the indication region. Also, this means enables the CPU 11 to recognize the object as the selected object if the CPU 11 has determined that the second distance is equal to or less than the distance from the contact position of the touch pen to the boundary of the indication region. The means further enables the CPU 11 to recognize the object as the selected object if the CPU 11 has determined that the third distance is equal to or less than the total distance.

Specifically, if the object is a rectangular button, the CPU 11 recognizes the object as the selected object when the coordinate data of the contact position of the touch pen matches the coordinate data inside the rectangular button. The CPU 11 recognizes the object as the selected object if the first distance between the contact position of the touch pen and the boundary of the rectangular button is equal to or less than the distance from the contact position of the touch pen to the boundary of the indication region. Also, the CPU 11 recognizes the object as the selected object if the second distance between the contact position of the touch pen and the corner of the rectangular button is equal to or less than the distance from the contact position of the touch pen to the boundary of the indication region.

If the object is a circular button, the CPU 11 recognizes the object as the selected object when the coordinate data of the contact position of the touch pen matches the coordinate data inside the circular button. The CPU 11 recognizes the object as the selected object if the third distance between the contact position of the touch pen and the center position of the circular button is equal to or less that the total distance of the distance from the contact position of the touch pen to the boundary of the indication region and the distance from the center position of the circular button to the boundary of the display region of the circular button.

Object selection is temporarily carried out by the CPU 11 if a plurality of objects having different shapes is intermixed. For example, if rectangular buttons and circular buttons are intermixed, ultimate object selection is carried out by the CPU 11.

For example, the CPU 11 recognizes an object as the selected object when the coordinate data of the contact position of the touch pen matches the coordinate data inside any of the rectangular buttons and the circular buttons.

On the other hand, when the coordinate data of the contact position of the touch pen and the coordinate data inside any of the rectangular buttons and the circular buttons do not match, the control unit temporarily recognizes the rectangular button as the selected object if the first distance between the contact position of the touch pen and the first boundary of the rectangular button, or the second distance between the contact position of the touch pen and the second boundary of the rectangular button, is equal to or less than the distance from the contact position of the touch pen to the boundary of the indication region.

The control unit temporarily recognizes the circular button as the selected object if the third distance between the contact position of the touch pen and the display position of the circular button is equal to or less than the total distance of the distance from the contact position of the touch pen to the boundary of the indication region and the distance from the center position of the circular button to the boundary of the display region of the circular button.

The control unit ultimately recognizes the rectangular button as the selected object if the first distance or the second distance in relation to the rectangular button is less than the first distance between the contact position of the touch pen and the boundary of the circular button. Conversely, the control unit ultimately recognizes the circular button as the selected object if the first distance or the second distance in relation to the rectangular button is equal to or greater than the first distance between the contact position of the touch pen and the boundary of the circular button.

Command execution means 257 is provided with a function for causing the CPU 11 to execute a command assigned to a selected object when the CPU 11 has recognized the selected object. The CPU 11 thereby executes a command assigned to a selected object when the CPU 11 has recognized the selected object.

Description of the Processing Flow of the Object Selection System in a Baseball Game Next, the specific details of an object selection system, in a baseball game for example, will be described. The flow related to the object selection system shown in FIGS. 34 through 39 will also be described at the same time.

Figure 34:
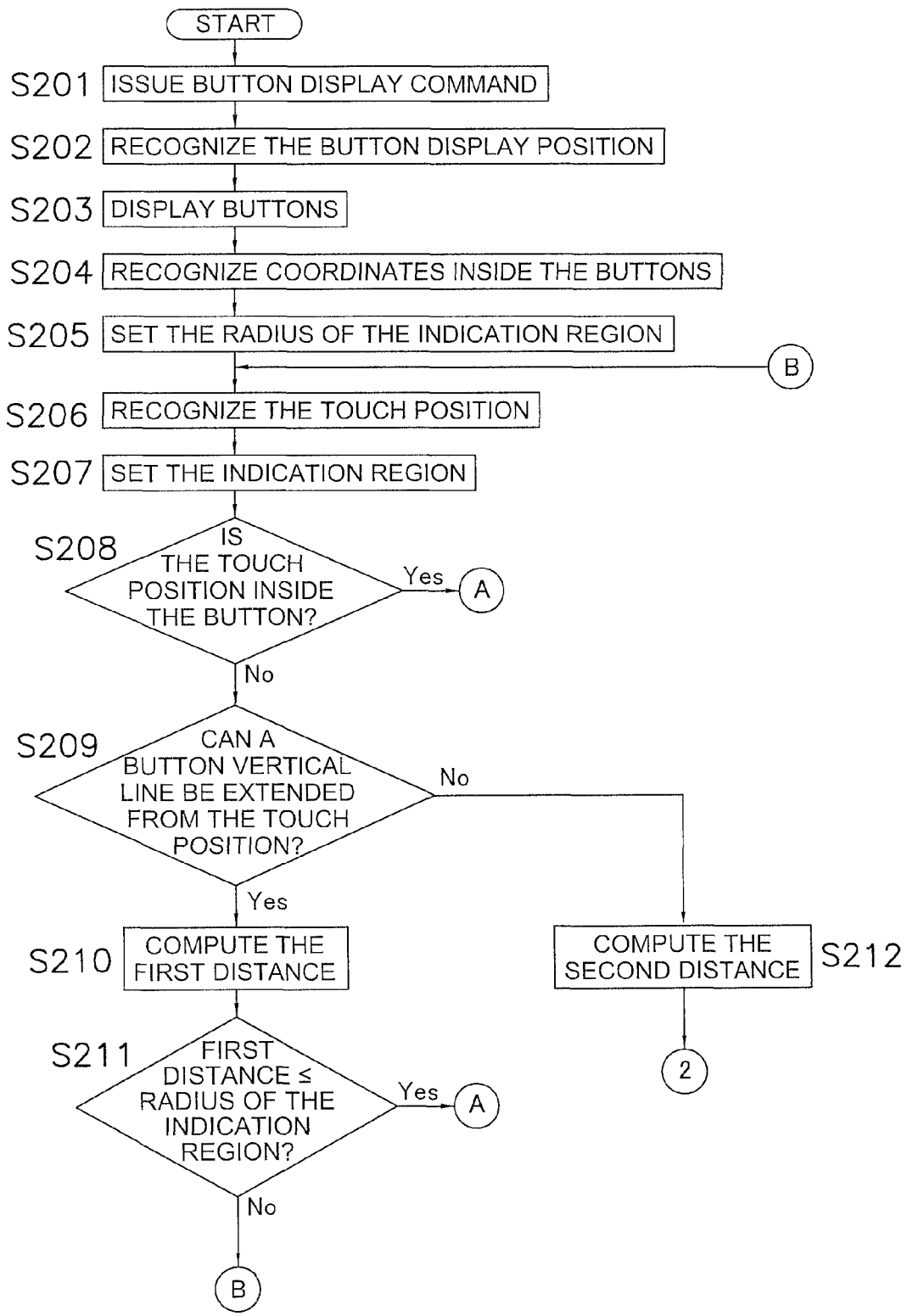
FIG. 34 is a flowchart for describing the object selection system in the present baseball game.
Figure 35:
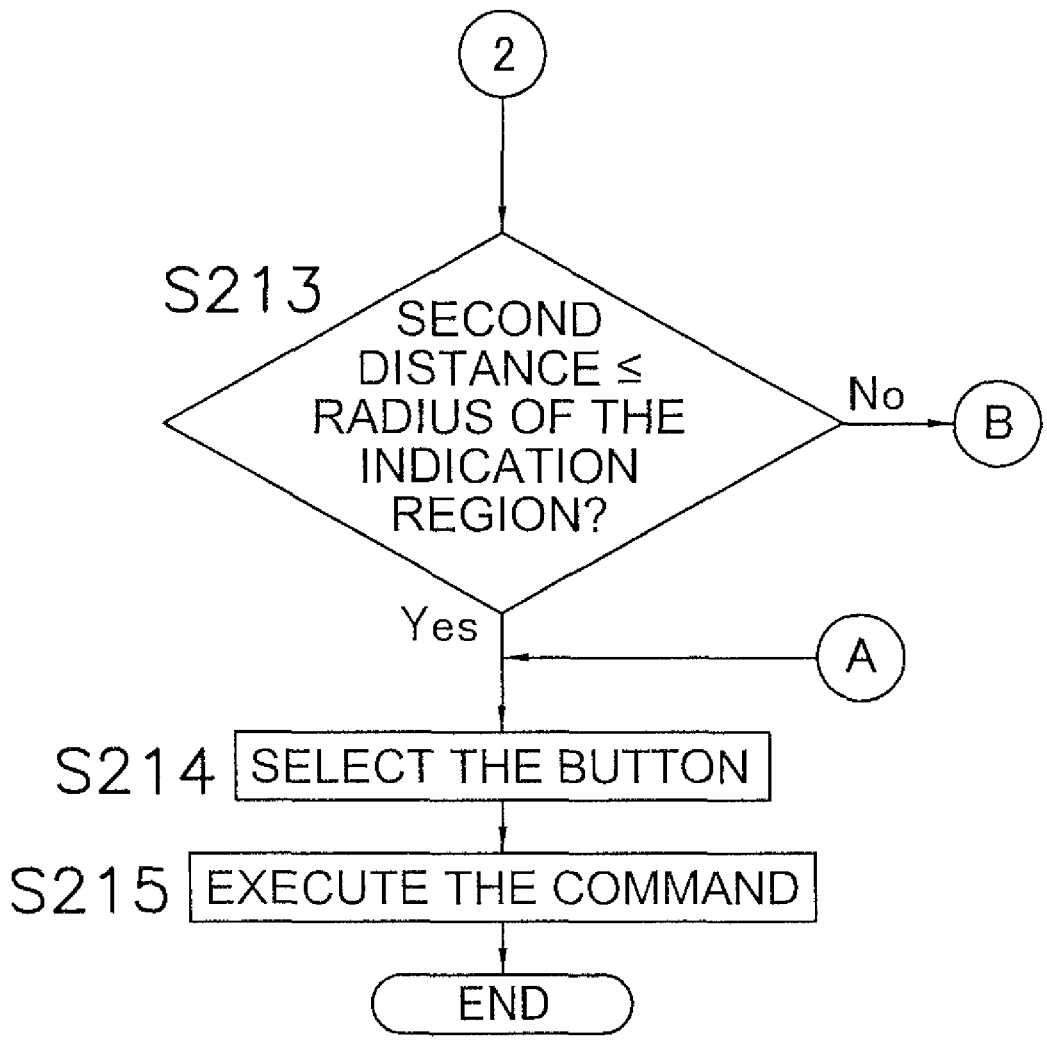
FIG. 35 is a flowchart for describing the object selection system in the present baseball game.
Figure 36:
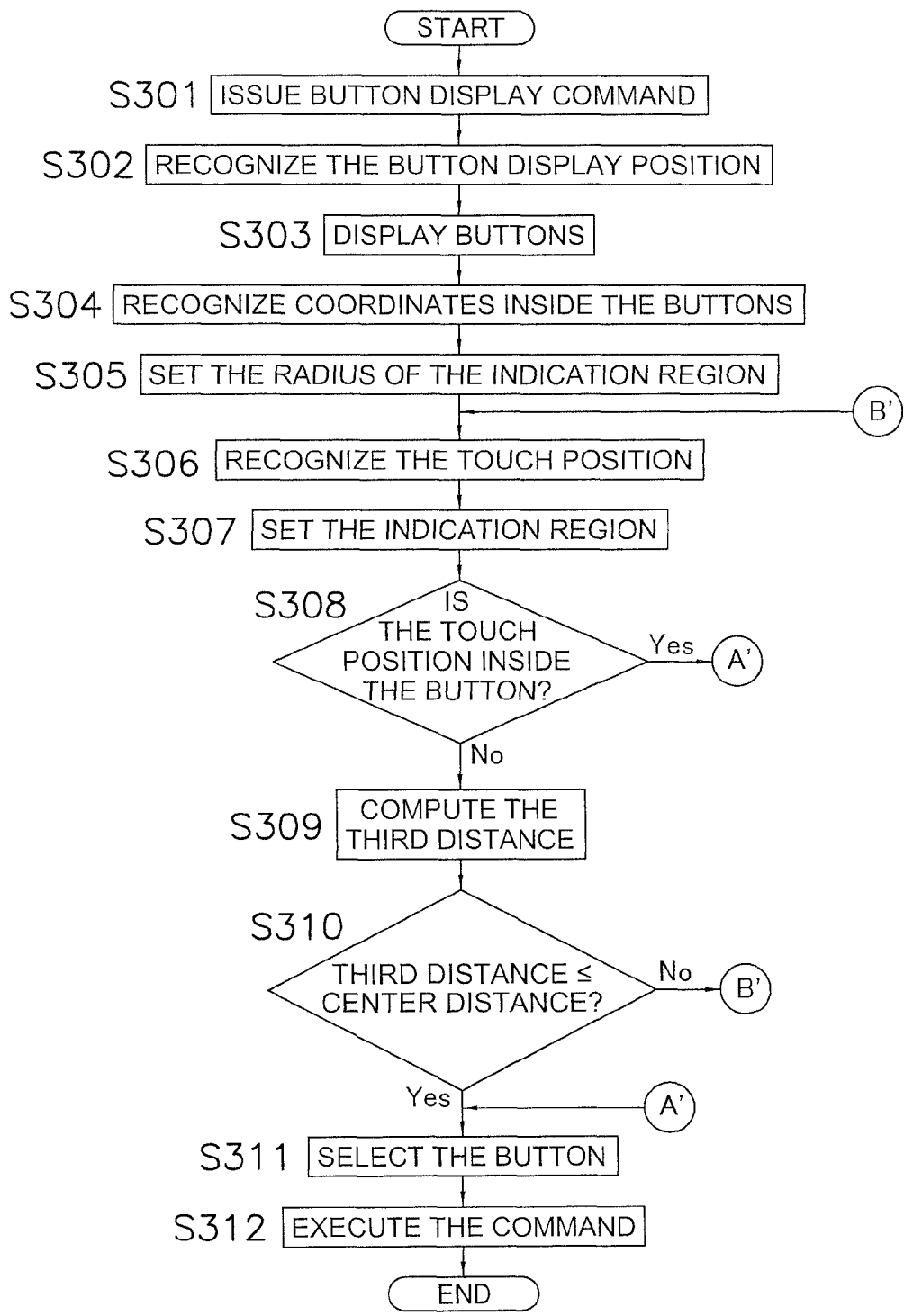
FIG. 36 is a flowchart for describing the object selection system in the present baseball game.
Figure 37:
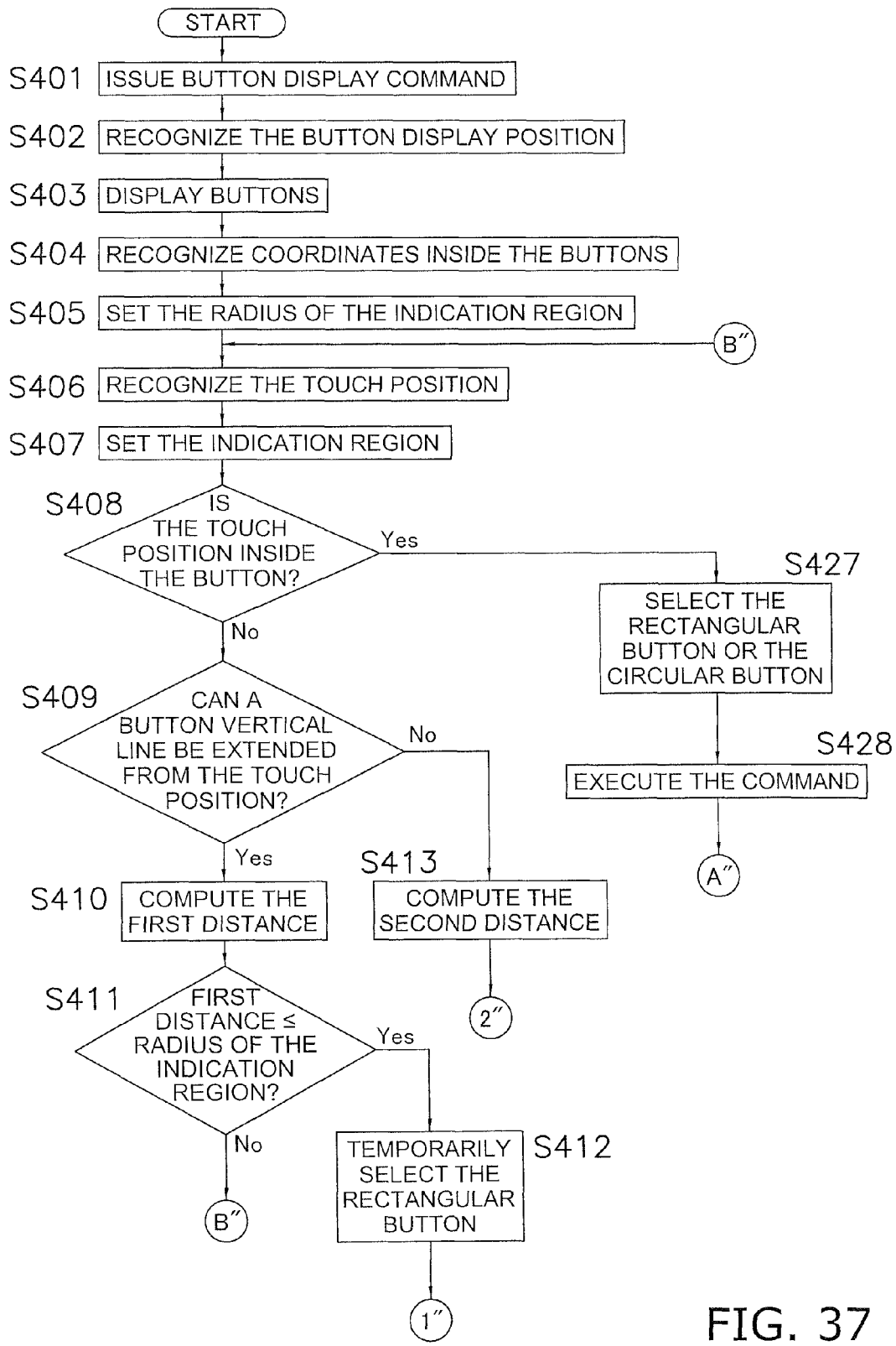
FIG. 37 is a flowchart for describing the object selection system in the present baseball game.
Figure 38:
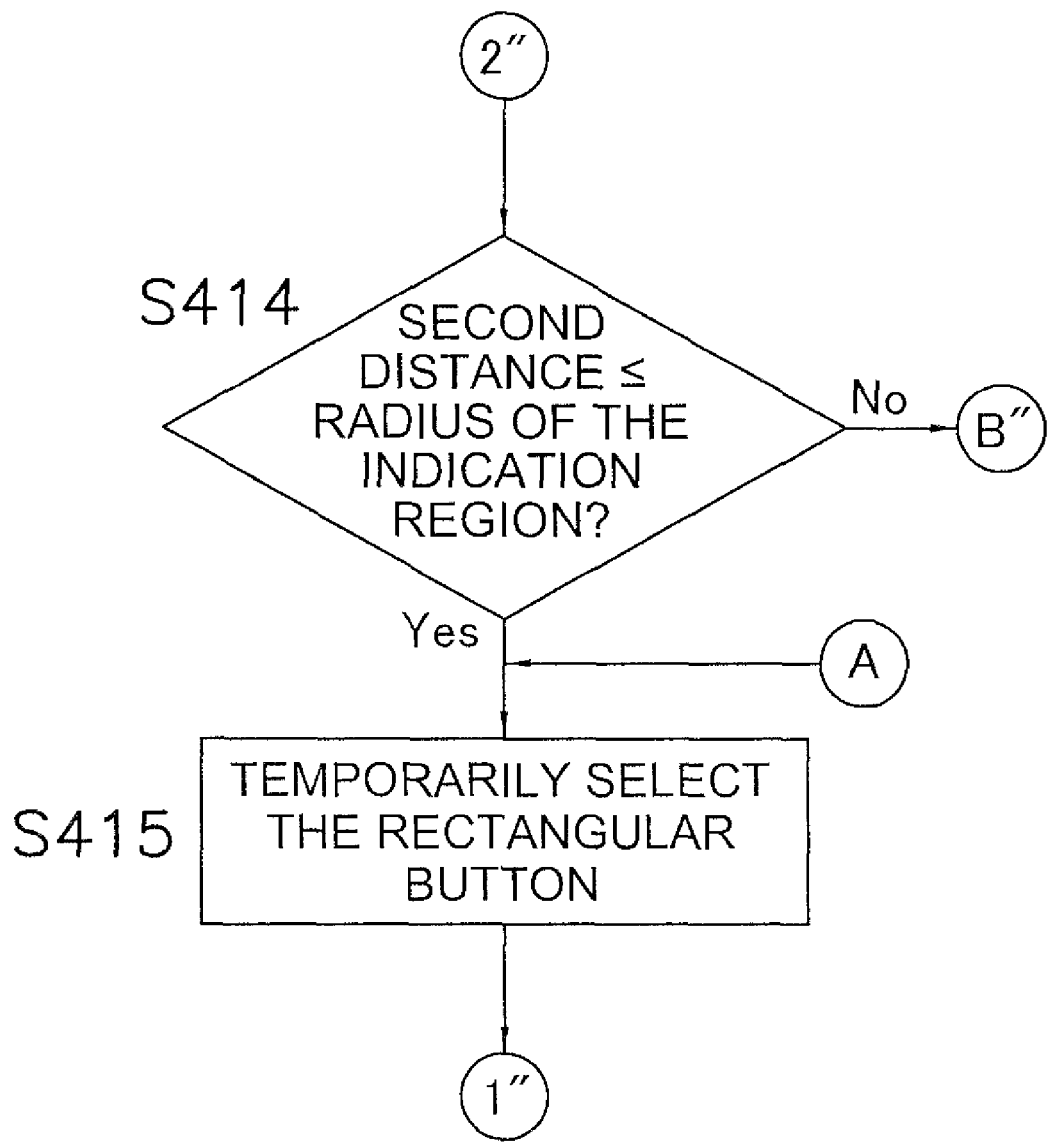
FIG. 38 is a flowchart for describing the object selection system in the present baseball game.
Figure 39:
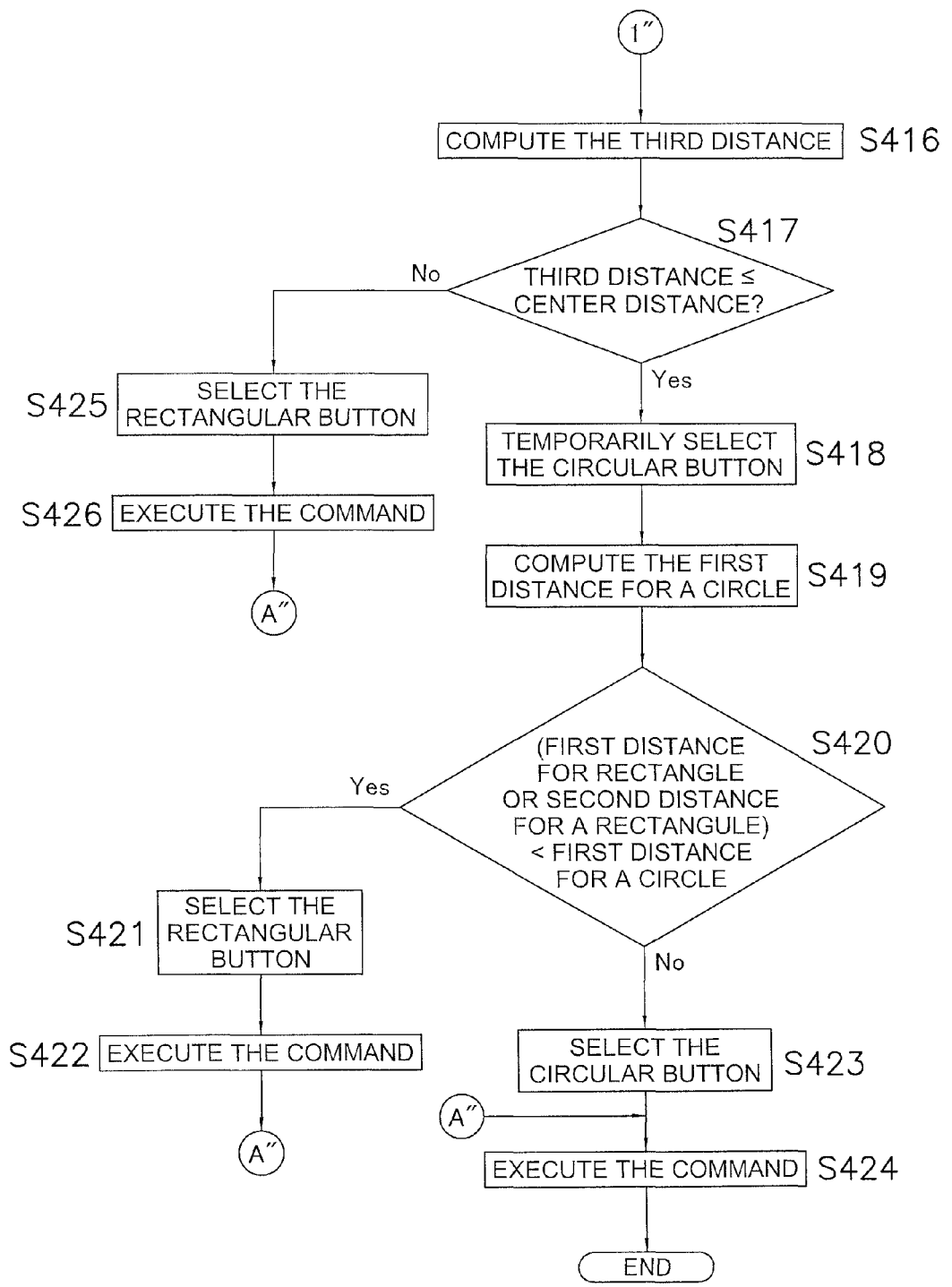
FIG. 39 is a flowchart for describing the object selection system in the present baseball game.

FIGS. 34 and 35 are flowcharts related to Embodiment 3 of the object selection system. FIG. 36 is a flowchart related to Embodiment 3' of the object selection system. FIGS. 37 through 39 are flowcharts related to Embodiment 3" of the object selection system.

Described in Embodiment 3 below is an example of the case in which a rectangular button is selected from among a plurality of rectangular buttons. Embodiment 3' describes an example of the case in which a circular button is selected from among a plurality of circular buttons. Embodiment 3"

describes an example of the case in which rectangular buttons and circular buttons are intermixed.

For Embodiment 3' and Embodiment 3", a detailed description is omitted in relation to the portions in which the same processes as Embodiment 3 are carried out. In other words, the same processes as Embodiment 3 are carried out in Embodiment 3' and Embodiment 3" when no particular description is provided.

First, Embodiment 3 will be described.

Figure 23:
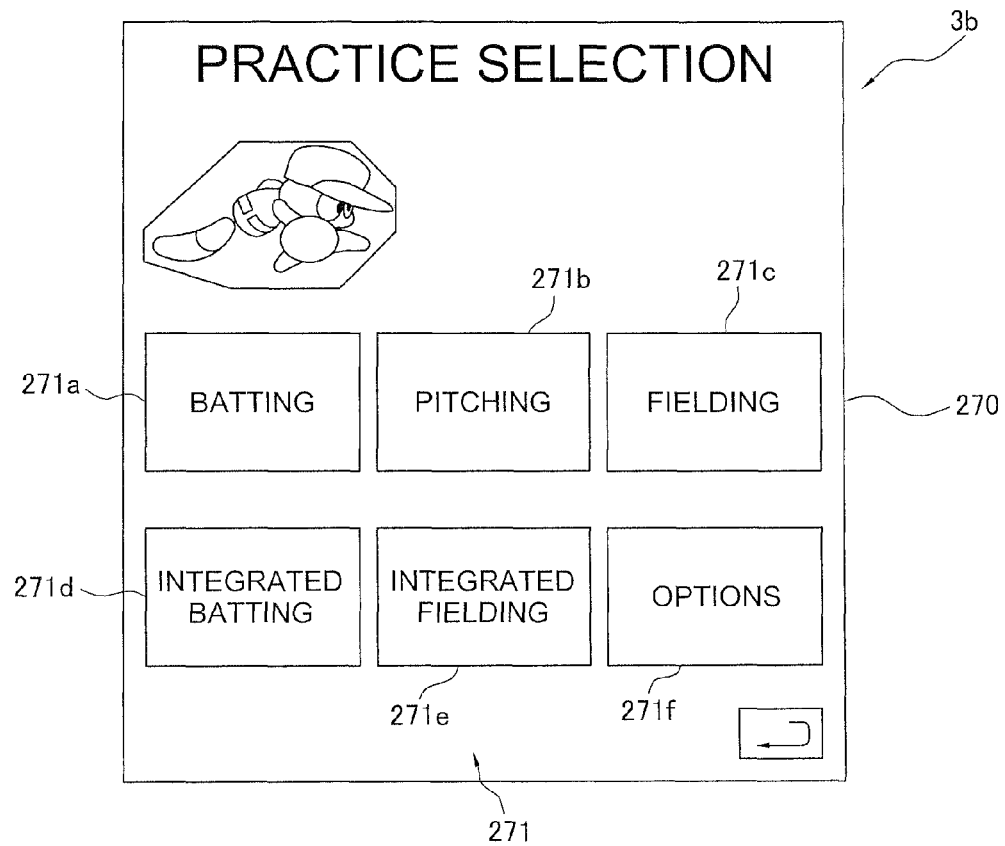
FIG. 23 illustrates a practice selection screen.

For example, in a baseball game, a practice selection screen 270 such as that shown in FIG. 23 is displayed on the lower liquid crystal monitor 3*b* when an operation practice mode is selected for practicing operation when the player is at bat, when the player is in the field, or during another operation. A plurality of rectangular button objects 271 (271*a*, 271*b*, 271*c*, 271*d*, 271*e*, 271*f*) is arranged on the practice selection screen 270. In this case, the button objects 271 include five button objects (batting practice button 271*a*, pitching practice button 271*b*, fielding practice button 271*c*, integrated at-bat practice button 271*d*, and integrated fielding practice button 271*e*) for indicating the practice mode, a button object (option button) 271*f* for setting the details of the practice mode, as well as other objects.

As used hereinbelow, the expression "rectangular button object" may be expressed as "rectangular button." The expression "rectangular button" has the same meaning as "rectangular button object."

Specifically, when an operation practice mode is selected, the CPU 11 issues a display command for displaying the rectangular buttons 271 described above on the lower liquid crystal monitor 3*b* (S201). At this point, the CPU 11 recognizes coordinate data indicating the display positions H (H1, H2, H3, H4, H5, H6) for displaying each of the rectangular buttons 271 on the lower liquid crystal monitor 3*b* (S202). The coordinate data indicating the display positions H of the rectangular buttons 271 are defined in advance in the game program and are stored in the RAM 13.

Figure 24:
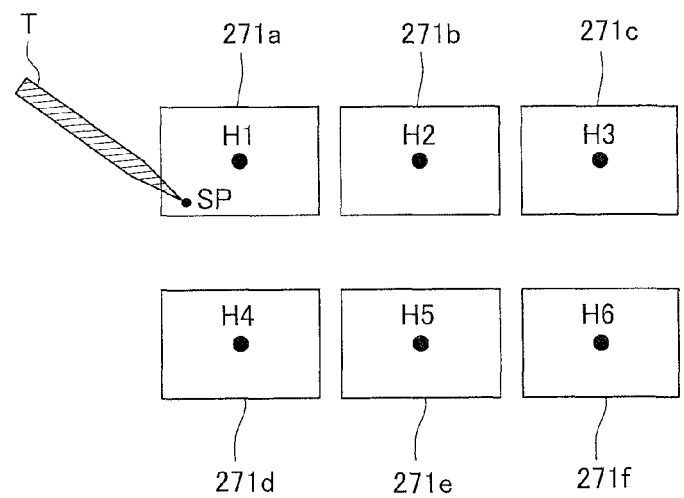
FIG. 24 shows the base point for displaying an object.

When the CPU 11 recognizes the coordinate data indicating the display positions H of the rectangular buttons 271 (271*a*, 271*b*, 271*c*, 271*d*, 271*e*, 271*f*), it issues a command for arranging the rectangular buttons in the display positions H of the rectangular buttons 271*a*, 271*b*, 271*c*, 271*d*, 271*e*, 271*f* indicated by the coordinate data, as shown in FIG. 24. At this point, the rectangular buttons 271*a*, 271*b*, 271*c*, 271*d*, 271*e*, 271*f* are displayed on the lower liquid crystal monitor 3*b* using the image data for the rectangular buttons (S203).

Specifically, the rectangular buttons 271*a*, 271*b*, 271*c*, 271*d*, 271*e*, 271*f* are displayed on the lower liquid crystal monitor 3*b* using the image data so that the center-of-gravity positions of the rectangular buttons 271*a*, 271*b*, 271*c*, 271*d*, 271*e*, 271*f* match the display positions H of the rectangular buttons in the lower liquid crystal monitor 3*b*. The image data that corresponds to the rectangular buttons 271*a*, 271*b*, 271*c*, 271*d*, 271*e*, 271*f* are stored in the RAM 13.

Next, the CPU 11 recognizes the coordinate data inside the display regions of the rectangular buttons 271 displayed on the lower liquid crystal monitor 3*b* (S204). Specifically, the CPU 11 recognizes the coordinate data inside the display regions of the rectangular buttons 271 in a coordinate system in which the origin is the lower left position of a rectangular range capable of displaying an image on the lower liquid crystal monitor 3*b*.

Included in the coordinate data inside the display regions of the rectangular buttons 271 and recognized by the CPU 11 are the coordinate data that correspond to the display positions H of the rectangular buttons 271, the coordinate data (first coordinate data for the boundary) on the sides of each rectangular button, and the coordinate data (second coordinate data for the boundary) at the corners defining the shapes of the rectangular buttons.

Next, the control unit recognizes the range definition data for defining the range of the indication region R indicated by the touch pen T in order to select the rectangular button 271 (S205). For example, the control unit recognizes the radius data indicating the radius r (the predetermined distance from the contact position SP of the touch pen T) of the indication region R if the shape of the indication region R is circular. The value of the radius data rd is defined in advance in the game program and is stored in the RAM 13 when the baseball game program is loaded from the ROM 12.

Next, when the player brings the touch pen T into contact with the lower liquid crystal monitor 3*b* in order to select a desired rectangular button 271*a*, as shown in FIG. 24, in a state in which the rectangular buttons 271 are displayed on the lower liquid crystal monitor 3*b*, as shown in FIG. 23, an input signal indicating the contact position SP of the touch pen T which has made contact with the lower liquid crystal monitor 3*b* is fed from the touch input detection circuit 14*a* to the CPU 11. The CPU 11 recognizes the coordinate data indicating the contact position SP of the touch pen T on the basis of the input signal (S206).

At this point, the CPU 11 sets the indication region R using the contact position SP as a base point on the basis of the coordinate data of the contact position SP of the touch pen T (S207). For example, the CPU 11 sets the indication region R having a boundary in a position set at a predetermined distance r from the contact position SP of the touch pen T on the basis of the coordinate data of the contact position SP of the touch pen T. Specifically, the CPU 11 sets a circular region R (indication region) having a radius r from the contact position SP of the touch pen T.

In the drawings the indication region R is shown as a broken line, but the indication region R is not actually displayed on the lower liquid crystal monitor 3*b*. However, in the present game machine 1, a screen (option screen) for setting options may be started up and the indication region R can be displayed on the option screen by pressing an input button, e.g., a select button 4*b*.

Next, the CPU 11 determines the positional relationship between the contact position SP of the touch pen T and the rectangular button on the basis of the coordinate data of the contact position SP of the touch pen T and the coordinate data inside the rectangular button.

Figure 25:
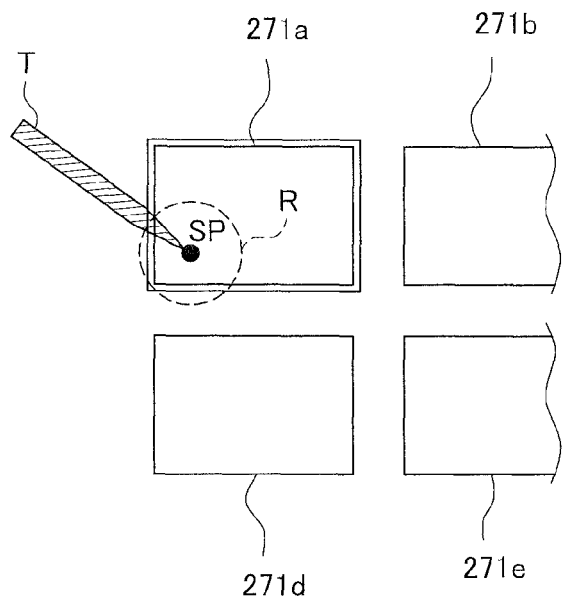
FIG. 25 shows an example of a button selected when the touch pen is positioned in the selection region.

For example, the CPU 11 determines whether the coordinate data of the contact position SP of the touch pen T matches the coordinate data inside the rectangular button (S208), as shown in FIG. 25. Specifically, the CPU 11 determines whether the coordinate data of the contact position SP of the touch pen T matches the coordinate data inside each of the rectangular buttons.

The CPU 11 recognizes as the selected object the rectangular button having therein the same coordinate data as the coordinate data of the contact position SP of the touch pen T (S213) if the CPU 11 has determined that the coordinate data of the contact position SP of the touch pen T matches the coordinate data inside a single rectangular button among the rectangular buttons (Yes, in S208). The CPU 11 executes the command assigned to the selected object when the CPU 11 recognizes the selected object (S214).

On the other hand, the CPU 11 determines from the contact position SP of the touch pen T whether the vertical line of the rectangular button can be extended from outside of the display region of the rectangular button to a side of the rectangular button (S209) if the CPU 11 has determined that the coordinate data of the contact position SP of the touch pen T does not match the coordinate data inside all of the rectangular buttons (No, in S208). The CPU 11 executes a process for the vertical distance between the contact position SP of the touch pen T to a side of the rectangular button (S210) if the vertical line can be extended from the contact position SP of the touch pen T from outside of the display region of the rectangular button to a side of the rectangular button (Yes, in S209).

Figure 26:
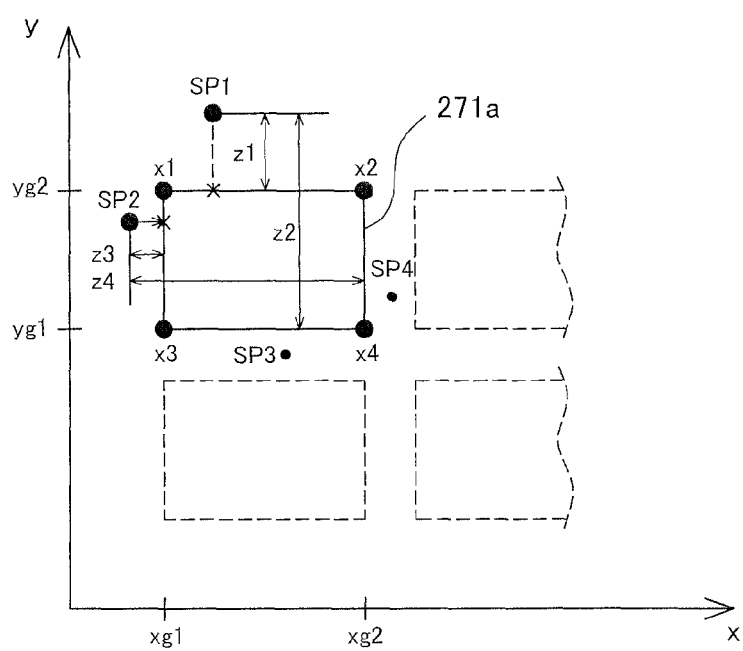
FIG. 26 illustrates the parameters used when the touch pen is positioned outside the button.

For example, the CPU 11 computes the vertical distance between the contact position SP of the touch pen T and a side of the rectangular button in the following manner In the description below, the coordinate data indicating the position of the contact position SP of the touch pen T is expressed as (xs, ys); and the coordinate data of the upper left corner of the rectangular button, the coordinate data of the upper right corner, the coordinate data of the lower left corner, and the coordinate data of the lower right corner are expressed as X1 (xg1, yg2), X2 (xg2, yg2), X3 (xg1, yg1), and X4 (xg2, yg1), respectively (FIG. 26).

For example, the CPU 11 determines whether the x-coordinate data xs of the contact position SP of the touch pen T is included in the range between the x-coordinate data xg1 of the upper left corner of the rectangular button and the x-coordinate data xg2 of the upper right corner. Specifically, the CPU 11 determines whether the expression "xg1≦xs≦xg2" holds true.

The contact position SP of the touch pen T is positioned above or below the rectangular button when the expression "xg1≦xs≦xg2" holds true. For example, in FIG. 26, the contact position SP1 or the contact position SP3 of the touch pen T corresponds to such a case.

In this case, the CPU 11 computes the absolute value Z1 (=|ys−yg2|; first absolute value) of the difference between the y-coordinate data ys of the contact position SP of the touch pen T and the y-coordinate data yg2 of the upper left corner (or the y-coordinate data yg2 of the upper right corner) of the rectangular button. The CPU 11 computes the absolute value Z2 (=|ys−yg1|; second absolute value) of the difference between the y-coordinate data ys of the contact position SP of the touch pen T and the y-coordinate data yg1 of the lower left corner (or the y-coordinate data yg1 of the lower right corner) of the rectangular button. The absolute values Z1, Z2 for the case in which the contact position of the touch pen T is in the position of SP1 are shown in FIG. 26.

At this point, the CPU 11 determines whether the first absolute value is less than the second absolute value. Specifically, the CPU 11 determines whether "Z1<Z2 (|ys−yg2|<|ys−yg1|)" holds true. If "Z1<Z2 (|ys−yg2|<|ys−yg1|)" holds true, the contact position SP of the touch pen T is near the upper side of the rectangular button, and the CPU 11 executes a process for computing the length of the vertical line extended from the contact position SP of the touch pen T to the upper side of the rectangular button. Conversely, when "Z1>Z2 (|ys−yg2|>|ys−yg1|)" holds true, the contact position SP of the touch pen T is near the lower side of the rectangular button, and the CPU 11 executes a process for computing the length D1 of the vertical line extended from the contact position SP of the touch pen T to the lower side of the rectangular button.

Next, the CPU 11 determines whether the y-coordinate data ys of the contact position SP of the touch pen T is included in the range between the y-coordinate data yg1 of the upper left corner and the y-coordinate data yg3 of the lower left corner of the rectangular button if "xg1≦xs≦xg2" does not hold true. Specifically, the CPU 11 determines whether "yg1≦ys≦yg2" holds true.

The contact position SP of the touch pen T is positioned to the left or the right of the rectangular button if "yg1≦ys≦yg2" holds true. For example, the contact position SP2 or the contact position SP4 of the touch pen T corresponds to such a case in FIG. 26.

In this case, the CPU 11 computes the absolute value Z3 (=|xs−xg1|; third absolute value) of the difference between the x-coordinate data xs of the contact position SP of the touch pen T and the x-coordinate data xg1 of the upper left corner (or the x-coordinate data xg1 of the lower left corner) of the rectangular button. The CPU 11 computes the absolute value Z4 (=|xs−xg2|; fourth absolute value) of the difference between the x-coordinate data xs of the contact position SP of the touch pen T and the x-coordinate data xg2 of the upper right corner (or the x-coordinate data xg2 of the lower right corner) of the rectangular button. The absolute values Z3, Z4 for the case in which the contact position of the touch pen T is in the position of SP2 are shown in FIG. 26.

At this point, the CPU 11 determines whether the third absolute value is less than the fourth absolute value. Specifically, the CPU 11 determines whether "Z3<Z4 (|xs−xg1|<|xs−xg2|)" holds true. If "Z3<Z4 (|xs−xg1|<|xs−xg2|)" holds true, the contact position SP of the touch pen T is near the left side of the rectangular button, and the CPU 11 executes a process for computing the length of the vertical line extended from the contact position SP of the touch pen T to the left side of the rectangular button. Conversely, when "Z3>Z4 (|xs−xg1|>|xs−xg2|)" holds true, the contact position SP of the touch pen T is near the right side of the rectangular button, and the CPU 11 executes a process for computing the length D1 of the vertical line extended from the contact position SP of the touch pen T to the right side of the rectangular button.

In FIG. 26, the length of the vertical line extended from the contact position SP of the touch pen T to a side of the rectangular button is computed by the CPU 11 by computing the length of the vertical line that connects the contact position SP of the touch pen T and the base (marked by X in FIG. 26) of the vertical line extended from the contact position SP of the touch pen T to a side of the rectangular button. The coordinate data of the base of the vertical line used herein is coordinate data (first coordinate data for a boundary) that is located on the side of the rectangular button and is recognized by the CPU 11 in step 204 (S204). In the present embodiment, the length of the vertical line extended from the contact position SP of the touch pen T to the side of the rectangular button may be used in place of the absolute values Z1, Z2, Z3, Z4 because the rectangular button is rectangular.

Such a process is executed for all rectangular buttons. The CPU 11 recognizes (S210) the length D1 from the contact position SP of the touch pen T to the side of the nearest rectangular button as the ultimate first distance.

Accordingly, when the shortest vertical distance D1 (first distance) from the contact position SP of the touch pen T to the side of the rectangular button is computed, the CPU 11 determines whether the first distance D1 is equal to or less than the radius r (the distance from the contact position SP of the touch pen T to the boundary of the indication region R) of the indication region R of the touch pen T (S211). Specifically, the CPU 11 determines whether "D1≦r" holds true. If "D1≦r" holds true (Yes, in S211; see FIG. 27(a)), the CPU 11 recognizes (S213) the rectangular button as the selected object. The CPU 11 executes the command assigned to the selected object when the selected object is recognized by the CPU 11 (S214).

Figure 27:
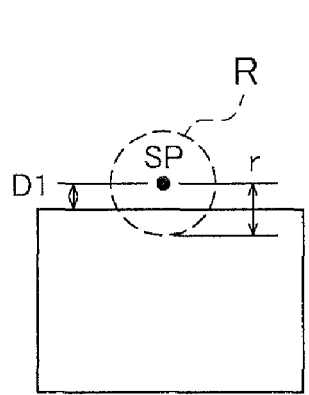
FIG. 27 illustrates the button selected by the indication region of the touch pen.
Figure 27:
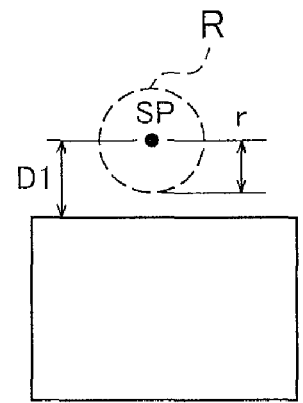
Figure 27:
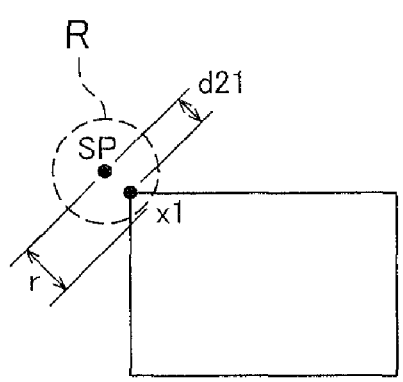
Figure 27:
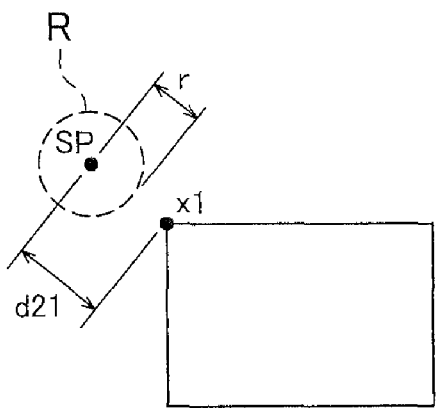

If the CPU 11 has determined that the shortest vertical distance D1 (first distance) between the contact position SP of the touch pen T and the side of the rectangular button is greater than the radius r of the indication region R of the touch pen T (No, in S211; see FIG. 27(b)), the CPU 11 again executes the process of step 206 (S206) if "D1>r" holds true.

On the other hand, the CPU 11 executes a process for computing the second distance between the contact position SP of the touch pen T and the corner of the rectangular button on the basis of coordinate data of the contact position SP of the touch pen T and the coordinate data (second coordinate data for the boundary) in each corner of the rectangular button (S212), if the vertical line cannot be extended from the contact position SP of the touch pen T from outside the display region of the rectangular button to the side of the rectangular button; i.e., if the expression "xg1≦xs≦xg2" and the expression "yg1≦ys≦yg2" do not hold true (No, in S209; see FIGS. 27(c) and 27(d)).

For example, first, the CPU 11 executes a process for computing the distances between the contact position SP of the touch pen T and the four corners of the rectangular button. Here, the distances d21, d22, d23, d24 between the contact position SP of the touch pen T and the four corners of the rectangular button are computed using the Pythagorean Theorem. In FIGS. 27(c) and 27(d), only the distance d21 between the contact position SP of the touch pen T and a single corner X1 of the rectangular button is shown. Next, the CPU 11 recognizes the shortest distance among the distances d21, d22, d23, d24 thus computed as the shortest distance (=min (d21, d22, d23, d24) between the contact position SP of the touch pen T and the corners of the rectangular button.

Such a process is carried out for all rectangular buttons. The CPU 11 recognizes the length D2 from the contact position SP of the touch pen T to the nearest corner of the rectangular button as the ultimate second distance.

At this point, the CPU 11 determines whether the shortest distance D2 (second distance) from the contact position SP of the touch pen T to the corner of the rectangular button is equal to or less than the radius r (the distance from the contact position SP of the touch pen T to the boundary of the indication region R) of the indication region R of the touch pen T (S213). Specifically, the CPU 11 determines whether "D2≦r" holds true. If "D2≦r" holds true (Yes, in S213; see FIG. 27(c)), the CPU 11 recognizes the rectangular button as the selected object (S214). The CPU 11 executes the command assigned to the selected object when the selected object is recognized by the CPU 11 (S215).

Here, if the CPU 11 has determined that the shortest distance D2 (second distance) from the contact position SP to the touch pen T to the corner of the rectangular button is greater than the radius r of the indication region R of the touch pen T; i.e., if "D2>r" holds true (No, in S213; see FIG. 27(d)), there is no object to be selected in the contact position SP of the touch pen T and the CPU 11 again executes the process of step 206 (S206).

As described above, in Embodiment 3, the player can readily select a rectangular button 271 positioned near or in the position of the touch pen T merely by positioning the touch pen T inside the rectangular button 271 or near the rectangular button 271 displayed on the monitor. Even when adjacent rectangular buttons 271 are arranged in mutually proximate positions, the player can readily select a rectangular button 271 positioned near or in the position of the touch pen T merely by positioning the touch T pen inside the rectangular button 271 or near the rectangular button 271. Game providers are not required to make special adjustments to the layout of the rectangular buttons 271 during game production and the rectangular button 271 which is the indication target of the touch pen T can be reliably selected even when adjacent rectangular buttons 271 are arranged in mutually proximate positions.

Next, Embodiment 3' will be described.

Embodiment 3° is the same as Embodiment 3 except that the buttons displayed on practice selection screen 370 are circular. A detailed description is omitted in Embodiment 3' in relation to the portion in which the same process as that in Embodiment 3 is carried out.

Figure 28:
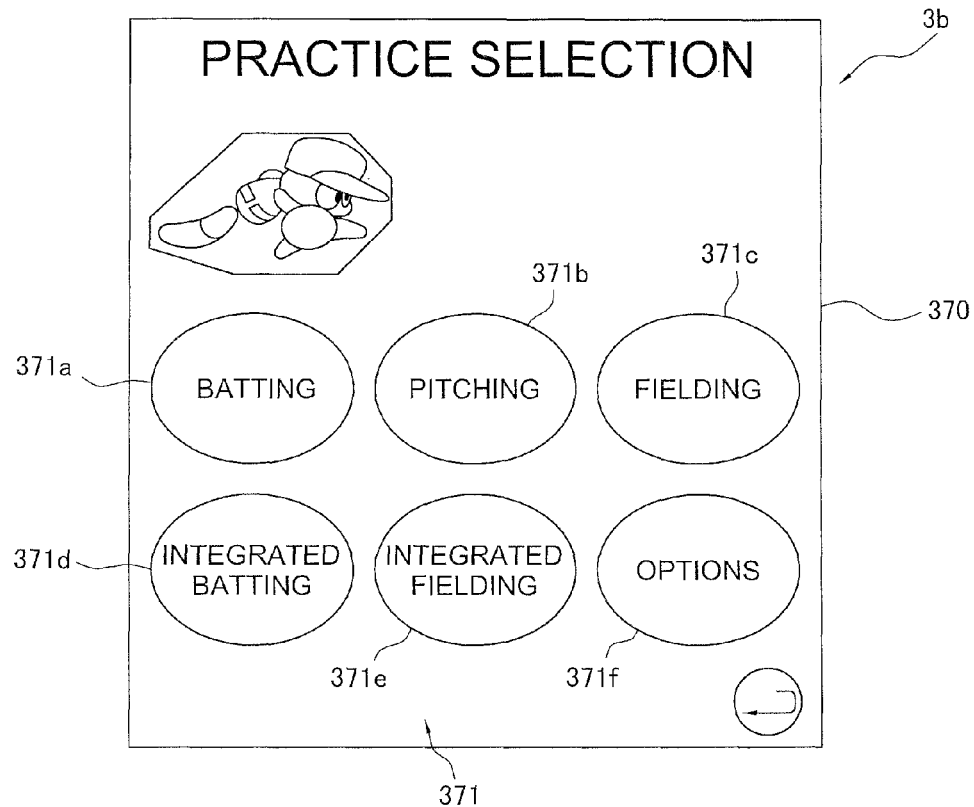
FIG. 28 illustrates the practice selection screen.

When an operation practice mode is selected, in a baseball game for example, the practice selection screen 370 is displayed on the lower liquid crystal monitor 3b, as shown in FIG. 28. Specifically, when the operation practice mode is selected, the CPU 11 issues a display command for displaying a plurality of circular button objects 371 on the lower liquid crystal monitor 3b (S301). At this point, the CPU 11 recognizes coordinate data indicating the display positions H (H1, H2, H3, H4, H5, H6) for displaying the circular button objects 371 on the lower liquid crystal monitor 3b (S302).

Here, the circular button objects 371 have the same size and the same radii r'. The data for defining the radii r' are stored in the RAM 13 when the baseball game program is loaded from the ROM 12.

As used hereinbelow, the expression "circular button object" may be referred to as "circular button." The expression "circular button" has the same meaning as "circular button object."

When the CPU 11 recognizes the coordinate data indicating the display positions H of the circular buttons 371, the circular buttons are displayed on the lower liquid crystal monitor 3b using image data for each circular button so that the center of the circle-shaped circular buttons match the display positions H (S303). At this point, the CPU 11 recognizes the coordinate data inside the display regions of the circular buttons 371 displayed on the lower liquid crystal monitor 3b (S304).

In this case, the coordinate data that correspond to the display positions H of the circular buttons 371 are included in the coordinate data inside the display region of the circular buttons 371 recognized by the CPU 11.

Next, the control unit recognizes the range definition data for defining the range of the indication region R indicated by the touch pen T in order to select a circular button 371 (S305). For example, the CPU 11 recognizes the radius data indicating the radius r (the predetermined distance from the contact position SP of the touch pen T) of the indication region R if the shape of the indication region R is circular.

Figure 29:
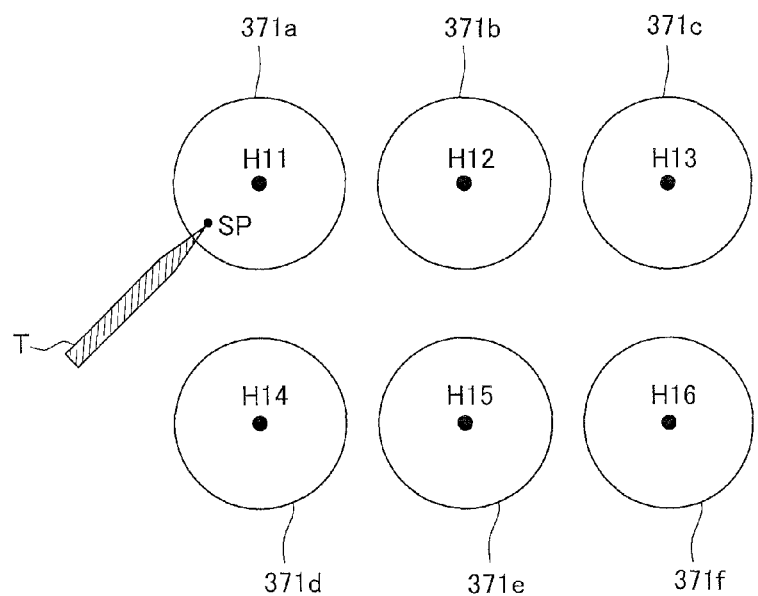
FIG. 29 shows the base point for displaying an object.

Next, when the player brings the touch pen T into contact with the lower liquid crystal monitor 3b in order to select a desired circular button 371a, as shown in FIG. 29, in a state in which the circular buttons 371 are displayed on the lower liquid crystal monitor 3b, as shown in FIG. 28, the CPU 11 recognizes the coordinate data indicating the contact position SP of the touch pen T (S306).

At this point, the CPU 11 sets the indication region R using the contact position SP as a base point on the basis of the coordinate data of the contact position SP of the touch pen T (S307). Specifically, the CPU 11 sets a circular region R (indication region) having a radius r about the contact position SP of the touch pen T.

Next, the CPU 11 determines the position relationship between the contact position SP of the touch pen T and the circular button on the basis of the coordinate data of the contact position SP of the touch pen T and the coordinate data inside the circular button.

For example, the CPU 11 determines whether the coordinate data of the contact position SP of the touch pen T matches the coordinate data inside the rectangular button (S308). Specifically, the CPU 11 determines whether the coordinate data of the contact position SP of the touch pen T matches the coordinate data inside the circular buttons.

Figure 30:
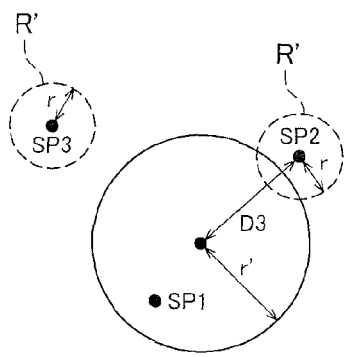
FIG. 30 illustrates the button selected by the indication region of the touch pen.

The CPU 11 recognizes as the selected object the circular button having therein the same coordinate data as the coordinate data of the contact position SP of the touch pen T (S311) if the CPU 11 has determined that the coordinate data of the contact position SP of the touch pen T matches the coordinate data inside at least one circular button among the circular buttons (Yes, in S308), as shown in FIG. 30. For example, in FIG. 30, the CPU 11 recognizes the circular button as the selected object if the contact position of the touch pen T is in the position SP P.

The CPU 11 executes the command assigned to the selected object when the CPU 11 recognizes the selected object (S312).

On the other hand, the CPU 11 executes a process for computing the third distance between the contact position SP of the touch pen T and the center position of the circular button on the basis of the coordinate data of the contact position SP of the touch pen T and the coordinate data indicating the display position of the circular button (the center position of the circular button) (S309) if the CPU 11 has determined that the coordinate data of the contact position SP of the touch pen T does not match the coordinate data inside all of the circular buttons (No, in S208). In this case, the distance between the contact position SP of the touch pen T and the center of the circular button is computed using the Pythagorean Theorem.

Such a process is carried out for all circular buttons. The CPU 11 recognizes the distance D3 having the lowest value as the ultimate third distance among the distances from the contact position SP of the touch pen T to the center of the circular buttons.

At this point, the CPU 11 determines whether the shortest distance D3 between the contact position SP of the touch pen T and the center position of the circular button is equal to or less than the total distance Tr of the radius r of the indication region R of the touch pen T and the radius r' of the circular button (S310). In other words, the CPU 11 determines whether the third distance is equal to or less than center distance Tr between the indication region R of the touch pen T and the circular button. Specifically, the CPU 11 determines whether "D3≦Tr" holds true. The CPU 11 recognizes the object as the selected object (S311) if the CPU 11 has determined that the third distance D3 is equal to or less than the total distance; i.e., if "D3≦Tr" holds true (Yes, in S310). For example, in FIG. 30, the CPU 11 recognizes the circular button as the selected object if the contact position of the touch pen T is in the position SP2'. The CPU 11 executes the command assigned to the selected object when the selected object is recognized by the CPU 11 (S312).

Conversely, when the CPU 11 has determined that the third distance D3 is greater than the total distance Tr between the radius r of the indication region R of the touch pen T and the radius r' of the circular button; i.e., if "D3>Tr" holds true (No, in S310), an object has not been selected by the contact position SP of the touch pen T and the CPU 11 again executes the process of step 306 (S306). For example, in FIG. 30, the case in which the contact position of the touch pen T is in the position SP3' corresponds to this case (No, in S310).

As described above, in Embodiment 3' above, the player can readily select a circular button 371 positioned near or in the position of the touch pen T merely by positioning the touch pen T inside the circular button 371 or near the circular button 371 displayed on the monitor. Even when adjacent circular buttons 371 are arranged in mutually proximate positions, the player can readily select a circular button 371 positioned near or in the position of the touch pen T merely by positioning the touch T pen inside the circular button 371 or near the circular button 371. Game providers are not required to make special adjustments to the layout of the circular buttons 371 during game production and the circular button 271 which is the indication target of the touch pen T can be reliably selected even when adjacent circular buttons 271 are arranged in mutually proximate positions.

Lastly, Embodiment 3" will be described.

An example is described in Embodiment 3" in which rectangular and circular buttons are intermixed on the practice selection screen 470. In this case as well, a detailed description is omitted in relation to the portions in which the same process as that in Embodiment 3 and Embodiment 3' is carried out.

Figure 31:
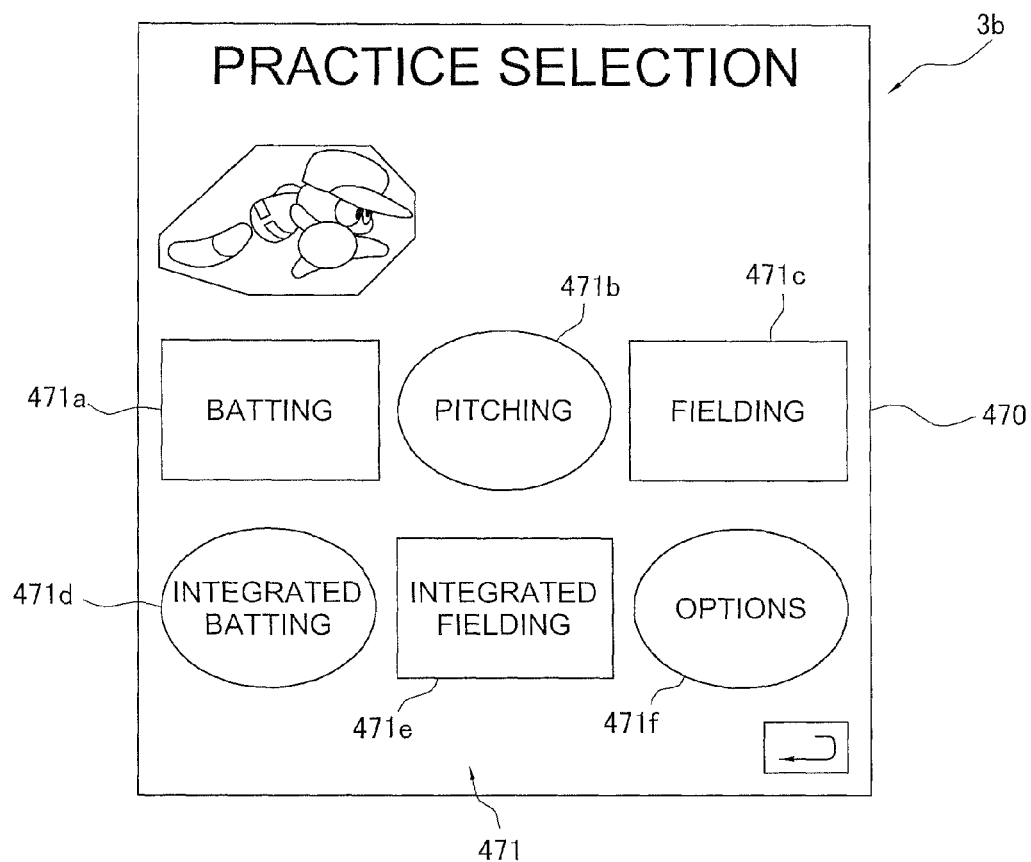
FIG. 31 illustrates the practice selection screen.

For example, the practice selection screen 370 such as that shown in FIG. 31 is displayed on the lower liquid crystal monitor 3b when the operation practice mode is selected in a baseball game. Specifically, when the operation practice mode is selected, the CPU 11 issues a display command for displaying a plurality of rectangular buttons and a plurality of circular button objects 471 on the lower liquid crystal monitor 3b (S401). At this point, the CPU 11 recognizes coordinate data indicating the display positions H (H21, H22, H23, H24, H25, H26) for displaying the button objects 471 (S402).

In this case, the rectangular button objects 471 have the same size, the same long side lengths, and the same short side lengths. The circular button objects 471 have the same size and the same radii r'. The data for defining the radii r' are stored in the RAM 13 when the baseball game program is loaded from the ROM 12.

When the CPU 11 recognizes the coordinate data indicating the display positions H of the button objects 471, the rectangular buttons are displayed on the lower liquid crystal monitor 3b using image data for the rectangular buttons so that the center of the center-of-gravity positions of the rectangular buttons match the display positions H21, H23, H25 (S403). Also, the circular buttons are displayed on the lower liquid crystal monitor 3b using image data for the circular buttons so that the center of the circular buttons match the display positions H22, H24, H26. At this point, the CPU 11 recognizes the coordinate data inside the display regions of the rectangular buttons and the circular buttons 471 displayed on the lower liquid crystal monitor 3b (S404).

Here, the coordinate data that correspond to the display positions H of the circular buttons 471 are included in the coordinate data inside the display region of the buttons 471 recognized by the CPU 11.

Next, the control unit recognizes the range definition data for defining the range of the indication region R indicated by the touch pen T in order to select a rectangular button or a circular button 471 (S405). For example, the control unit recognizes the radius data indicating the radius r (the predetermined distance from the contact position SP of the touch pen T) of the indication region R if the indication region R is circular in shape.

Figure 32:
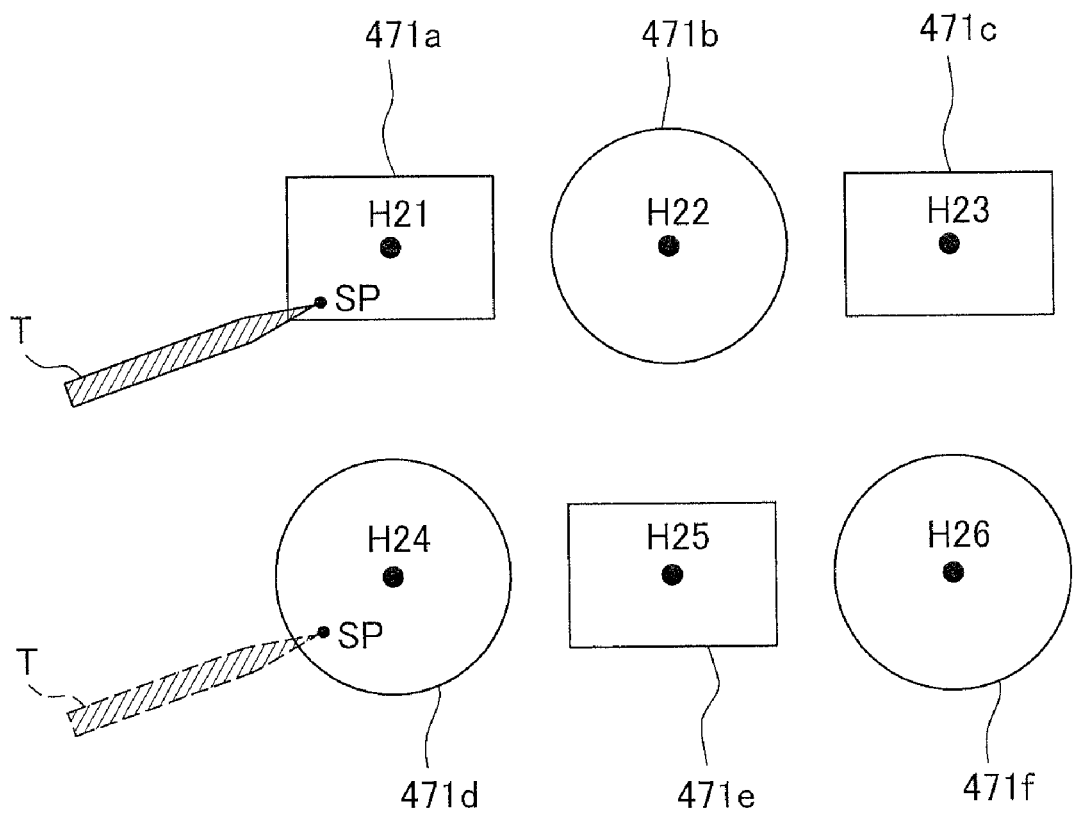
FIG. 32 shows the base point for displaying an object.

Next, when the player brings the touch pen T into contact with the lower liquid crystal monitor 3b in order to select a desired button 471a, as shown in FIG. 32, in a state in which the rectangular buttons and circular buttons 471 are displayed on the lower liquid crystal monitor 3b, as shown in FIG. 31, the CPU 11 recognizes the coordinate data indicating the contact position SP of the touch pen T (S406).

At this point, the CPU 11 sets the indication region R using the contact position SP as a base point on the basis of the coordinate data of the contact position SP of the touch pen T (S407). Specifically, the CPU 11 sets a circular region R (indication region) having a radius r from the contact position SP of the touch pen T.

Next, the CPU 11 determines the position relationship between the contact position SP of the touch pen T and the button on the basis of the coordinate data of the contact position SP of the touch pen T and the coordinate data inside the button.

For example, the CPU 11 determines whether the coordinate data of the contact position SP of the touch pen T matches the coordinate data inside the button (S408). Specifically, the CPU 11 determines whether the coordinate data of the contact position SP of the touch pen T matches the coordinate data inside the rectangular buttons and the circular buttons.

The CPU 11 recognizes as the selected object the button having therein the same coordinate data as the coordinate data of the contact position SP of the touch pen T (S427) if the CPU 11 has determined that the coordinate data of the contact position SP of the touch pen T matches the coordinate data inside at least one button among the rectangular buttons and the circular buttons (Yes, in S408). The CPU 11 executes the command assigned to the selected object when the CPU 11 recognizes the selected object (S428).

On the other hand, the CPU 11 determines from the contact position SP of the touch pen T whether the vertical line can be extended from outside of the display region of the rectangular button to a side of the rectangular button (S409) if the CPU 11 has determined that the coordinate data of the contact position SP of the touch pen T does not match the coordinate data inside all of the buttons (No, in S408). The CPU 11 executes a process for computing the vertical distance between the contact position SP of the touch pen T to a side of the rectangular button (S410) if the vertical line can be extended from the contact position SP of the touch pen T from outside of the display region of the rectangular button to a side of the rectangular button (Yes, in S409), as shown in FIG. 26.

Such a process is executed for all rectangular buttons. The CPU 11 recognizes the length D1 from the contact position SP of the touch pen T to the side of the nearest rectangular button as the ultimate first distance.

Accordingly, when the shortest vertical distance D1 (first distance) from the contact position SP of the touch pen T to the side of the rectangular button is computed, the CPU 11 determines whether the first distance D1 is equal to or less than the radius r (the distance from the contact position SP of the touch pen T to the boundary of the indication region R) of the indication region R of the touch pen T (S411). Specifically, the CPU 11 determines whether "D1≦r" holds true. If "D1≦r" holds true (Yes, in S411; see FIG. 27(a)), the CPU 11 temporarily recognizes the rectangular button as the selected object (S412).

If the CPU 11 has determined that the shortest vertical distance D1 (first distance) between the contact position SP of the touch pen T and the side of the rectangular button is greater than the radius r of the indication region R of the touch pen T (No, in S411; see FIG. 27(b)), the CPU 11 again executes the process of step 406 (S406) if "D1>r" holds true.

On the other hand, the CPU 11 executes a process for computing the distance between the contact position SP of the touch pen T and the corner of the rectangular button on the basis of coordinate data of the contact position SP of the touch pen T and the coordinate data (second coordinate data for the boundary) in each corner of the rectangular button, if the vertical line cannot be extended from the contact position SP of the touch pen T from outside the display region of the rectangular button to the side of the rectangular button; i.e., if the expression "xg1≦xs≦xg2" and the expression "yg1≦ys≦yg2" do not hold true (No, in S409; see FIGS. 27(c) and 27(d)).

Such a process is executed for all rectangular buttons. The CPU 11 recognizes the length D2 from the contact position SP of the touch pen T to the corner of the nearest rectangular button as the ultimate second distance (S413).

At this point, the CPU 11 determines whether the shortest distance D2 (second distance) from the contact position SP of the touch pen T to the corner of the rectangular button is equal to or less than the radius r (the distance from the contact position SP of the touch pen T to the boundary of the indication region R) of the indication region R of the touch pen T (S414). The CPU 11 temporarily recognizes the rectangular button as the selected object if the second distance D2 is equal or less than the radius r of the indication region R of the touch pen T (Yes, in S414; see FIG. 27(c)) (S415).

On the other hand, if the CPU 11 has determined that the shortest distance D2 (second distance) from the contact position SP of the touch pen T to the corner of the rectangular button is greater than the radius r of the indication region R of the touch pen T; i.e., if "D2>r" holds true (No, in S414; see FIG. 27(d)), there is no rectangular button to be selected in the contact position SP of the touch pen T and the CPU 11 again executes the process of step 406 (S406).

Next, the CPU 11 executes a process for computing the distance between the contact position SP of the touch pen T and the center position of the circular button on the basis of the coordinate data of the contact position SP of the touch pen T and the coordinate data indicating the display position of the circular button (the center position of the circular button).

Such a process is carried out for all circular buttons. The CPU 11 recognizes the distance D3 having the lowest value as the ultimate third distance among the distances from the contact position SP of the touch pen T to the center of the circular buttons (S416).

At this point, the CPU 11 determines whether the shortest distance D3 (third distance) between the contact position SP of the touch pen T and the center position of the circular button is equal to or less than the total distance Tr of the radius r of the indication region R of the touch pen T and the radius r' of the circular button (S417). In other words, the CPU 11 determines whether the third distance is equal to or less than center distance Tr between the indication region R of the touch pen T and the circular button. The CPU 11 temporarily recognizes the circular button as the selected object (S418, see the indication region for the case in which the contact position of FIG. 30 is SP2) if the CPU 11 has determined that the third distance D3 is equal to or less than the total distance; i.e., if "D3≦Tr" holds true (Yes, in S417).

Next, the CPU 11 executes a process for computing the first distance D11 between the contact position SP of the touch pen T and the boundary of the temporarily selected circular button (selected object) (S419).

Provided in the description below is a mode in which the coordinate data indicating the position of the contact position SP of the touch pen T is expressed as (xs, ys); the coordinate data of the center position of the circular button is express as (xc, yc); and the first distance D11 is computed between the contact position SP of the touch pen T and the circumference (boundary) of the circular button.

Figure 33:
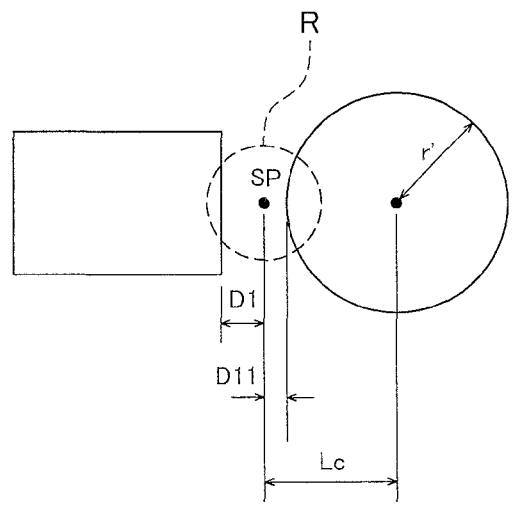
FIG. 33 illustrates a button selected by the indication region of the touch pen.
Figure 33:
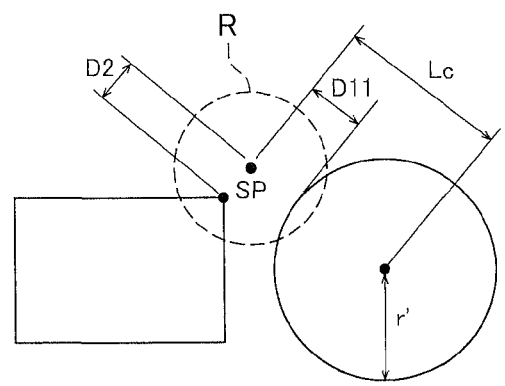

For example, the CPU 11 executes a process (Lc=((xs−xc)$^2$+(ys−yc)$^2$)$^{1/2}$) for computing the distance Lc between the contact position SP of the touch pen T and the center position of the circular button, as shown in FIG. 33. The CPU 11 executes a process (CPU 11=Lc−r') for subtracting the radius r' of the circular button from the distance Lc, whereby the first distance D11 between the contact position SP of the touch pen T and the circumference (boundary) of the circular button is computed. The CPU 11 recognizes the first distance D11 between the contact position SP of the touch pen T and the boundary of the temporarily selected circular button.

Next, the CPU 11 determines whether the first distance D1 or the second distance D2 in relation to the rectangular button is less than the first distance D11 between the contact position SP of the touch pen T and the boundary of the circular button (S420). if the CPU 11 has determined that the first distance D1 or the second distance D2 in relation to the rectangular button is less than the first distance D11 in relation to the circular button (Yes, in S420), the control unit recognizes the temporarily selected rectangular button as the ultimate selected object (S421). The CPU 11 executes the command assigned to the selected object when the CPU 11 recognizes the selected object (S422).

If the CPU 11 has determined that the first distance D1 or the second distance D2 in relation to the rectangular button is greater than the first distance D11 in relation to the circular button (No, in S420), the control unit recognizes the temporarily selected circular button as the ultimate selected object (S423). The CPU 11 executes the command assigned to the selected object when the CPU 11 recognizes the selected object (S424).

In step 417 (S417), when the CPU 11 has determined that the third distance D3 is greater than the total distance tr between the radius r of the indication region R of the touch pen T and the radius r' of the circular button; i.e., if "D3>Tr" holds true (No, in S417), the rectangular button in a temporarily selected state is recognized by the control unit as the ultimately selected object (S425). The CPU 11 executes the command assigned to the selected object when the CPU 11 recognizes the selected object (S426).

As described above, in Embodiment 3", the player can readily select a rectangular button or a circular button 471 positioned near or in the position of the touch pen T merely by positioning the touch pen T inside the rectangular and circular buttons 471 or near the rectangular and circular buttons 471 displayed on the monitor. Even when adjacent buttons 471 are arranged in mutually proximate positions, the player can readily select a button 471 positioned near or in the position of the touch pen T merely by positioning the touch T pen inside the rectangular and circular buttons 471 or near the rectangular and circular buttons 471. Game providers are not required to make special adjustments to the layout of the buttons 471 during game production and the button 471 which is the indication target of the touch pen T can be reliably selected even when buttons 471 having various shapes are arranged in mutually proximate positions.

Other Embodiments (a) In the embodiments described above, an example was shown for the case in which a portable game machine 1 was used as an example of a computer to which the game program can be applied, but the computer (e.g., the game device) is not limited to the embodiments described above; similar application can be made to a game device composed of a separate monitor, an arcade game device in which a monitor is integrated in the game device main unit, a PC or a work station that functions as a game device by executing a game program, or another configuration.

(b) Also included in the present invention are a program for executing the game such as that described above, a program method for executing the game, and a computer-readable recording medium on which the program is recorded. In addition to a cartridge, examples of recording media include computer-readable flexible disks, semiconductor memories, CD-ROMs, DVDs, MO disks, and ROM cassettes.

(c) In the embodiments, examples are given in which the indication means is a touch pen T and the input means is a lower liquid crystal monitor 3b, but the indication means and the input means may be any desired means as long as the base point SP of the selection region R can be indicated. For example, the present invention can also be applied to the case in which a finger of the user is the indication means and a variety of buttons, a mouse, or the like is the input means. For example, the present invention can also be applied to the case in which a controller or the like having a pointer function is the indication means and a receiver portion of a computer that can receive signals from the controller is the input means. In this case, the control unit recognizes the indication position indicated by the controller via the receiver portion.

(d) In Embodiment 1, the CPU 11 is caused to execute a process for subtracting the adjustment data MD from the minimum gap data D_min to thereby compute the definition data RK for defining the selection region R. However, the mode for computing the definition data RK is not limited to Embodiment 1; any computing mode may be used.

For example, first, the adjustment data MD recognized by the control unit in the adjustment data recognition means 57 is used as data having a value of less than 1 for adjusting the selection region R for selecting the object. Next, the control unit is caused to execute a process for multiplying the adjustment data MD having a value of less than 1 by the minimum gap data D_min The definition data RK for defining the selection region R is thereby computed, and the selection region R based on the definition data RK is set. For example, when the definition data RK is diameter data, a circular selection region R can be set on the basis of the diameter data.

In this case as well, according to the adjustment data recognition means, the control unit recognizes the adjustment data MD data to be one of either the first adjustment data MD1 that corresponds to the case in which the object is stationary or the second adjustment data MD2 that corresponds to the case in which the object has moved. However, in this case, the first adjustment data MD1 is set so as to be greater than 0 and less than the first adjustment data MD2. The second adjustment data MD2 is set to be less than 1.

(e) In Embodiment 1, an example is shown for the case in which the input means is a lower liquid crystal monitor 3b, but the input means can any means as long as the base point of the selection region R can be inputted. For example, various buttons of an input unit 4, a mouse, or a controller or the like having a pointer function can be used as the input means.

(f) In Embodiment 1, there is no provision for setting the maximum setting range of the selection region R. However, the maximum setting range of the selection region R may be defined. As a result of thoroughgoing research, it is apparent that the maximum setting range of the selection region R is preferably set so as achieve the following in terms of comparison with the object. For example, the maximum value that the diameter of the selection region R can assume is stipulated to be substantially L1/2, where the object is a rectangle and L1 is the length of the long side of the object, whereby the maximum setting range of the selection region R is set in accordance with the diameter. An object can be selected without unpleasant sensation and with relative ease, even when the gap between adjacent objects is very considerable.

An example was shown herein for the case in which the object is a rectangle, but the maximum setting range of the selection region R can be set by stipulating the maximum value that the diameter of the selection region R can assume on the basis of the typical length (characteristic length) of an object, even when the shape of the object is another shape. For example, when the object is circular, the maximum setting range of the selection region R can be set by making substantially ½ the diameter (characteristic length) of the object as the maximum value that the diameter of the selection region R can be. In the case of an object in which convexities and concavities can be seen in the outer periphery, a circle is imagined to be in contact with the outer periphery, and the maximum setting range of the selection region R can be set by making substantially ½ the diameter of the circle as the maximum value that the diameter of the selection region R can be.

INDUSTRIAL APPLICABILITY

According to the present invention, the coordinate data indicating the display position for displaying the button object on the image display unit is recognized by the control unit if a baseball game is implemented by using the game program. Each button object is displayed on the image display unit by using image data on the basis of the coordinate data indicating the display position of each of the button objects. The regions for selecting button objects are set by the control unit. The button objects are recognized by the control unit as selection button objects on the basis of the positional relationship between the button objects and the regions described above.

Accordingly, the player can readily select the button object using the regions described above merely by positioning the touch pen inside the button object or in the vicinity of the button object.

When a baseball game is executed by using the game program, the coordinate data indicating the display position for displaying the button object on the image display unit is recognized by the control unit. The plurality of button objects is displayed on the image display unit by using image data on the basis of the coordinate data indicating the display positions of the button objects. In this case, various commands are used in the baseball game via button objects displayed on the image display unit. The coordinate data inside the display regions of the button objects displayed on the image display unit are recognized by the control unit. The gap data indicating the gap between mutually adjacent button objects are computed by the control unit on the basis of the coordinate data inside the display regions of the button objects. A process for extracting minimum gap data is executed by the control unit on the basis of the gap data of at least one button object, and the minimum gap data is recognized by the control unit. The selection region for selecting a button object is set by the control unit on the basis of the minimum gap data. The coordinate data inside the selection region is recognized by the control unit. The control unit determines whether the coordinate data inside the display region of the button object matches the coordinate data inside the selection region. When the control unit has determined that the coordinate data inside the display region of the button object matches the coordinate data inside the selection region, the button object for which a match exists between the coordinate data is recognized by the control unit as the selected button object.

In this case, the gap data indicating the gap between mutually adjacent button objects is computed by the control unit on the basis of the coordinate data inside display regions of the button objects displayed on the image display unit. The selection region for selecting a button object is set by the control unit on the basis of minimum gap data. The button object that overlaps the selection region is selected when the selection region has overlapped the display region of the button object.

Accordingly, the player can readily select a button object by using a selection region merely by positioning the touch pen inside the button object or near the button object. Even when adjacent button objects are arranged in mutually proximate positions, the player can readily select the button object by using the selection region merely by positioning the touch pen inside the button object or near the button object. Game providers are not required to make special adjustments to the layout of the button object during game production even when adjacent button objects are arranged in mutually proximate positions. In other words, game providers can reduce labor during game production.

The adjustment data for adjusting the selection region for selecting the button object is recognized by the control unit if a baseball game is executed using the game program. The definition data for defining a selection region is computed by adjusting the minimum gap data using the adjustment data. The selection region is set by the control unit on the basis of the definition data. Here, various commands can be given in a baseball game by selecting the button objects.

In this case, the data for defining the selection region is computed by adjusting the minimum gap data using the adjustment data. Here, when the definition data is set to a value that is less than the minimum gap data, the player can reliably select only a single button object using the selection region merely by positioning the touch pen inside the button object or near the button object, even when button objects are adjacently disposed. In other words, the player can reliably select a desired button object by using selection regions. Therefore, it is possible to prevent false recognition that occurs when the selection region overlaps the button objects.

The adjustment data for adjusting the selection region for selecting the button object is recognized by the control unit if a baseball game is executed by using the game program. The control unit executes a process for subtracting the adjustment data from the minimum gap data. Definition data for defining the selection region is thereby computed. The selection region is set by the control unit on the basis of the definition data.

In this case, the data for defining the selection region is computed by subtracting the adjustment data from the minimum gap data. The definition data thereby becomes a value that is less than the minimum gap data. Accordingly, when the selection region defined based on the definition data is used, the player can reliably select only the desired button object, even when the button objects are adjacently disposed. In other words, it is possible to prevent false recognition that occurs when the selection region overlaps the button objects.

Further, the control unit determines whether a button, a character, or another object is stationary if the baseball game is executed by using the game program. When the object is stationary, the control unit recognizes the first adjustment data to be the adjustment data. Conversely, when the object is moving, the control unit recognizes the second adjustment data to be the adjustment data. In this situation, the second adjustment data is set to be less than the first adjustment data.

In this case, different adjustment data are set for the case in which the object is stationary and for the case in which the object is moving (first adjustment data >second adjustment data). Generally, an object is more difficult to select when moving than when stationary. Accordingly, in this situation, the selection region is set so that the selection region for the case in which the object is moving is larger than the selection region for the case in which the object is stationary. The player can thereby readily select a desired button object when the object is stationary and when the object is moving.

In this case, the definition data for the selection region is computed by multiplying the adjustment data having a value of less than 1 by the minimum gap data. The definition data thereby becomes a value that is less than the minimum gap data. Accordingly, the player can thereby reliably select only a desired button object when a selection region defined based on the definition data is used, even when the button objects are adjacently disposed. In other words, it is possible to prevent false recognition that occurs when the selection region overlaps the button objects.

Further, the control unit determines whether a button, a character, or another object is stationary if a baseball game is executed by using the game program. When the object is stationary, the control unit recognizes the first adjustment data to be the adjustment data. Conversely, when the object is moving, the control unit recognizes the second adjustment data to be the adjustment data. In this situation, the second adjustment data is set to be greater than the first adjustment data.

In this case, different adjustment data are set for the case in which the object is stationary and for the case in which the object is moving (first adjustment data <second adjustment data <1). Generally, an object is more difficult to select when moving than when stationary. Accordingly, in this situation, the selection region is set so that the selection region for the case in which the object is moving is larger than the selection region for the case in which the object is stationary. The player can thereby readily select a desired button object when the object is stationary and when the object is moving.

Further, the control unit recognizes, on the basis of an input signal from input means, the indication position indicated by the touch pen, the pointing device, or other indication means if a baseball game is executed by using the game program. The control unit sets the selection region in which the indication position is the base point on the basis of minimum gap data among the gap data of at least one object.

In this case, the selection region can be set using the indication position obtained from indication means as a base point on the basis of the minimum gap data described above. For example, if the circular region about the center of the indication position obtained from the indication means is set as the selection region on the basis of the minimum gap data described above, the player can readily select a desired object merely by causing the circular region formed about the indication position to overlap the object.

When a baseball game is executed by using the game program, the control unit recognizes the coordinate data indicating the display position for displaying button objects on the image display unit. The plurality of button objects is displayed on the image display unit using image data on the basis of the coordinate data indicating the display positions of the button objects. The control unit recognizes the coordinate data inside the display regions of the button objects displayed on the image display unit. The control unit recognizes the coordinate data indicating the indication position indicated by the touch pen on the basis of an input signal from input means, e.g., a contact input-type monitor. The control unit sets the indication region in which the range expands using the indication position as the base point. The control unit recognizes the coordinate data inside the indication region. The control unit determines whether there is a match between the coordinate data inside the display region of the button object and the coordinate data inside the indication region. If the control unit has determined that there is a match between the coordinate data inside the display region of the button object and the coordinate data inside the indication region, the control unit recognizes the selected button object to be the button object for which a match exists between the coordinate data.

In this case, the control unit sets the indication region in which the range expands using the indication position indicated by the touch pen T as the base point when the touch pen is brought into contact with the contact input-type monitor. The control unit determines whether the indication region in which the range is to be expanded using the indication position as a base point overlaps the display region of the button object. The button object that is overlapped by the indication region is selected when the indication region in which the range is to be expanded using the indication position as a base point overlaps the display region of the button object.

Accordingly, the player can readily select a button object by using an indication region merely by positioning the touch pen inside the button object or near the button object displayed on the monitor. Even when adjacent button objects are arranged in mutually proximate positions, the player can readily select the button object by using an indication region merely by positioning a touch pen inside the button object or near the button object. Game providers are not required to make special adjustments to the layout of the button object during game production even when adjacent button objects are arranged in mutually proximate positions. In other words, game providers can reduce labor during game production.

Further, the control unit executes a command assigned to a selected button object when the single frame time has elapsed from when the control unit has recognized the indication position of the touch pen, if the baseball game is executed using the game program.

In this case, the button object which the indication region has overlapped is selected between when the control unit has recognized the indication position of the touch pen and when the single frame time has elapsed. The control unit then executes a command assigned to the selected button object when a single frame time has elapsed from when the control unit has recognized the indication position of the touch pen. In other words, the button object which the indication region has overlapped is selected in a single frame time, and the command assigned to the button object which the indication region has overlapped is executed when a single frame time has elapsed.

Accordingly, when consideration is given to carrying out a process for displaying a button object in each single frame, the process for selecting the button object can be completed before the button object layout is modified even when the button object layout is to be modified. For this reason, the button object can be readily selected without carrying out the special process, even when the position of the button object has changed.

The control unit sets the indication region so that the expansion ratio of the indication region decreases in accordance with time beginning from when the indication position of the indication means, e.g., a touch pen, is recognized by the control unit if a baseball game is executed by using the game program.

For example, in this case, the extent to which the indication region is expanded decreases with the passage of time beginning from when the indication position of the touch pen is recognized by the control unit. For example, if the shape of the indication region is circular, the indication region radially expands about the center of the indication position of the touch pen in accordance with time beginning from when the indication position of the touch pen is recognized by the control unit. For example, the speed at which the indication region expands is determined based on the ratio of the radius or diameter in relation to the passage of time. Here, the control unit sets the indication region so that the ratio decreases over time. In other words, the overlap of the button and the circle can be determined with good precision as the radius of the circle or the diameter of the circle increases. The player can thereby reliably select a desired button object.

Further, when a baseball game is executed using the game program, the button object for which a match exists between the coordinate data is recognized by the control unit as the selected button object if the control unit has determined that the coordinate data inside the display region of a single button object matches the coordinate data inside the indication region. A command for stopping the process for selecting the button object is issued by the control unit when the control unit has determined that the coordinate data inside the display regions of the button objects simultaneously matches the coordinate data inside the indication region.

In this case, a command for stopping the process for selecting a button object is issued by the control unit when the control unit has determined that the coordinate data inside the display regions of the objects simultaneously matches the coordinate data inside the indication region. For example, the process for selecting a button object is stopped when the indication region has overlapped two button objects while the indication region is expanding using the indication position as the base point. In other words, in this situation, only one button object is reliably selected without two or more button objects being selected at the same time. It is thereby possible to prevent false recognition when the indication region has overlapped two or more button objects at the same time.

Further, the indication region expands in a radial fashion about the center of the indication position of the touch pen if the shape of the indication region is circular. At this point, the control unit determines whether the radius or the diameter of the indication region has reached a predetermined value (a value indicated in the data for defining the maximum range of the indication region). The control unit issues a command for stopping the expansion of the indication region when the radius or the diameter of the indication region has reached a predetermined value. At this point, the process for expanding the indication region is stopped by the control unit.

Therefore, a limit is provided to the size of the indication region. Consequently, if the player has mistakenly brought the touch pen into contact with the monitor, the button object is not selected by the indication region when the contact position of the touch pen is at a considerable distance from the button object. In other words, when the player has made an unintended operation, it is possible to prevent the button object from being mistakenly selected by the indication region.

It is possible to consider the following mode as an example of setting the maximum range of the indication region. For example, the maximum value that the diameter or the radius of the indication region can have is defined based on the typical length (characteristic length) of an object. The maximum range of the indication region is set based on this maximum value.

For example, when the object is a rectangle and L1 is the length of the long side of the object, the control unit is caused to recognize the length L1 of the long side of the object as the characteristic length of the object. The control unit is then caused to execute computation for multiplying a predetermined value (e.g., ½) by the characteristic length L1 of the object. The control unit is then made to recognize this computational result (e.g., L1/2) as the maximum value that the diameter of the indication region can have. Accordingly, the maximum value that the diameter of the indication region can have is established and the maximum range of the indication region is restricted. Therefore, the object can be prevented from being mistakenly selected when the indication region is formed in a position that is at a considerable distance from the object. The object can be selected before the indication region expands to the maximum range when the indication region is fanned in the vicinity of the object. The operation for selecting an object can thus be executed without creating any unpleasant sensation by restricting the maximum range of the indication region, no matter where the indication region is formed.

An example of the case in which the button object is a rectangle has been given, but the maximum range of the indication region can be set in the same manner as described above when the object is, e.g., circular. For example, the diameter (characteristic length) L2 of the object is the characteristic length of the object and a predetermined value (e.g., ½) is multiplied by the characteristic length L2. The computational result (e.g., L2/2) is set as the maximum value that the diameter of the indication region can have. The maximum range of the indication region can thereby be restricted. For example, a circle is envisioned for cases in which contact is made with the external periphery of an object having a concavo-convex external periphery. The maximum range of the indication region can be restricted in the same manner as described above when the diameter of the circle is set to the characteristic length.

For example, when the game is executed using the game program, the control unit recognizes the coordinate data indicating the display position for displaying on the image display unit the button object for giving various commands in the game. The button object is displayed on the image display unit using image data on the basis of the coordinate data indicating the display position of the button object. At this point, the control unit recognizes the coordinate data inside the display region of the button object displayed on the image display unit. The control unit recognizes the coordinate data of the indication position indicated by indication means, e.g., a touch pen, on the basis of an input signal from input means, e.g., a contact input-type monitor. At this point, the control unit sets the indication region using the indication position as a base point on the basis of the coordinate data of the indication position indicated by the touch pen. Next, the control unit determines the positional relationship between the indication position of the touch pen and the display region of the object on the basis of the coordinate data of the indication position of the touch pen and the coordinate data inside the display region of the object. The control unit recognizes an object as the selected object on the basis of the result of the positional relationship determination between the indication position of the touch pen and the display region of the object.

In this case, the control unit sets the display region using the indication position indicated by the touch pen as the base point, by bringing the touch pen into contact with the contact input-type monitor. The control unit determines the positional relationship between the indication position of the touch pen and the display region of the object, and the control unit recognizes the object as the selected object on the basis of this determination result.

For this reason, the player can readily select a button object positioned near or in the position of the touch pen merely by positioning the touch pen inside the button object or near the button object displayed on the monitor. Even when adjacent button objects are arranged in mutually proximate positions, the player can readily select a button object positioned near or in the position of the touch pen merely by positioning the touch pen inside the button object or near the button object. Furthermore, even when adjacent button objects are arranged in mutually proximate positions, game providers are not required to make special adjustments to the layout of button objects during game production. In other words, game providers can reduce labor during game production.

The control unit determines whether there is a match between the coordinate data of the indication position of the touch pen and the coordinate data inside the button object if a game is executed using the game program. The control unit recognizes the button object as the selected object if the control unit has determined that the coordinate data of the indication position of the touch pen matches the coordinate data inside the button object.

In this case, the control unit determines whether the indication position indicated by the touch pen is positioned inside the button object when the touch pen is brought into contact with the contact input-type monitor. The control unit recognizes the object as the selected object if the indication position indicated by the touch pen is positioned inside the button object.

Accordingly, the player can reliably select a button object in the position of the touch pen merely by positioning the touch pen inside the button object displayed on the monitor. Even when adjacent button objects are arranged in mutually proximate positions, the player can reliably select a button object in the position of the touch pen merely by positioning the touch pen inside the button object.

For example, the control unit recognizes the coordinate data inside the display region of the button object if the game is executed using the game program. In this situation, the coordinate data inside the display region of the button object includes first coordinate data for the boundary that forms the shape of the button object. The control unit sets the indication region having the boundary in the position set at the predetermined distance from the indication position of the touch pen on the basis of the coordinate data of the indication position of the touch pen. The control unit executes the process for computing the first distance between the indication position of the touch pen and the boundary of the button object on the basis of the coordinate data of the indication position of the touch pen and the first coordinate data for the boundary of the button object. The control unit determines whether the first distance is equal to or less than the distance from the indication position of the touch pen to the boundary of the indication region. The control unit recognizes the button object as the selected object if the control unit has determined that the first distance is equal to or less than the distance from the indication position of the touch pen to the boundary of the indication region.

In this case, when the touch pen makes contact with the contact input-type monitor, the control unit determines whether the first distance from the indication position indicated by the touch pen to the first boundary of the button object is equal to or less than the distance from the indication position of the touch pen to the boundary of the indication region. The control unit recognizes the button object as the selected object if the control unit has determined that the first distance is equal to or less than the distance from the indication position of the touch pen to the boundary of the indication region.

When the button object is a rectangular button, the four sides of the rectangular button correspond to the boundary (first boundary) that forms the shape of the button object. Accordingly, in this case, the distance to the side of the rectangular button that is nearest to the indication position indicated by the touch pen is the first distance if the button object is a rectangular button.

For this reason, the player can readily and reliably select the button object having a boundary (e.g., a side) near the touch pen merely by positioning the touch pen near the button object displayed on the monitor. Even when adjacent button objects are arranged in mutually proximate positions, the player can readily and reliably select the button object having a boundary (e.g., a side) near the touch pen merely by positioning the touch pen near the button object. Game providers are not required to make special adjustments to the layout of button objects during game production, even when adjacent button objects are arranged in mutually proximate positions. In other words, game providers can reduce labor during game production.

Further, the control unit recognizes the coordinate data inside the display region of the button object if the game is executes using the game program. Here, coordinate data inside the display region of the button object is included in the second coordinate data for the boundary that defines the shape of the button object. The control unit sets the indication region having the boundary in the position set at a predetermined distance from the indication position of the touch pen on the basis of the coordinate data of the indication position of the touch pen. The control unit then executes a process for computing a second distance between the indication position of the touch pen and the boundary of the button object on the basis of the coordinate data of the indication position of the touch pen and the second coordinate data for the boundary of the button object. The control unit determines whether the second distance is equal to or less than the distance from the indication position to the boundary of the indication region. The control unit recognizes the button object as the selected object if the control unit has determined that the second distance is equal to or less than the distance from the indication position to the boundary of the indication region.

In this case, when the touch pen is brought into contact with the contact input-type monitor, the control unit determines whether the second distance from the indication position indicated by the touch pen to the second boundary of the button object is equal to or less than the distance from the indication position of the touch pen to the boundary of the indication region. The control unit recognizes the button object as the selected object if the control unit has determined that the second distance is equal to or less than the distance from the indication position of the touch pen to the boundary of the indication region.

When the button object is a rectangular button, the four corners of the rectangular button correspond to the boundary (second boundary) that defines the shape of the button object. In this case, the second distance is the distance from the indication position indicated by the touch pen to the corners of the rectangular button if the button object is a rectangular button.

For this reason, the player can readily and reliably select the button object having a boundary (e.g., a corner) near the touch pen merely by positioning the touch pen near the button object displayed on the monitor. Even when adjacent button objects are arranged in mutually proximate positions, the player can readily and reliably select the button object having the boundary (e.g., a corner) near the touch pen merely by positioning the touch pen near the button object. Game providers are not required to make special adjustments to the layout of button objects during game production, even when adjacent button objects are arranged in mutually proximate positions. In other words, game providers can reduce labor during game production.

If a game is implemented using the game program, the control unit executes a process for computing the third distance between the indication position of the touch pen and the display position of the button object on the basis of the coordinate data of the indication position of the touch pen and the coordinate data indicating the display position of the button object. The control unit determines whether the third distance is equal to or less than the total distance of the distance from the indication position of the touch pen to the boundary of the indication region and the distance from the display position of the button object to the boundary of the display region of the button object. The control unit recognizes the button object as the selected object if the control unit has determined that the third distance is equal to or less than the total distance described above.

In this case, the control unit determines whether the third distance between the indication position of the touch pen and the display position of the button object is equal to or less than the total distance of the distance from the indication position of the touch pen to the boundary of the indication region and the distance from the display position of the button object to the boundary of the display region of the button object. The control unit recognizes the button object as the selected object if the control unit has determined that the third distance is equal to or less than the total distance described above. If the button object is a circular button, the third distance is the distance from the indication position of the touch pen to the center position of the circular button. The radius of the circular button is the distance from the center position of the circular button to the boundary of the button object.

For this reason, the player can readily and reliably select the button object having a boundary (e.g., circumference) near the touch pen merely by positioning the touch pen near the button object displayed on the monitor. Even when adjacent button objects are arranged in mutually proximate positions, the player can readily and reliably select the button object having a boundary (e.g., circumference) near the touch pen merely by positioning the touch pen near the button object. Game providers are not required to make special adjustments to the layout of button objects during game production, even when adjacent button objects are arranged in mutually proximate positions. In other words, game providers can reduce labor during game production.

In the object selection function, the control unit temporarily recognizes the first object as the selected object if the first distance between the indication position and the first boundary of the first object, or the second distance between the indication position and the second boundary of the first object is equal to or less than the distance from the indication position to the boundary of the indication region. The control unit temporarily recognizes the second object as the selected object if the third distance between the indication position and the display position of the second object is equal to or less than the total distance of the distance from the indication position to the boundary of the indication region and the distance from the display position of the second object to the boundary of the display region of the second object. The control unit ultimately recognizes the first object as the selected object if the first distance or the second distance in relation to the first object is less than the first distance between the indication position and the boundary of the second object. On the other hand, the control unit ultimately recognizes the second object as the selected object if the first distance or the second distance in relation to the first object is equal to or greater than the first distance between the indication position and the boundary of the second object.

The control unit temporarily recognizes the rectangular button as the selected object if the first distance between the indication position of the touch pen and the first boundary of the rectangular button, or the second distance between the indication position of the touch pen and the second boundary of the rectangular object is equal to or less than the distance from the indication position of the touch pen to the boundary of the indication region.

The control unit temporarily recognizes the circular button as the selected object if the third distance between the indication position of the touch pen and the display position of the circular button is equal to or less than the total distance of the distance from the indication position of the touch pen to the boundary of the indication region and the distance from the center position of the circular button to the boundary of the display region of the circular button.

The control unit ultimately recognizes the rectangular button as the selected object if the first distance or the second distance in relation to the rectangular button is less than the first distance between the indication position of the touch pen and the boundary of the circular button.

On the other hand, the control unit ultimately recognizes the circular button as the selected object if the first distance or the second distance in relation to the rectangular button is equal to or greater than the first distance between the indication position of the touch pen and the boundary of the circular button.

In this case, the player can readily and reliably select the button object having a boundary near the touch pen merely by positioning the touch pen near the button object displayed on the monitor, even when the shapes of the button objects are different shapes. The player can readily and reliably select the button object having a boundary near the touch pen merely by positioning the touch pen near the button object, even when adjacent button objects are arranged in mutually proximate positions. Game providers are not required to make special adjustments to the layout of button objects during game production, even when adjacent button objects are arranged in mutually proximate positions. In other words, game providers can reduce labor during game production In the present invention, a player can readily select an object by carrying out object selection/indication inside an object or near an object displayed on the monitor. The player can readily select an object by carrying out object selection/indication inside an object or near an object even when adjacent objects are arranged in mutually proximate positions. Game providers are not required to make special adjustments to the layout of an object during game production even when adjacent objects are arranged in mutually proximate positions. In other words, game providers can reduce labor during game production.

What is claimed is:

1. A non-transitory computer readable medium storing a game program for a video game, the game program comprising:
   code for causing a control unit, which controls the video game, to recognize first coordinate data indicating a first display position of a first object on the image display unit;
   code for causing the control unit to display the first object on the image display unit on the basis of the first coordinate data;
   code for causing the control unit to recognize second coordinate data indicating a second display position of a second object on the image display unit;

code for causing the control unit to display the second object on the image display unit on the basis of the second coordinate data;
code for causing the control unit to compute gap data indicating a gap between the first and second objects;
code for causing the control unit to search a minimum gap data based on the gap data;
code for causing the control unit to recognize an indication position where a player of the video game contacts on the image display unit;
code for causing the control unit to set a region based on the minimum gap data for the player to select the first object or the second object, the region having a prescribed area with the indication position as a center; and
code for causing the control unit to determine whether or not the first object or the second object is selected by the region.

2. The non-transitory computer readable medium as recited in claim 1, wherein
the code for causing the control unit to set the region includes code for causing the control unit to adjust the minimum gap data and set the area of the region based on the adjusted minimum gap.

3. The non-transitory computer readable medium as recited in claim 2, wherein
the code for causing the control unit to adjust the minimum gap data and set the area of the region based on the adjusted minimum gap includes code for causing the control unit to decrease the area of the region.

4. The non-transitory computer readable medium as recited in claim 3, the game program further comprising
code for causing the control unit to determine whether or not at least one of the first object and the second object is stationary, wherein
the area of the region is changed based on whether or not at least one of the first object and the second object is stationary.

5. The non-transitory computer readable medium as recited in claim 1, wherein
the code for causing the control unit to set the region includes code for causing the control unit to adjust the minimum gap data and set the area of the region based on the adjusted minimum gap, and
the code for causing the control unit to adjust the minimum gap data and set the area of the region based on the adjusted minimum gap includes code for causing the control unit to multiply the area of the region by a value of less than 1.

6. The non-transitory computer readable medium as recited in claim 5, the game program further comprising
code for causing the control unit to determine whether or not at least one of the first object and the second object is stationary, wherein
the value is greater when the object is moving than when the object is stationary.

7. The non-transitory computer readable medium recited in claim 1, wherein
the code for causing the control unit to set the region on the basis of the minimum gap data includes code for causing the control unit to set the region by identifying the indication position as a base point from which the region is adjusted.

8. The non-transitory computer readable medium as recited in claim 1, wherein
the code for causing the control unit to set the region includes code for causing the control unit to expand the region from the indication position, the code for causing the control unit to set the first object or the second object with which the region at least partially overlaps as a target object includes code for causing the control unit to set the first object or the second object with which the region after being expanded at least partially overlaps as the target object.

9. The non-transitory computer readable medium as recited in claim 8, further comprising
code for causing the control unit to implement a command assigned to the target object, when a prescribed time has elapsed from when the control unit recognizes the indication position.

10. The non-transitory computer readable medium as recited in claim 8, wherein
the code for causing the control unit to expand the region from the indication point includes code for causing the control unit to decrease expansion ratio of expanding the region as time elapses from when the control unit recognizes the indication position.

11. The non-transitory computer readable medium as recited in claim 8, the game program further comprising
code for causing the control unit to determine whether or not the region at least partially overlaps with the first object or the second object; and
code for causing the control unit to stop selecting the target object, if the region at least partially overlaps with the first object or the second object.

12. The non-transitory computer readable medium as recited in any of claim 8, wherein
the code for causing the control unit to expand the region from the indication point includes code for causing the control unit to set the maximum area of the region.

13. The non-transitory computer readable medium as recited in claim 1, further comprising
code for causing the control unit to recognize a first boundary of the first object or the second object with first distance from the indication position, wherein
the code for causing the control unit to set the first object or the second object with which the region at least partially overlaps as a target object includes code for causing the control unit to determine whether the first distance is shorter than distance between a boundary of the region and the indication position.

14. The non-transitory computer readable medium as recited in claim 13, further comprising
code for causing the control unit to recognize a second boundary of the first object or the second object with second distance from the indication position, the first distance being shorter than the second distance, wherein
the code for causing the control unit to set the first object or the second object with which the region at least partially overlaps as a target object includes code for causing the control unit to determine whether the second distance is shorter than distance between a boundary of the region and the indication position.

15. The non-transitory computer readable as recited of claim 14, further comprising
code for causing the control unit to recognize third distance which is between the indication position and the center of the first object or the second object, wherein
the code for causing the control unit to set the first object or the second object with which the region at least partially overlaps as the target object includes code for causing the control unit to determine whether or not the third distance is shorter than a sum of distance between the indication position and the boundary of the region and distance from the center of the first object or the second object to the first boundary or to the second boundary.

16. The non-transitory computer readable medium as recited in any of claim 14, wherein the control unit sets the first object as a first target object temporarily, if the first distance or the second distance is equal to or less than the distance from the indication position to the boundary of the region, the control unit sets the second object as a second target object temporarily, if third distance between the indication position and the center of the second object is equal to or less than sum of the distance between the indication position and the boundary of the first region and the distance from the center of the second object to the boundary of the second object, the control unit sets the first target object as the target object finally, if the first distance or the second distance is shorter than distance between the indication position and a boundary of the second object, and the control unit sets the second target object as the target object finally, if the first distance or the second distance is equal to or greater than the distance between the indication position and the boundary of the second object.

17. A game device which executes a video game, the game device comprising:

a display position recognition unit being configured to recognize a first display position of a first object on the image display unit, and recognize a second display position of a second object on the image display unit;

an object display unit being configured to display the first object and the second object on the image display unit;

a gap computation unit being configure to compute gap data indicating a gap between the first and second objects;

a minimum gap recognition unit being configured to search a minimum gap data which indicates a minimum gap between the first and second display objects;

an indication position recognizing unit being configured to recognize an indication position where a player of the video game contacts on the image display unit;

a region setting unit being configured to set a region based on the minimum gap data for selecting the first object or the second object, the region having a prescribed area;

an object selection unit to determine whether or not the first object or the second object is selected by the region.

18. The game device as recited in claim 17, furthermore comprising an indication region setting unit being configured to expand the region from the indication position; and a region match determination unit being configured to set the first object as the target object if the region after being expanded at least partially overlaps with the first object.

19. The game device as recited in claim 17, furthermore comprising an indication region setting unit being configured to set the region on the basis of the indication position; and a position determination unit being configured to determine a positional relationship between the indication position and the object and identify the first object as the target object on the basis of the positional relationship.

20. A method for controlling a video game, the method comprising:

causing a control unit, which controls the video game, to recognize first coordinate data indicating a first display position of a first object on the image display unit, and recognize second coordinate data indicate a second display position of the second object on the image display unit;

causing the control unit to display the first object on the image display unit on the basis of the first coordinate data, and the second object on the image display unit on the basis of the second coordinate data;

causing the control unit to compute gap data indicating a gap between the first and the second objects;

causing the control unit to search a minimum gap data based on the gap data;

causing the control unit to recognize an indication position where a player contacts on the image display unit;

causing the control unit to set a region based on the minimum gap data for the player to select the first object or the second object, the region having a prescribed area;

causing the control unit to determine whether or not the first object or the second object is selected the region.

21. The game control method as recited in claim 20, wherein causing the control unit to expand the region from the indication point, and causing the control unit to set the first object as the target object if the region after being expanded at least partially overlaps with the first object.

22. The game control method as recited in claim 20, wherein causing the control unit to set the region on the basis of the indication position; and causing the control unit to determine a positional relationship between the indication position and the object and identify the first object as the target object on the basis of the positional relationship.

* * * * *